US007853501B1

(12) United States Patent
Cornell

(10) Patent No.: US 7,853,501 B1
(45) Date of Patent: Dec. 14, 2010

(54) DATA PROCESSING SYSTEMS AND METHOD FOR CREATING EFFICIENT FLOATER CLASSES

(75) Inventor: Ross H. Cornell, Ashburn, VA (US)

(73) Assignee: Federal Home Loan Mortgage Corporation, McLean, VA (US)

( * ) Notice: Subject to any disclaimer, the term of this patent is extended or adjusted under 35 U.S.C. 154(b) by 390 days.

(21) Appl. No.: 12/003,457

(22) Filed: Dec. 26, 2007

Related U.S. Application Data

(62) Division of application No. 09/664,403, filed on Sep. 18, 2000, now Pat. No. 7,340,427.

(60) Provisional application No. 60/154,040, filed on Sep. 16, 1999.

(51) Int. Cl.
*G06Q 40/00* (2006.01)

(52) U.S. Cl. .............................. 705/35; 705/37; 705/38; 705/39

(58) Field of Classification Search ................... 705/35, 705/37–39
See application file for complete search history.

(56) References Cited

U.S. PATENT DOCUMENTS

| | | | | |
|---|---|---|---|---|
| 5,946,667 | A | * | 8/1999 | Tull et al. .................. 705/36 R |
| 5,966,700 | A | | 10/1999 | Gould et al. |
| 6,070,151 | A | * | 5/2000 | Frankel ..................... 705/36 R |
| 6,208,738 | B1 | | 3/2001 | Goldenfeld et al. |
| 6,321,212 | B1 | | 11/2001 | Lange |
| 7,324,967 | B1 | * | 1/2008 | Sankaran et al. .............. 705/35 |
| 7,340,427 | B1 | | 3/2008 | Cornell |
| 2003/0074306 | A1 | | 4/2003 | Rios et al. |

OTHER PUBLICATIONS

Notices of Allowance and Allowability, dated Dec. 1, 2009, in U.S. Appl. No. 12/003,478, filed Dec. 26, 2007 (10 pgs.).
Reply to Office Action with RCE, filed Sep. 4, 2009, in U.S. Appl. No. 12/003,478, filed Dec. 26, 2007, showing allowed claims (17 pgs.).
Boudoukh, "Pricing Mortgage Backed Securities in a Multifactor Interest Rate Environment: A Multivariate Density Estimation Approach," NYU, (Dec. 1996).
Cahill, "A Closer Look at Mortgage-Backed Securities," (May 1999).
Chen, "The Relevance of Interest Rate Processes in Pricing Mortgage-Backed Securities," Journal of Housing Research, vol. 6, Issue 2 (1995).

(Continued)

*Primary Examiner*—Jagdish N Patel
(74) *Attorney, Agent, or Firm*—Finnegan, Henderson, Farabow, Garrett & Dunner, LLP

(57) ABSTRACT

A method for creating investment securities structured from interest-rate derivative and mortgage pool components is described. The method includes analyzing the risk elements of the derivative and mortgage pool components, structuring one or more classes of securities, at least one of which is backed by these components in combination, and issuing the structured securities. A computer program product and data processing system for practicing the method are also described. A novel investment security is disclosed which incorporates cash flows from mortgage pool components and cash flows coming from derivative components. Finally, a method of adding value to mortgage-backed securities is described.

14 Claims, 87 Drawing Sheets

OTHER PUBLICATIONS

"An Investor's Guide to Mortgage-Backed Securities, IGMS," The Bond Market Association (retrieved from the Internet by a previous Examiner on Jan. 15, 2004).

R. Pemberton, "Structured Notes" Cansco Investment Counsel Ltd. (retrieved from the Internet by a previous Examiner on Jan. 15, 2004).

"Interest Rate Derivatives Real-Time Pricing System Financial Engineering and Software Systems fo the Derivatives Market for Traders of Financial Derivatives Who Need Rapid Accurate Pricing," Layer Eight Systems (retrieved from the Internet by a previous Examiner on Jan. 15, 2004).

Wheeler, Douglas S., "Evaluating Mortgage-Backed Securities with Total Rate of Return Simulation," Bank Accounting & Finance, vol. 5, Issue 3, p. 13, Boston, (Spring 1992).

* cited by examiner

EFC SERIES SYSTEM
RISK ANALYSIS AND PLANNING MODULE
ASSET POOL PREPAYMENT MODEL
APPLICATIONS PROGRAM OUTPUT

| loan mo | mortgages bom opb from orign | mortgages interest from orign | scheduled principal from orign | forward discount factors | base line PSA | low range adj to base PSA | high range adj to base PSA | final variable PSA | CPR at 162% PSA | WAC Adj SMM at PSA = 162% | umulativ Prepay Factor | mortgages Prepay Principal |
|---|---|---|---|---|---|---|---|---|---|---|---|---|
|  |  |  | 199,951,416 |  |  |  |  |  |  |  | 1.00000 | 720,048,584 |
| 1 | 920,000,000 | 5,152,000 | 796,768 | 0.995438 | 162% | 0% | 0% | 162% | 0.00324 | 0.00027 | 0.99973 | 248,554 |
| 2 | 918,954,678 | 5,146,146 | 801,013 | 0.990859 | 162% | 0% | 0% | 162% | 0.00648 | 0.00054 | 0.99919 | 497,282 |
| 3 | 917,656,383 | 5,138,876 | 805,062 | 0.986264 | 162% | 0% | 0% | 162% | 0.00972 | 0.00081 | 0.99838 | 745,979 |
| 4 | 916,105,342 | 5,130,190 | 808,912 | 0.981653 | 162% | 0% | 0% | 162% | 0.01296 | 0.00109 | 0.99729 | 994,441 |
| 5 | 914,301,989 | 5,120,091 | 812,558 | 0.977027 | 162% | 0% | 0% | 162% | 0.01620 | 0.00136 | 0.99593 | 1,242,463 |
| 6 | 912,246,968 | 5,108,583 | 815,997 | 0.972386 | 162% | 0% | 0% | 162% | 0.01944 | 0.00163 | 0.99431 | 1,489,840 |
| 7 | 909,941,131 | 5,095,670 | 819,225 | 0.967730 | 162% | 0% | 0% | 162% | 0.02268 | 0.00191 | 0.99241 | 1,736,365 |
| 8 | 907,385,541 | 5,081,359 | 822,240 | 0.963061 | 162% | 0% | 0% | 162% | 0.02592 | 0.00219 | 0.99024 | 1,981,833 |
| 9 | 904,581,469 | 5,065,656 | 825,037 | 0.958378 | 162% | 0% | 0% | 162% | 0.02916 | 0.00246 | 0.98780 | 2,226,038 |
| 10 | 901,530,394 | 5,048,570 | 827,613 | 0.953682 | 162% | 0% | 0% | 162% | 0.03240 | 0.00274 | 0.98509 | 2,468,777 |
| 11 | 898,234,004 | 5,030,110 | 829,967 | 0.948973 | 162% | 0% | 0% | 162% | 0.03564 | 0.00302 | 0.98212 | 2,709,845 |
| 12 | 894,694,192 | 5,010,287 | 832,094 | 0.944252 | 162% | 0% | 0% | 162% | 0.03888 | 0.00330 | 0.97888 | 2,949,041 |
| 13 | 890,913,056 | 4,989,113 | 833,993 | 0.939538 | 162% | 0% | 0% | 162% | 0.04212 | 0.00358 | 0.97537 | 3,186,164 |
| 14 | 886,892,899 | 4,966,600 | 835,662 | 0.934831 | 162% | 0% | 0% | 162% | 0.04536 | 0.00386 | 0.97161 | 3,421,015 |
| 15 | 882,636,222 | 4,942,763 | 837,097 | 0.930132 | 162% | 0% | 0% | 162% | 0.04860 | 0.00414 | 0.96758 | 3,653,398 |
| 16 | 878,145,727 | 4,917,616 | 838,297 | 0.925441 | 162% | 0% | 0% | 162% | 0.05184 | 0.00443 | 0.96330 | 3,883,118 |
| 17 | 873,424,312 | 4,891,176 | 839,260 | 0.920757 | 162% | 0% | 0% | 162% | 0.05508 | 0.00471 | 0.95876 | 4,109,983 |
| 18 | 868,475,069 | 4,863,460 | 839,985 | 0.916081 | 162% | 0% | 0% | 162% | 0.05832 | 0.00499 | 0.95397 | 4,333,806 |
| 19 | 863,301,278 | 4,834,487 | 840,470 | 0.911413 | 162% | 0% | 0% | 162% | 0.06156 | 0.00528 | 0.94893 | 4,554,400 |
| 20 | 857,906,408 | 4,804,276 | 840,713 | 0.906754 | 162% | 0% | 0% | 162% | 0.06480 | 0.00557 | 0.94365 | 4,771,585 |
| 21 | 852,294,110 | 4,772,847 | 840,714 | 0.902102 | 162% | 0% | 0% | 162% | 0.06804 | 0.00585 | 0.93813 | 4,985,181 |
| 22 | 846,468,214 | 4,740,222 | 840,473 | 0.897459 | 162% | 0% | 0% | 162% | 0.07128 | 0.00614 | 0.93236 | 5,195,016 |
| 23 | 840,432,725 | 4,706,423 | 839,987 | 0.892824 | 162% | 0% | 0% | 162% | 0.07452 | 0.00643 | 0.92637 | 5,400,918 |
| 24 | 834,191,820 | 4,671,474 | 839,257 | 0.888198 | 162% | 0% | 0% | 162% | 0.07776 | 0.00672 | 0.92014 | 5,602,724 |
| 25 | 827,749,839 | 4,635,399 | 838,283 | 0.883581 | 162% | 0% | 0% | 162% | 0.08100 | 0.00701 | 0.91368 | 5,800,272 |
| 26 | 821,111,284 | 4,598,223 | 837,064 | 0.878973 | 162% | 0% | 0% | 162% | 0.08424 | 0.00731 | 0.90701 | 5,993,407 |
| 27 | 814,280,813 | 4,559,973 | 835,602 | 0.874373 | 162% | 0% | 0% | 162% | 0.08748 | 0.00760 | 0.90011 | 6,181,978 |

FIG. 6-1A

| | | | | | | | | | | |
|---|---|---|---|---|---|---|---|---|---|---|
| 28 | 807,263,233 | 4,520,674 | 833,895 | 0.869783 | 162% | 0% | 0% | 162% | 0.09072 | 0.00789 | 0.89301 | 6,365,842 |
| 29 | 800,063,496 | 4,480,356 | 831,945 | 0.865201 | 162% | 0% | 0% | 162% | 0.09396 | 0.00819 | 0.88570 | 6,544,858 |
| 30 | 792,686,693 | 4,439,045 | 829,753 | 0.860629 | 162% | 0% | 0% | 162% | 0.09720 | 0.00848 | 0.87818 | 6,718,893 |
| 31 | 785,138,046 | 4,396,773 | 827,320 | 0.856066 | 162% | 0% | 0% | 162% | 0.09720 | 0.00848 | 0.87073 | 6,654,864 |
| 32 | 777,655,862 | 4,354,873 | 824,894 | 0.851513 | 162% | 0% | 0% | 162% | 0.09720 | 0.00848 | 0.86334 | 6,591,398 |
| 33 | 770,239,570 | 4,313,342 | 822,475 | 0.846970 | 162% | 0% | 0% | 162% | 0.09720 | 0.00848 | 0.85602 | 6,528,492 |
| 34 | 762,888,604 | 4,272,176 | 820,063 | 0.842436 | 162% | 0% | 0% | 162% | 0.09720 | 0.00848 | 0.84875 | 6,466,139 |
| 35 | 755,602,401 | 4,231,373 | 817,658 | 0.837912 | 162% | 0% | 0% | 162% | 0.09720 | 0.00848 | 0.84155 | 6,404,336 |
| 36 | 748,380,407 | 4,190930 | 815,260 | 0.833397 | 162% | 0% | 0% | 162% | 0.09720 | 0.00848 | 0.83441 | 6,343,078 |
| 37 | 741,222,068 | 4,150,844 | 812,870 | 0.828900 | 162% | 0% | 0% | 162% | 0.09720 | 0.00848 | 0.82733 | 6,282,360 |
| 38 | 734,126,839 | 4,111,110 | 810,486 | 0.824419 | 162% | 0% | 0% | 162% | 0.09720 | 0.00848 | 0.82031 | 6,222,177 |
| 39 | 727,094,175 | 4,071,727 | 808,109 | 0.819955 | 162% | 0% | 0% | 162% | 0.09720 | 0.00848 | 0.81335 | 6,162,525 |
| 40 | 720,123,541 | 4,032,692 | 805,739 | 0.815507 | 162% | 0% | 0% | 162% | 0.09720 | 0.00848 | 0.80645 | 6,103,400 |
| 41 | 713,214,401 | 3,994,001 | 803,377 | 0.811076 | 162% | 0% | 0% | 162% | 0.09720 | 0.00848 | 0.79961 | 6,044,796 |
| 42 | 706,366,229 | 3,955,651 | 801,021 | 0.806662 | 162% | 0% | 0% | 162% | 0.09720 | 0.00848 | 0.79282 | 5,986,709 |
| 43 | 699,578,499 | 3,917,640 | 798,672 | 0.802264 | 162% | 0% | 0% | 162% | 0.09720 | 0.00848 | 0.78609 | 5,929,135 |
| 44 | 692,850,692 | 3,879,964 | 796,330 | 0.797884 | 162% | 0% | 0% | 162% | 0.09720 | 0.00848 | 0.77942 | 5,872,070 |
| 45 | 686,182,292 | 3,842,621 | 793,994 | 0.793519 | 162% | 0% | 0% | 162% | 0.09720 | 0.00848 | 0.77281 | 5,815,509 |
| 46 | 679,572,789 | 3,805,608 | 791,666 | 0.789171 | 162% | 0% | 0% | 162% | 0.09720 | 0.00848 | 0.76625 | 5,759,447 |
| 47 | 673,021,676 | 3,768,921 | 789,344 | 0.784840 | 162% | 0% | 0% | 162% | 0.09720 | 0.00848 | 0.75975 | 5,703,880 |
| 48 | 666,528,451 | 3,732,559 | 787,030 | 0.780526 | 162% | 0% | 0% | 162% | 0.09720 | 0.00848 | 0.75331 | 5,648,805 |
| 49 | 660,092,617 | 3,696,519 | 784,722 | 0.776228 | 162% | 0% | 0% | 162% | 0.09720 | 0.00848 | 0.74691 | 5,594,217 |
| 50 | 653,713,678 | 3,660,797 | 782,420 | 0.771946 | 162% | 0% | 0% | 162% | 0.09720 | 0.00848 | 0.74058 | 5,540,111 |
| 51 | 647,391,146 | 3,625,390 | 780,126 | 0.767681 | 162% | 0% | 0% | 162% | 0.09720 | 0.00848 | 0.73429 | 5,486,484 |

FIG. 6-1B

EFC SERIES SYSTEM
RISK ANALYSIS AND PLANNING MODULE
ASSET POOL PREPAYMENT MODEL
APPLICATIONS PROGRAM OUTPUT

| loan mo | mortgages born opb from orign | mortgages interest from orign | scheduled principal from orign | forward discount factors | base line PSA | low range adj to base PSA | high range adj to base PSA | final variable PSA | CPR at 162% PSA | WAC Adj SMM at PSA = 162% | umulativ Prepay Factor | mortgages Prepay Principal |
|---|---|---|---|---|---|---|---|---|---|---|---|---|
| 52 | 641,124,536 | 3,590,297 | 777,838 | 0.763433 | 162% | 0% | 0% | 162% | 0.09720 | 0.00848 | 0.72806 | 5,433,331 |
| 53 | 634,913,367 | 3,555,515 | 775,557 | 0.759201 | 162% | 0% | 0% | 162% | 0.09720 | 0.00848 | 0.72188 | 5,380,649 |
| 54 | 628,757,160 | 3,521,040 | 773,283 | 0.754986 | 162% | 0% | 0% | 162% | 0.09720 | 0.00848 | 0.71576 | 5,328,433 |
| 55 | 622,655,444 | 3,486,870 | 771,015 | 0.750787 | 162% | 0% | 0% | 162% | 0.09720 | 0.00848 | 0.70969 | 5,276,679 |
| 56 | 616,607,750 | 3,453,003 | 768,754 | 0.746605 | 162% | 0% | 0% | 162% | 0.09720 | 0.00848 | 0.70366 | 5,225,384 |
| 57 | 610,613,612 | 3,419,436 | 766,500 | 0.742439 | 162% | 0% | 0% | 162% | 0.09720 | 0.00848 | 0.69769 | 5,174,543 |
| 58 | 604,672,569 | 3,386,166 | 764,252 | 0.738289 | 162% | 0% | 0% | 162% | 0.09720 | 0.00848 | 0.69177 | 5,124,152 |
| 59 | 598,784,164 | 3,353,191 | 762,011 | 0.734156 | 162% | 0% | 0% | 162% | 0.09720 | 0.00848 | 0.68590 | 5,074,208 |
| 60 | 592,947,945 | 3,320,508 | 759,776 | 0.730040 | 162% | 0% | 0% | 162% | 0.09720 | 0.00848 | 0.68008 | 5,024,707 |
| 61 | 587,163,462 | 3,288,115 | 757,548 | 0.725940 | 162% | 0% | 0% | 162% | 0.09720 | 0.00848 | 0.67431 | 4,975,645 |
| 62 | 581,430,269 | 3,256,010 | 755,327 | 0.721856 | 162% | 0% | 0% | 162% | 0.09720 | 0.00848 | 0.66859 | 4,927,017 |
| 63 | 575,747,924 | 3,224,188 | 753,112 | 0.717788 | 162% | 0% | 0% | 162% | 0.09720 | 0.00848 | 0.66292 | 4,878,822 |
| 64 | 570,115,991 | 3,192,650 | 750,903 | 0.713737 | 162% | 0% | 0% | 162% | 0.09720 | 0.00848 | 0.65729 | 4,831,054 |
| 65 | 564,534,034 | 3,161,391 | 748,701 | 0.709702 | 162% | 0% | 0% | 162% | 0.09720 | 0.00848 | 0.65172 | 4,783,709 |
| 66 | 559,001,623 | 3,130,409 | 746,506 | 0.705684 | 162% | 0% | 0% | 162% | 0.09720 | 0.00848 | 0.64619 | 4,736,786 |
| 67 | 553,518,332 | 3,099,703 | 744,317 | 0.701682 | 162% | 0% | 0% | 162% | 0.09720 | 0.00848 | 0.64070 | 4,690,279 |
| 68 | 548,083,736 | 3,069,269 | 742,134 | 0.697696 | 162% | 0% | 0% | 162% | 0.09720 | 0.00848 | 0.63527 | 4,644,185 |
| 69 | 542,697,418 | 3,039,106 | 739,958 | 0.693726 | 162% | 0% | 0% | 162% | 0.09720 | 0.00848 | 0.62988 | 4,598,500 |
| 70 | 537,358,960 | 3,009,210 | 737,788 | 0.689773 | 162% | 0% | 0% | 162% | 0.09720 | 0.00848 | 0.62453 | 4,553,222 |
| 71 | 532,067,950 | 2,979,581 | 735,624 | 0.685836 | 162% | 0% | 0% | 162% | 0.09720 | 0.00848 | 0.61923 | 4,508,346 |
| 72 | 526,823,980 | 2,950,214 | 733,467 | 0.681915 | 162% | 0% | 0% | 162% | 0.09720 | 0.00848 | 0.61398 | 4,463,869 |
| 73 | 521,626,643 | 2,921,109 | 731,316 | 0.678012 | 162% | 0% | 0% | 162% | 0.09720 | 0.00848 | 0.60877 | 4,419,788 |
| 74 | 516,475,539 | 2,892,263 | 729,171 | 0.674129 | 162% | 0% | 0% | 162% | 0.09720 | 0.00848 | 0.60361 | 4,376,100 |
| 75 | 511,370,268 | 2,863,674 | 727,033 | 0.670265 | 162% | 0% | 0% | 162% | 0.09720 | 0.00848 | 0.59848 | 4,332,800 |
| 76 | 506,310,435 | 2,835,338 | 724,901 | 0.666419 | 162% | 0% | 0% | 162% | 0.09720 | 0.00848 | 0.59341 | 4,289,885 |
| 77 | 501,295,649 | 2,807,256 | 722,775 | 0.662592 | 162% | 0% | 0% | 162% | 0.09720 | 0.00848 | 0.58837 | 4,247,353 |
| 78 | 496,325,521 | 2,779,423 | 720,656 | 0.658783 | 162% | 0% | 0% | 162% | 0.09720 | 0.00848 | 0.58338 | 4,205,199 |

FIG. 6-2A

| 79 | 491,399,666 | 2,751,838 | 718,543 | 0.654993 | 162% | 0% | 0% | 162% | 0.09720 | 0.00848 | 0.57843 | 4,163,421 |
|---|---|---|---|---|---|---|---|---|---|---|---|---|
| 80 | 486,517,702 | 2,724,499 | 716,435 | 0.651221 | 162% | 0% | 0% | 162% | 0.09720 | 0.00848 | 0.57352 | 4,122,016 |
| 81 | 481,679,251 | 2,697,404 | 714,334 | 0.647468 | 162% | 0% | 0% | 162% | 0.09720 | 0.00848 | 0.56865 | 4,080,980 |
| 82 | 476,883,937 | 2,570,550 | 712,240 | 0.643733 | 162% | 0% | 0% | 162% | 0.09720 | 0.00848 | 0.56383 | 4,040,309 |
| 83 | 472,131,388 | 2,643,936 | 710,151 | 0.640016 | 162% | 0% | 0% | 162% | 0.09720 | 0.00848 | 0.55904 | 4,000,002 |
| 84 | 467,421,235 | 2,617,559 | 708,069 | 0.636318 | 162% | 0% | 0% | 162% | 0.09720 | 0.00848 | 0.55430 | 3,960,054 |
| 85 | 462,753,113 | 2,591,417 | 705,992 | 0.632637 | 162% | 0% | 0% | 162% | 0.09720 | 0.00848 | 0.54960 | 3,920,462 |
| 86 | 458,126,659 | 2,565,509 | 703,922 | 0.628975 | 162% | 0% | 0% | 162% | 0.09720 | 0.00848 | 0.54493 | 3,881,224 |
| 87 | 453,541,513 | 2,539,832 | 701,858 | 0.625330 | 162% | 0% | 0% | 162% | 0.09720 | 0.00848 | 0.54031 | 3,842,337 |
| 88 | 448,997,318 | 2,514,385 | 699,799 | 0.621704 | 162% | 0% | 0% | 162% | 0.09720 | 0.00848 | 0.53573 | 3,803,797 |
| 89 | 444,493,721 | 2,489,165 | 697,747 | 0.618095 | 162% | 0% | 0% | 162% | 0.09720 | 0.00848 | 0.53118 | 3,765,602 |
| 90 | 440,030,373 | 2,464,170 | 695,701 | 0.614504 | 162% | 0% | 0% | 162% | 0.09720 | 0.00848 | 0.52667 | 3,727,748 |
| 91 | 435,606,924 | 2,439,399 | 693,661 | 0.610931 | 162% | 0% | 0% | 162% | 0.09720 | 0.00848 | 0.52220 | 3,690,232 |
| 92 | 431,223,031 | 2,414,849 | 691,627 | 0.607375 | 162% | 0% | 0% | 162% | 0.09720 | 0.00848 | 0.51777 | 3,653,052 |
| 93 | 426,878,353 | 2,390,519 | 689,599 | 0.603837 | 162% | 0% | 0% | 162% | 0.09720 | 0.00848 | 0.51338 | 3,616,205 |
| 94 | 422,572,549 | 2,366,406 | 687,576 | 0.600316 | 162% | 0% | 0% | 162% | 0.09720 | 0.00848 | 0.50902 | 3,579,687 |
| 95 | 418,305,286 | 2,342,510 | 685,560 | 0.596813 | 162% | 0% | 0% | 162% | 0.09720 | 0.00848 | 0.50471 | 3,543,497 |
| 96 | 414,076,229 | 2,318,827 | 683,550 | 0.593327 | 162% | 0% | 0% | 162% | 0.09720 | 0.00848 | 0.50042 | 3,507,630 |
| 97 | 498,885,050 | 2,295,356 | 681,545 | 0.589859 | 162% | 0% | 0% | 162% | 0.09720 | 0.00848 | 0.49618 | 3,472,085 |
| 98 | 405,731,419 | 2,272,096 | 679,546 | 0.586408 | 162% | 0% | 0% | 162% | 0.09720 | 0.00848 | 0.49197 | 3,436,859 |

FIG. 6-2B

EFC SERIES SYSTEM
RISK ANALYSIS AND PLANNING MODULE
ASSET POOL PREPAYMENT MODEL
APPLICATIONS PROGRAM OUTPUT

| size adj MP Pool Begin UPB | MP fee strip | MP Interest After Fee Strip | MP Pool scheduled Principal | MP Pool prepay Principal | cleanup call payment | MP Total Principal | MP eom opb | MP Total Pay after fee strip |
|---|---|---|---|---|---|---|---|---|
| | 57,964,425 | 5,150,558 | | | | | | 1,460,743,776 |
| | | 483,036,874 | 198,804,550 | 720,937,927 | 0 | 919,742,477 | | 1,402,779,351 |
| 919,742,477 | 551,845 | 4,598,712 | 806,892 | 747,675 | 0 | 1,554,567 | 918,187,910 | 6,153,279 |
| 918,187,910 | 550,913 | 4,590,940 | 810,751 | 996,702 | 0 | 1,807,453 | 916,380,457 | 6,398,392 |
| 916,380,457 | 549,828 | 4,581,902 | 814,405 | 1,245,288 | 0 | 2,059,693 | 914,320,764 | 6,641,595 |
| 914,320,764 | 548,592 | 4,571,604 | 817,852 | 1,493,227 | 0 | 2,311,079 | 912,009,686 | 6,882,682 |
| 912,009,686 | 547,206 | 4,560,048 | 821,088 | 1,740,312 | 0 | 2,561,400 | 909,448,286 | 7,121,448 |
| 909,448,286 | 545,669 | 4,547,241 | 824,109 | 1,986,338 | 0 | 2,810,447 | 906,637,839 | 7,357,688 |
| 906,637,839 | 543,983 | 4,533,189 | 826,912 | 2,231,099 | 0 | 3,058,011 | 903,579,829 | 7,591,200 |
| 903,579,829 | 542,148 | 4,517,899 | 829,495 | 2,474,389 | 0 | 3,303,884 | 900,275,945 | 7,821,783 |
| 900,275,945 | 540,166 | 4,501,380 | 831,854 | 2,716,006 | 0 | 3,547,859 | 896,728,086 | 8,049,239 |
| 896,728,086 | 538,037 | 4,483,640 | 833,986 | 2,955,745 | 0 | 3,789,731 | 892,938,355 | 8,273,372 |
| 892,938,355 | 535,763 | 4,464,692 | 835,889 | 3,193,407 | 0 | 4,029,297 | 888,909,058 | 8,493,988 |
| 888,909,058 | 533,345 | 4,444,545 | 837,561 | 3,428,792 | 0 | 4,266,354 | 884,642,704 | 8,710,899 |
| 884,642,704 | 530,786 | 4,423,214 | 839,000 | 3,661,703 | 0 | 4,500,703 | 880,142,001 | 8,923,916 |
| 880,142,001 | 528,085 | 4,400,710 | 840,203 | 3,891,945 | 0 | 4,732,148 | 875,409,853 | 9,132,858 |
| 875,409,853 | 525,246 | 4,377,049 | 841,168 | 4,119,326 | 0 | 4,960,494 | 870,449,359 | 9,337,544 |
| 870,449,359 | 522,270 | 4,352,247 | 841,894 | 4,343,658 | 0 | 5,185,552 | 865,263,807 | 9,537,799 |
| 865,263,807 | 519,158 | 4,326,319 | 842,380 | 4,564,754 | 0 | 5,407,134 | 859,856,673 | 9,733,453 |
| 859,856,673 | 515,914 | 4,299,283 | 842,624 | 4,782,432 | 0 | 5,625,056 | 854,231,616 | 9,924,340 |
| 854,231,616 | 512,539 | 4,271,158 | 842,626 | 4,996,514 | 0 | 5,839,140 | 848,392,476 | 10,110,298 |
| 848,392,476 | 509,035 | 4,241,962 | 842,383 | 5,206,826 | 0 | 6,049,209 | 842,343,268 | 10,291,171 |
| 842,343,268 | 505,406 | 4,211,716 | 841,896 | 5,413,196 | 0 | 6,255,093 | 836,088,175 | 10,466,809 |
| 836,088,175 | 501,653 | 4,180,441 | 841,165 | 5,615,460 | 0 | 6,456,625 | 829,631,549 | 10,637,066 |
| 829,631,549 | 497,779 | 4,148,158 | 840,189 | 5,813,458 | 0 | 6,653,646 | 822,977,903 | 10,801,804 |
| 822,977,903 | 493,787 | 4,114,890 | 838,967 | 6,007,032 | 0 | 6,845,999 | 816,131,905 | 10,960,888 |
| 816,131,905 | 489,679 | 4,080,660 | 837,501 | 6,196,032 | 0 | 7,033,533 | 809,098,372 | 11,114,193 |
| 809,098,372 | 485,459 | 4,045,492 | 835,791 | 6,380,313 | 0 | 7,216,104 | 801,882,268 | 11,261,596 |
| 801,882,268 | 481,129 | 4,009,411 | 833,837 | 6,559,736 | 0 | 7,393,573 | 794,488,695 | 11,402,984 |

FIG. 6-3A

| | | | | | | |
|---|---|---|---|---|---|---|
| 794,488,695 | 476,693 | 3,972,443 | 831,640 | 0 | 7,565,807 | 786,922,888 | 11,538,250 |
| 786,922,888 | 472,154 | 3,934,614 | 829,201 | 0 | 7,499,193 | 779,423,695 | 11,433,807 |
| 779,423,695 | 467,654 | 3,897,118 | 826,769 | 0 | 7,433,151 | 771,990,543 | 11,330,270 |
| 771,990,543 | 463,194 | 3,859,953 | 824,345 | 0 | 7,367,677 | 764,622,866 | 11,227,630 |
| 764,622,866 | 458,774 | 3,823,114 | 821,927 | 0 | 7,302,766 | 757,320,100 | 11,125,880 |
| 757,320,100 | 454,392 | 3,786,601 | 819,517 | 0 | 7,238,412 | 750,081,688 | 11,025,013 |
| 750,081,688 | 450,049 | 3,750,408 | 817,114 | 0 | 7,174,612 | 742,907,077 | 10,925,020 |
| 742,907,077 | 445,744 | 3,714,535 | 814,718 | 0 | 7,111,359 | 735,795,717 | 10,825,895 |
| 735,795,717 | 441,477 | 3,678,979 | 812,328 | 0 | 7,048,651 | 728,747,067 | 10,727,629 |
| 728,747,067 | 437,248 | 3,643,735 | 809,946 | 0 | 6,986,481 | 721,760,586 | 10,630,216 |
| 721,760,586 | 433,056 | 3,608,803 | 807,571 | 0 | 6,924,846 | 714,835,740 | 10,533,649 |
| 714,835,740 | 428,901 | 3,574,179 | 805,203 | 0 | 6,863,740 | 707,972,000 | 10,437,919 |
| 707,972,000 | 424,783 | 3,539,860 | 802,842 | 0 | 6,803,160 | 701,168,839 | 10,343,020 |
| 701,168,839 | 420,701 | 3,505,844 | 800,487 | 0 | 6,743,101 | 694,425,738 | 10,248,946 |
| 694,425,738 | 416,655 | 3,472,129 | 798,140 | 0 | 6,683,559 | 687,742,179 | 10,155,687 |
| 687,742,179 | 412,645 | 3,438,711 | 795,799 | 0 | 6,624,528 | 681,117,651 | 10,063,239 |
| 681,117,651 | 408,671 | 3,405,588 | 793,466 | 0 | 6,566,005 | 674,551,646 | 9,971,594 |
| 674,551,646 | 404,731 | 3,372,758 | 791,139 | 0 | 6,507,986 | 668,043,660 | 9,880,744 |
| 668,043,660 | 400,826 | 3,340,218 | 788,819 | 0 | 6,450,465 | 661,593,195 | 9,790,684 |
| 661,593,195 | 396,956 | 3,307,966 | 786,506 | 0 | 6,393,440 | 655,199,755 | 9,701,406 |
| 655,199,755 | 393,120 | 3,275,999 | 784,199 | 0 | 6,336,905 | 648,862,850 | 9,612,903 |
| 648,862,850 | 389,318 | 3,244,314 | 781,899 | 0 | 6,280,856 | 642,581,995 | 9,525,170 |
| 642,581,995 | 385,549 | 3,212,910 | 779,607 | 0 | 6,225,289 | 636,356,705 | 9,438,199 |
| 636,356,705 | 381,814 | 3,181,784 | 777,320 | 0 | 6,170,201 | 630,186,504 | 9,351,985 |

FIG. 6-3B

EFC SERIES SYSTEM
RISK ANALYSIS AND PLANNING MODULE
ASSET POOL PREPAYMENT MODEL
APPLICATIONS PROGRAM OUTPUT

| size adj MP Pool Begin UPB | MP fee strip | MP Interest After Fee Strip | MP Pool scheduled Principal | MP Pool prepay Principal | cleanup call payment | MP Total Principal | MP eom opb | MP Total Pay after fee strip |
|---|---|---|---|---|---|---|---|---|
| 630,186,504 | 378,112 | 3,150,933 | 775,041 | 5,340,546 | 0 | 6,115,587 | 624,070,917 | 9,266,519 |
| 624,070,917 | 374,443 | 3,120,355 | 772,768 | 5,288,675 | 0 | 6,061,443 | 618,009,474 | 9,181,797 |
| 618,009,474 | 370,806 | 3,090,047 | 770,502 | 5,237,263 | 0 | 6,007,765 | 612,001,710 | 9,097,812 |
| 612,001,710 | 367,201 | 3,060,009 | 768,242 | 5,186,306 | 0 | 5,954,548 | 606,047,161 | 9,014,557 |
| 606,047,161 | 363,628 | 3,030,236 | 765,990 | 5,135,801 | 0 | 5,901,790 | 600,145,371 | 8,932,026 |
| 600,145,371 | 360,087 | 3,000,727 | 763,743 | 5,085,743 | 0 | 5,849,487 | 594,295,884 | 8,850,214 |
| 594,295,884 | 356,578 | 2,971,479 | 761,504 | 5,036,130 | 0 | 5,797,633 | 588,498,251 | 8,769,113 |
| 588,498,251 | 353,099 | 2,942,491 | 759,271 | 4,986,956 | 0 | 5,746,226 | 582,752,025 | 8,688,717 |
| 582,752,025 | 349,651 | 2,913,760 | 757,044 | 4,938,218 | 0 | 5,695,262 | 577,056,763 | 8,609,022 |
| 577,056,763 | 346,234 | 2,885,284 | 754,824 | 4,889,913 | 0 | 5,644,737 | 571,412,026 | 8,530,020 |
| 571,412,026 | 342,847 | 2,857,060 | 752,610 | 4,842,036 | 0 | 5,594,646 | 565,817,380 | 8,451,706 |
| 565,817,380 | 339,490 | 2,829,087 | 750,403 | 4,794,584 | 0 | 5,544,988 | 560,272,392 | 8,374,074 |
| 560,272,392 | 336,163 | 2,801,362 | 748,203 | 4,747,554 | 0 | 5,495,756 | 554,776,636 | 8,297,188 |
| 554,776,636 | 332,866 | 2,773,883 | 746,009 | 4,700,941 | 0 | 5,446,950 | 549,329,686 | 8,220,833 |
| 549,329,686 | 329,598 | 2,746,648 | 743,821 | 4,654,742 | 0 | 5,398,563 | 543,931,123 | 8,145,212 |
| 543,931,123 | 326,359 | 2,719,656 | 741,640 | 4,608,954 | 0 | 5,350,594 | 538,580,529 | 8,070,249 |
| 538,580,529 | 323,148 | 2,692,903 | 739,465 | 4,563,573 | 0 | 5,303,038 | 533,277,492 | 7,995,940 |
| 533,277,492 | 319,966 | 2,666,387 | 737,296 | 4,518,595 | 0 | 5,255,891 | 528,021,600 | 7,922,279 |
| 528,021,600 | 316,813 | 2,640,108 | 735,134 | 4,474,017 | 0 | 5,209,151 | 522,812,449 | 7,849,259 |
| 522,812,449 | 313,687 | 2,614,062 | 732,979 | 4,429,836 | 0 | 5,162,814 | 517,649,635 | 7,776,877 |
| 517,649,635 | 310,590 | 2,588,248 | 730,829 | 4,386,048 | 0 | 5,116,877 | 512,532,758 | 7,705,125 |
| 512,532,758 | 307,520 | 2,562,664 | 728,686 | 4,342,649 | 0 | 5,071,335 | 507,461,423 | 7,633,999 |
| 507,461,423 | 304,477 | 2,537,307 | 726,549 | 4,299,637 | 0 | 5,026,186 | 502,435,236 | 7,563,493 |
| 502,435,236 | 301,461 | 2,512,176 | 724,418 | 4,257,008 | 0 | 4,981,427 | 497,453,810 | 7,493,603 |
| 497,453,810 | 298,472 | 2,487,269 | 722,294 | 4,214,759 | 0 | 4,937,053 | 492,516,757 | 7,424,322 |
| 492,516,757 | 295,510 | 2,462,584 | 720,176 | 4,172,886 | 0 | 4,893,062 | 487,623,695 | 7,355,646 |
| 487,623,695 | 292,574 | 2,438,118 | 718,064 | 4,131,386 | 0 | 4,849,450 | 482,774,244 | 7,287,569 |
| 482,774,244 | 289,665 | 2,413,871 | 715,958 | 4,090,257 | 0 | 4,806,215 | 477,968,029 | 7,220,086 |
| 477,968,029 | 286,781 | 2,389,840 | 713,859 | 4,049,494 | 0 | 4,763,353 | 473,204,677 | 7,153,193 |
| 473,204,677 | 283,923 | 2,366,023 | 711,765 | 4,009,095 | 0 | 4,720,860 | 468,483,817 | 7,086,883 |

FIG. 6-4A

| | | | | | | |
|---|---|---|---|---|---|---|
| 468,483,817 | 281,090 | 2,342,419 | 709,678 | 3,969,056 | 0 | 4,678,734 | 463,805,082 | 7,021,153 |
| 463,805,082 | 278,283 | 2,319,025 | 707,597 | 3,929,375 | 0 | 4,636,972 | 459,168,111 | 6,955,997 |
| 459,168,111 | 275,501 | 2,295,841 | 705,522 | 3,890,048 | 0 | 4,595,570 | 454,572,541 | 6,891,410 |
| 454,572,541 | 272,744 | 2,272,863 | 703,453 | 3,851,072 | 0 | 4,554,525 | 450,018,016 | 6,827,388 |
| 450,018,016 | 270,011 | 2,250,090 | 701,390 | 3,812,444 | 0 | 4,513,834 | 445,504,182 | 6,763,925 |
| 445,504,182 | 267,303 | 2,227,521 | 699,333 | 3,774,162 | 0 | 4,473,495 | 441,030,687 | 6,701,016 |
| 441,030,687 | 264,618 | 2,205,153 | 697,283 | 3,736,222 | 0 | 4,433,504 | 436,597,182 | 6,638,658 |
| 436,597,182 | 261,958 | 2,182,986 | 695,238 | 3,698,621 | 0 | 4,393,859 | 432,203,324 | 6,576,845 |
| 432,203,324 | 259,322 | 2,161,017 | 693,199 | 3,661,356 | 0 | 4,354,555 | 427,848,768 | 6,515,572 |
| 427,848,768 | 256,709 | 2,139,244 | 691,166 | 3,624,425 | 0 | 4,315,591 | 423,533,177 | 6,454,835 |
| 423,533,177 | 254,120 | 2,117,666 | 689,139 | 3,587,825 | 0 | 4,276,964 | 419,256,213 | 6,394,630 |
| 419,256,213 | 251,554 | 2,096,281 | 687,118 | 3,551,552 | 0 | 4,238,670 | 415,017,542 | 6,334,951 |
| 415,017,542 | 249,011 | 2,075,088 | 685,103 | 3,515,604 | 0 | 4,200,707 | 410,816,835 | 6,275,795 |
| 410,816,835 | 246,490 | 2,054,084 | 683,094 | 3,479,978 | 0 | 4,163,073 | 406,653,762 | 6,217,157 |
| 406,653,762 | 243,992 | 2,033,269 | 681,091 | 3,444,672 | 0 | 4,125,763 | 402,527,999 | 6,159,032 |
| 402,527,999 | 241,517 | 2,012,640 | 679,094 | 3,409,681 | 0 | 4,088,775 | 398,439,224 | 6,101,415 |
| 398,439,224 | 239,064 | 1,992,196 | 677,102 | 3,375,005 | 0 | 4,052,108 | 394,387,116 | 6,044,304 |

FIG. 6-4B

FIG. 6-5
NOTATION TABLE

EFC SERIES SYSTEM
RISK ANALYSIS AND PLANNING MODULE
ASSET POOL PREPAYMENT MODEL
APPLICATIONS PROGRAM OUTPUT

| | |
|---|---|
| loan mo | loan month; asset pool calculations are made monthly counting consecutively from asset pool origination. |
| mortgages bom opb from orign | mortgages beginning of month outstanding principal balance remaining from original asset pool. |
| mortgages interest from orign | mortgages monthly interest payment from original asset pool. |
| scheduled principal from orign | mortgages monthly scheduled principal payment from original asset pool. |
| forward discount factors | factor discounting value of monthly cash flow to the time of asset pool origination. |
| base line PSA | base line Public Securities Association prepayment benchmark used to project asset pool prepayments. |
| low range adj to base PSA | low range risk adjustment factor to base line PSA. |
| high range adj to base PSA | high range risk adjustment factor to base line PSA. |
| final variable PSA | final risk adjusted variable PSA used to generate prepayments for the cash flow scenario. |
| CPR at 162% PSA | Constant Prepayment Rate factor corresponding to the final variable PSA. |
| WAC Adj SMM at PSA = 162% | Weighted Average Coupon Adjusted Single-Monthly Mortality rate corresponding to the final variable PSA. |
| Cumulative Prepay Factor | Cumulative Prepayment Factor from the time of the asset pool origination to the relevant month. |
| mortgages Prepay Principal | mortgages Prepayment Principal amount for the month. |
| size adj MP Pool Begin UPB | size adjusted Mortgage Participation Pool Beginning Unpaid Principal Balance; original asset pool adjusted for aging of mortgages at the time of the asset pool origination. |
| MP fee strip | Mortgage Participation fee strip; servicing fee calculated as a percentage of adjusted asset pool outstanding principal balance. |
| MP Interest After Fee Strip | Mortgage Participation Interest After Fee Strip; adjusted asset pool monthly interest payment less servicing fees. |
| MP Pool scheduled Principal | Mortgage Participation Pool scheduled Principal; adjusted asset pool monthly scheduled principal payments. |
| MP Pool prepay Principal | Mortgage Participation Pool prepayment Principal; adjusted asset pool monthly prepayment principal amounts. |
| cleanup call payment | adjusted asset pool remaining principal balance at the time the pool's cleanup call is exercised. |
| MP Total Principal | Mortgage Participation Total Principal; the sum of the adjusted asset pool's monthly scheduled principal payment amount, prepayment principal amount and cleanup call principal payment amount. |
| MP eom opb | Mortgage Participation end of month outstanding principal balance. |
| MP Total Pay after fee strip | Mortgage Participation Total Payments after fee strip; total adjusted asset pool monthly payment less servicing fee. |

EFC SERIES SYSTEM
RISK ANALYSIS AND PLANNING MODULE
DERIVATIVES MODEL
APPLICATIONS PROGRAM OUTPUT

| CDX (to 25%) | CDTX (to 25%) | disp libd0 < <libd1 libd0= libd1= libd2= | disp fibd2< <libd3 1.70% 4.60% 5.20% | disp libd4 < <libd5 libd3= libd4= libd5= | libor after disp 10.20% 9.10% 16.00% | d3 contrib to cor d1= d2= d3= | d2 contrib to cor 0.20 0.10 0.10 | d1 contrib to cor term= trunc pt= | Z-CDTX with disp (to 25%) 5.00 3.80% | CDY(inv) from Z norm to inf | mean est from CDY (inv) mean/adj= vol= | cor from CDY 6.7583% 15.00% | cap from CDY cor in bp 663.70 |
|---|---|---|---|---|---|---|---|---|---|---|---|---|---|
| 0.11% | 0.07% | -0.11% | 0.00% | 0.00% | 3.89% | 0.000 | 0.000 | 0.000 | 0.02% | 99.98% | 0.00% | 1.00 | 263.71 |
| 0.11% | 0.08% | -0.11% | 0.00% | 0.00% | 3.90% | 0.000 | 0.000 | 0.000 | 0.03% | 99.97% | 0.00% | 1.00 | 262.71 |
| 0.12% | 0.08% | -0.11% | 0.00% | 0.00% | 3.91% | 0.000 | 0.000 | 0.000 | 0.03% | 99.97% | 0.00% | 1.00 | 261.71 |
| 0.13% | 0.09% | -0.11% | 0.00% | 0.00% | 3.92% | 0.000 | 0.000 | 0.000 | 0.04% | 99.96% | 0.00% | 1.00 | 260.71 |
| 0.13% | 0.10% | -0.10% | 0.00% | 0.00% | 3.94% | 0.000 | 0.000 | 0.000 | 0.04% | 99.96% | 0.00% | 1.00 | 259.71 |
| 0.14% | 0.10% | -0.10% | 0.00% | 0.00% | 3.95% | 0.000 | 0.000 | 0.000 | 0.05% | 99.95% | 0.00% | 1.00 | 258.71 |
| 0.15% | 0.11% | -0.10% | 0.00% | 0.00% | 3.96% | 0.000 | 0.000 | 0.000 | 0.05% | 99.95% | 0.00% | 1.00 | 257.71 |
| 0.15% | 0.12% | -0.10% | 0.00% | 0.00% | 3.97% | 0.000 | 0.000 | 0.000 | 0.06% | 99.94% | 0.00% | 1.00 | 256.71 |
| 0.16% | 0.12% | -0.10% | 0.00% | 0.00% | 3.98% | 0.000 | 0.000 | 0.000 | 0.06% | 99.94% | 0.00% | 1.00 | 255.71 |
| 0.17% | 0.13% | -0.10% | 0.00% | 0.00% | 3.99% | 0.000 | 0.000 | 0.000 | 0.07% | 99.93% | 0.00% | 1.00 | 254.71 |
| 0.18% | 0.14% | -0.09% | 0.00% | 0.00% | 4.01% | 0.000 | 0.000 | 0.000 | 0.07% | 99.92% | 0.00% | 1.00 | 253.71 |
| 0.18% | 0.15% | -0.09% | 0.00% | 0.00% | 4.02% | 0.000 | 0.000 | 0.000 | 0.08% | 99.92% | 0.00% | 1.00 | 252.71 |
| 0.19% | 0.16% | -0.09% | 0.00% | 0.00% | 4.03% | 0.000 | 0.000 | 0.000 | 0.09% | 99.91% | 0.00% | 1.00 | 251.71 |
| 0.20% | 0.17% | -0.09% | 0.00% | 0.00% | 4.04% | 0.000 | 0.000 | 0.000 | 0.10% | 99.90% | 0.00% | 1.00 | 250.71 |
| 0.21% | 0.18% | -0.09% | 0.00% | 0.00% | 4.05% | 0.000 | 0.000 | 0.000 | 0.10% | 99.90% | 0.00% | 1.00 | 249.71 |
| 0.22% | 0.19% | -0.08% | 0.00% | 0.00% | 4.07% | 0.000 | 0.000 | 0.000 | 0.11% | 99.89% | 0.00% | 1.00 | 248.71 |
| 0.23% | 0.20% | -0.08% | 0.00% | 0.00% | 4.08% | 0.000 | 0.000 | 0.000 | 0.12% | 99.88% | 0.00% | 1.00 | 247.72 |
| 0.24% | 0.21% | -0.08% | 0.00% | 0.00% | 4.09% | 0.000 | 0.000 | 0.000 | 0.13% | 99.87% | 0.00% | 1.00 | 246.72 |
| 0.25% | 0.22% | -0.08% | 0.00% | 0.00% | 4.10% | 0.000 | 0.000 | 0.000 | 0.14% | 99.86% | 0.00% | 1.00 | 245.72 |
| 0.27% | 0.23% | -0.08% | 0.00% | 0.00% | 4.11% | 0.000 | 0.000 | 0.000 | 0.15% | 99.85% | 0.00% | 1.00 | 244.72 |
| 0.28% | 0.24% | -0.08% | 0.00% | 0.00% | 4.12% | 0.000 | 0.000 | 0.000 | 0.16% | 99.84% | 0.00% | 1.00 | 243.72 |
| 0.29% | 0.25% | -0.07% | 0.00% | 0.00% | 4.14% | 0.000 | 0.000 | 0.000 | 0.17% | 99.83% | 0.00% | 1.00 | 242.72 |
| 0.30% | 0.27% | -0.07% | 0.00% | 0.00% | 4.15% | 0.000 | 0.000 | 0.000 | 0.18% | 99.82% | 0.00% | 1.00 | 241.72 |
| 0.32% | 0.28% | -0.07% | 0.00% | 0.00% | 4.16% | 0.000 | 0.000 | 0.000 | 0.20% | 99.80% | 0.00% | 1.00 | 240.73 |
| 0.33% | 0.29% | -0.07% | 0.00% | 0.00% | 4.17% | 0.000 | 0.000 | 0.000 | 0.21% | 99.79% | 0.00% | 1.00 | 239.73 |
| 0.34% | 0.31% | -0.07% | 0.00% | 0.00% | 4.18% | 0.000 | 0.000 | 0.000 | 0.22% | 99.78% | 0.00% | 1.00 | 238.73 |
| 0.36% | 0.32% | -0.06% | 0.00% | 0.00% | 4.20% | 0.000 | 0.000 | 0.000 | 0.23% | 99.77% | 0.00% | 1.00 | 237.73 |

FIG. 7-1A

| | | | | | | | | | | |
|---|---|---|---|---|---|---|---|---|---|---|
| 0.38% | 0.34% | -0.06% | 0.00% | 4.21% | 0.000 | 0.000 | 0.25% | 99.75% | 0.00% | 1.00 | 236.73 |
| 0.39% | 0.35% | -0.06% | 0.00% | 4.22% | 0.000 | 0.000 | 0.26% | 99.74% | 0.00% | 1.00 | 235.74 |
| 0.41% | 0.37% | -0.06% | 0.00% | 4.23% | 0.000 | 0.000 | 0.28% | 99.72% | 0.00% | 1.00 | 234.74 |
| 0.42% | 0.39% | -0.06% | 0.00% | 4.24% | 0.000 | 0.000 | 0.30% | 99.70% | 0.00% | 1.00 | 233.74 |
| 0.44% | 0.41% | -0.06% | 0.00% | 4.25% | 0.000 | 0.000 | 0.31% | 99.69% | 0.00% | 1.00 | 232.75 |
| 0.46% | 0.42% | -0.05% | 0.00% | 4.27% | 0.000 | 0.000 | 0.33% | 99.67% | 0.00% | 1.00 | 231.75 |
| 0.48% | 0.44% | -0.05% | 0.00% | 4.28% | 0.000 | 0.000 | 0.35% | 99.65% | 0.00% | 1.00 | 230.75 |
| 0.50% | 0.46% | -0.05% | 0.00% | 4.29% | 0.000 | 0.000 | 0.37% | 99.63% | 0.00% | 1.00 | 229.76 |
| 0.52% | 0.48% | -0.05% | 0.00% | 4.30% | 0.000 | 0.000 | 0.39% | 99.61% | 0.00% | 1.00 | 228.76 |
| 0.54% | 0.50% | -0.05% | 0.00% | 4.31% | 0.000 | 0.000 | 0.41% | 99.59% | 0.00% | 1.00 | 227.76 |
| 0.56% | 0.53% | -0.04% | 0.00% | 4.33% | 0.000 | 0.000 | 0.43% | 99.57% | 0.00% | 1.00 | 226.77 |
| 0.59% | 0.55% | -0.04% | 0.00% | 4.34% | 0.000 | 0.000 | 0.46% | 99.54% | 0.00% | 1.00 | 225.77 |
| 0.61% | 0.57% | -0.04% | 0.00% | 4.35% | 0.000 | 0.000 | 0.48% | 99.52% | 0.00% | 1.00 | 224.78 |
| 0.63% | 0.60% | -0.04% | 0.00% | 4.36% | 0.000 | 0.000 | 0.51% | 99.49% | 0.00% | 1.00 | 223.78 |
| 0.66% | 0.62% | -0.04% | 0.00% | 4.37% | 0.000 | 0.000 | 0.53% | 99.47% | 0.00% | 0.99 | 222.79 |
| 0.68% | 0.65% | -0.04% | 0.00% | 4.38% | 0.000 | 0.000 | 0.56% | 99.44% | 0.00% | 0.99 | 221.79 |
| 0.71% | 0.67% | -0.03% | 0.00% | 4.40% | 0.000 | 0.000 | 0.59% | 99.41% | 0.00% | 0.99 | 220.80 |
| 0.74% | 0.70% | -0.03% | 0.00% | 4.41% | 0.000 | 0.000 | 0.62% | 99.38% | 0.00% | 0.99 | 219.80 |
| 0.76% | 0.73% | -0.03% | 0.00% | 4.42% | 0.000 | 0.000 | 0.65% | 99.35% | 0.00% | 0.99 | 218.81 |
| 0.79% | 0.76% | -0.03% | 0.00% | 4.43% | 0.000 | 0.000 | 0.68% | 99.32% | 0.00% | 0.99 | 217.82 |
| 0.82% | 0.79% | -0.03% | 0.00% | 4.44% | 0.000 | 0.000 | 0.71% | 99.29% | 0.00% | 0.99 | 216.82 |
| 0.85% | 0.82% | -0.02% | 0.00% | 4.46% | 0.000 | 0.000 | 0.75% | 99.25% | 0.00% | 0.99 | 215.83 |
| 0.88% | 0.85% | -0.02% | 0.00% | 4.47% | 0.000 | 0.000 | 0.78% | 99.22% | 0.00% | 0.99 | 214.84 |
| 0.92% | 0.88% | -0.02% | 0.00% | 4.48% | 0.000 | 0.000 | 0.82% | 99.18% | 0.00% | 0.99 | 213.84 |
| 0.95% | 0.91% | -0.02% | 0.00% | 4.49% | 0.000 | 0.000 | 0.85% | 99.15% | 0.00% | 0.99 | 212.85 |
| 0.98% | 0.95% | -0.02% | 0.00% | 4.50% | 0.000 | 0.000 | 0.89% | 99.11% | 0.00% | 0.99 | 211.86 |
| 1.02% | 0.98% | -0.01% | 0.00% | 4.52% | 0.000 | 0.000 | 0.93% | 99.07% | 0.00% | 0.99 | 210.87 |
| 1.06% | 1.02% | -0.01% | 0.00% | 4.53% | 0.000 | 0.000 | 0.98% | 99.02% | 0.00% | 0.99 | 209.88 |
| 1.09% | 1.06% | -0.01% | 0.00% | 4.54% | 0.000 | 0.000 | 1.02% | 98.98% | 0.00% | 0.99 | 208.89 |
| 1.13% | 1.10% | -0.01% | 0.00% | 4.55% | 0.000 | 0.000 | 1.07% | 98.93% | 0.00% | 0.99 | 207.90 |

FIG. 7-1B

EFC SERIES SYSTEM
RISK ANALYSIS AND PLANNING MODULE
DERIVATIVES MODEL
APPLICATIONS PROGRAM OUTPUT

| CDX (to 25%) | CDTX (to 25%) | disp libd0 < <libd1 libd0= libd1= libd2= | disp libd2< <libd3 1.70% 4.60% 5.20% | disp libd4 < <libd5 libd3= libd4= libd5= | libor after disp 10.20% 9.10% 16.00% | d3 contrib to cor d1= d2= d3= | d2 contrib to cor 0.20 0.10 0.10 | d1 contrib to cor term= trunc pt= | Z-CDTX with disp (to 25%) 5.00 3.80% | CDY(inv) from Z norm to inf | mean est from CDY (inv) mean/adj= vol= | cor from CDY 6.7583% 15.00% | cap from CDY cor in bp 663.70 |
|---|---|---|---|---|---|---|---|---|---|---|---|---|---|
| 1.17% | 1.14% | -0.01% | 0.00% | 0.00% | 4.56% | 0.000 | 0.000 | 0.000 | 1.11% | 98.89% | 0.00% | 0.99 | 206.91 |
| 1.21% | 1.18% | 0.00% | 0.00% | 0.00% | 4.58% | 0.000 | 0.000 | 0.000 | 1.16% | 98.84% | 0.00% | 0.99 | 205.92 |
| 1.26% | 1.22% | 0.00% | 0.00% | 0.00% | 4.59% | 0.000 | 0.000 | 0.000 | 1.21% | 98.79% | 0.00% | 0.99 | 204.93 |
| 1.30% | 1.26% | 0.00% | 0.00% | 0.00% | 4.60% | 0.000 | 0.000 | 0.000 | 1.26% | 98.74% | 0.00% | 0.99 | 203.95 |
| 1.34% | 1.31% | 0.00% | 0.00% | 0.00% | 4.61% | 0.000 | 0.000 | 0.000 | 1.31% | 98.69% | 0.00% | 0.99 | 202.96 |
| 1.39% | 1.35% | 0.00% | 0.00% | 0.00% | 4.62% | 0.000 | 0.000 | 0.000 | 1.35% | 98.65% | 0.00% | 0.99 | 201.97 |
| 1.43% | 1.40% | 0.00% | 0.00% | 0.00% | 4.63% | 0.000 | 0.000 | 0.000 | 1.40% | 98.60% | 0.00% | 0.99 | 200.98 |
| 1.48% | 1.45% | 0.00% | 0.00% | 0.00% | 4.64% | 0.000 | 0.000 | 0.000 | 1.45% | 98.55% | 0.00% | 0.99 | 200.00 |
| 1.53% | 1.50% | 0.00% | 0.00% | 0.00% | 4.65% | 0.000 | 0.000 | 0.000 | 1.50% | 98.50% | 0.00% | 0.99 | 199.01 |
| 1.58% | 1.55% | 0.00% | 0.00% | 0.00% | 4.66% | 0.000 | 0.000 | 0.000 | 1.55% | 98.45% | 0.00% | 0.98 | 198.03 |
| 1.63% | 1.60% | 0.00% | 0.00% | 0.00% | 4.67% | 0.000 | 0.000 | 0.000 | 1.60% | 98.40% | 0.00% | 0.98 | 197.04 |
| 1.69% | 1.65% | 0.00% | 0.00% | 0.00% | 4.68% | 0.000 | 0.000 | 0.000 | 1.65% | 98.35% | 0.00% | 0.98 | 196.06 |
| 1.74% | 1.70% | 0.00% | 0.00% | 0.00% | 4.69% | 0.000 | 0.000 | 0.000 | 1.70% | 98.30% | 0.00% | 0.98 | 195.08 |
| 1.80% | 1.76% | 0.00% | 0.00% | 0.00% | 4.70% | 0.000 | 0.000 | 0.000 | 1.76% | 98.24% | 0.00% | 0.98 | 194.09 |
| 1.85% | 1.82% | 0.00% | 0.00% | 0.00% | 4.71% | 0.000 | 0.000 | 0.000 | 1.82% | 98.18% | 0.00% | 0.98 | 193.11 |
| 1.91% | 1.88% | 0.00% | 0.00% | 0.00% | 4.72% | 0.000 | 0.000 | 0.000 | 1.88% | 98.12% | 0.00% | 0.98 | 192.13 |
| 1.97% | 1.94% | 0.00% | 0.00% | 0.00% | 4.73% | 0.000 | 0.000 | 0.000 | 1.94% | 98.06% | 0.00% | 0.98 | 191.15 |
| 2.03% | 2.00% | 0.00% | 0.00% | 0.00% | 4.74% | 0.000 | 0.000 | 0.000 | 2.00% | 98.00% | 0.00% | 0.98 | 190.17 |
| 2.10% | 2.06% | 0.00% | 0.00% | 0.00% | 4.75% | 0.000 | 0.000 | 0.000 | 2.06% | 97.94% | 0.00% | 0.98 | 189.19 |
| 2.16% | 2.13% | 0.00% | 0.00% | 0.00% | 4.76% | 0.000 | 0.000 | 0.000 | 2.13% | 97.87% | 0.00% | 0.98 | 188.21 |
| 2.23% | 2.19% | 0.00% | 0.00% | 0.00% | 4.77% | 0.000 | 0.000 | 0.000 | 2.19% | 97.81% | 0.00% | 0.98 | 187.23 |
| 2.30% | 2.26% | 0.00% | 0.00% | 0.00% | 4.78% | 0.000 | 0.000 | 0.000 | 2.26% | 97.74% | 0.00% | 0.98 | 186.25 |
| 2.36% | 2.33% | 0.00% | 0.00% | 0.00% | 4.79% | 0.000 | 0.000 | 0.000 | 2.33% | 97.67% | 0.00% | 0.98 | 185.27 |
| 2.44% | 2.40% | 0.00% | 0.00% | 0.00% | 4.80% | 0.000 | 0.000 | 0.000 | 2.40% | 97.60% | 0.00% | 0.98 | 184.30 |
| 2.51% | 2.47% | 0.00% | 0.00% | 0.00% | 4.81% | 0.000 | 0.000 | 0.000 | 2.47% | 97.53% | 0.00% | 0.98 | 183.32 |
| 2.58% | 2.55% | 0.00% | 0.00% | 0.00% | 4.82% | 0.000 | 0.000 | 0.000 | 2.55% | 97.45% | 0.00% | 0.97 | 182.35 |
| 2.66% | 2.62% | 0.00% | 0.00% | 0.00% | 4.83% | 0.000 | 0.000 | 0.000 | 2.62% | 97.38% | 0.00% | 0.97 | 181.37 |

FIG. 7-2A

| | | | | | | | | |
|---|---|---|---|---|---|---|---|---|
| 2.73% | 2.70% | 0.00% | 0.00% | 4.84% | 0.000 | 0.000 | 2.70% | 97.30% | 0.00% | 0.97 | 180.40 |
| 2.81% | 2.78% | 0.00% | 0.00% | 4.85% | 0.000 | 0.000 | 2.78% | 97.22% | 0.00% | 0.97 | 179.42 |
| 2.89% | 2.86% | 0.00% | 0.00% | 4.86% | 0.000 | 0.000 | 2.86% | 97.14% | 0.00% | 0.97 | 178.45 |
| 2.98% | 2.94% | 0.00% | 0.00% | 4.87% | 0.000 | 0.000 | 2.94% | 97.06% | 0.00% | 0.97 | 177.48 |
| 3.06% | 3.02% | 0.00% | 0.00% | 4.88% | 0.000 | 0.000 | 3.02% | 96.98% | 0.00% | 0.97 | 176.51 |
| 3.15% | 3.11% | 0.00% | 0.00% | 4.89% | 0.000 | 0.000 | 3.11% | 96.89% | 0.00% | 0.97 | 175.54 |
| 3.23% | 3.20% | 0.00% | 0.00% | 4.90% | 0.000 | 0.000 | 3.20% | 96.80% | 0.00% | 0.97 | 174.47 |
| 3.32% | 3.29% | 0.00% | 0.00% | 4.91% | 0.000 | 0.000 | 3.29% | 96.71% | 0.00% | 0.97 | 173.60 |
| 3.42% | 3.38% | 0.00% | 0.00% | 4.92% | 0.000 | 0.000 | 3.38% | 96.62% | 0.00% | 0.97 | 172.64 |
| 3.51% | 3.47% | 0.00% | 0.00% | 4.93% | 0.000 | 0.000 | 3.47% | 96.53% | 0.00% | 0.97 | 171.67 |
| 3.60% | 3.57% | 0.00% | 0.00% | 4.94% | 0.000 | 0.000 | 3.57% | 96.43% | 0.00% | 0.96 | 170.70 |
| 3.70% | 3.67% | 0.00% | 0.00% | 4.95% | 0.000 | 0.000 | 3.67% | 96.33% | 0.00% | 0.96 | 169.74 |
| 3.80% | 3.77% | 0.00% | 0.00% | 4.96% | 0.000 | 0.000 | 3.77% | 96.23% | 0.00% | 0.96 | 168.85 |
| 3.90% | 3.87% | 0.00% | 0.00% | 4.97% | 0.000 | 0.000 | 3.87% | 96.13% | 0.00% | 0.96 | 167.81 |
| 4.00% | 3.97% | 0.00% | 0.00% | 4.98% | 0.000 | 0.000 | 3.97% | 96.03% | 0.00% | 0.96 | 166.85 |
| 4.11% | 4.07% | 0.00% | 0.00% | 4.99% | 0.000 | 0.000 | 4.07% | 95.93% | 0.01% | 0.96 | 165.89 |
| 4.22% | 4.18% | 0.00% | 0.00% | 5.00% | 0.000 | 0.000 | 4.18% | 95.82% | 0.01% | 0.96 | 164.93 |
| 4.33% | 4.29% | 0.00% | 0.00% | 5.01% | 0.000 | 0.000 | 4.29% | 95.71% | 0.01% | 0.96 | 163.98 |
| 4.44% | 4.40% | 0.00% | 0.00% | 5.02% | 0.000 | 0.000 | 4.40% | 95.60% | 0.01% | 0.96 | 163.02 |
| 4.55% | 4.51% | 0.00% | 0.00% | 5.03% | 0.000 | 0.000 | 4.51% | 95.49% | 0.01% | 0.95 | 162.06 |
| 4.67% | 4.63% | 0.00% | 0.00% | 5.04% | 0.000 | 0.000 | 4.63% | 95.37% | 0.01% | 0.95 | 161.11 |
| 4.78% | 4.75% | 0.00% | 0.00% | 5.05% | 0.000 | 0.000 | 4.75% | 95.25% | 0.01% | 0.95 | 160.15 |
| 4.90% | 4.87% | 0.00% | 0.00% | 5.06% | 0.000 | 0.000 | 4.87% | 95.13% | 0.01% | 0.95 | 159.20 |
| 5.02% | 4.99% | 0.00% | 0.00% | 5.07% | 0.000 | 0.000 | 4.99% | 95.01% | 0.01% | 0.95 | 158.25 |
| 5.15% | 5.11% | 0.00% | 0.00% | 5.08% | 0.000 | 0.000 | 5.11% | 94.89% | 0.01% | 0.95 | 157.30 |
| 5.27% | 5.24% | 0.00% | 0.00% | 5.09% | 0.000 | 0.000 | 5.24% | 94.76% | 0.01% | 0.95 | 156.35 |
| 5.40% | 5.37% | 0.00% | 0.00% | 5.10% | 0.000 | 0.000 | 5.37% | 94.63% | 0.01% | 0.95 | 155.40 |
| 5.53% | 5.50% | 0.00% | 0.00% | 5.11% | 0.000 | 0.000 | 5.50% | 94.50% | 0.01% | 0.95 | 154.46 |

FIG. 7-2B

EFC SECURITIES SYSTEM
RISK ANALYSIS AND PLANNING MODULE
DERIVATIVES MODEL
APPLICATIONS PROGRAM OUTPUT

| libor | libor with d3 & d2 only | Z1=Z less d1 disp | CDY1(inv) from Z1 cap=25% | cor from CDY1 | libor with d3 only | ZZ=Z less d1 & d2 disp | CDY2(inv) from Z2 cap=25% | cor from CDY2 | from CDTX cap=25% | cor from CDY3 |
|---|---|---|---|---|---|---|---|---|---|---|
| 4.00% | 4.00% | 0.07% | 99.93% | 1.00 | 4.00% | 0.07% | 99.93% | 1.00 | 99.93% | 1.00 |
| 4.01% | 4.01% | 0.08% | 99.92% | 1.00 | 4.01% | 0.08% | 99.92% | 1.00 | 99.92% | 1.00 |
| 4.02% | 4.02% | 0.08% | 99.92% | 1.00 | 4.02% | 0.08% | 99.92% | 1.00 | 99.92% | 1.00 |
| 4.03% | 4.03% | 0.09% | 99.91% | 1.00 | 4.03% | 0.09% | 99.91% | 1.00 | 99.91% | 1.00 |
| 4.04% | 4.04% | 0.10% | 99.90% | 1.00 | 4.04% | 0.10% | 99.90% | 1.00 | 99.90% | 1.00 |
| 4.05% | 4.05% | 0.10% | 99.90% | 1.00 | 4.05% | 0.10% | 99.90% | 1.00 | 99.90% | 1.00 |
| 4.06% | 4.06% | 0.11% | 99.89% | 1.00 | 4.06% | 0.11% | 99.89% | 1.00 | 99.89% | 1.00 |
| 4.07% | 4.07% | 0.12% | 99.88% | 1.00 | 4.07% | 0.12% | 99.88% | 1.00 | 99.88% | 1.00 |
| 4.08% | 4.08% | 0.12% | 99.88% | 1.00 | 4.08% | 0.12% | 99.88% | 1.00 | 99.88% | 1.00 |
| 4.09% | 4.09% | 0.13% | 99.87% | 1.00 | 4.09% | 0.13% | 99.87% | 1.00 | 99.87% | 1.00 |
| 4.10% | 4.10% | 0.14% | 99.86% | 1.00 | 4.10% | 0.14% | 99.86% | 1.00 | 99.86% | 1.00 |
| 4.11% | 4.11% | 0.15% | 99.85% | 1.00 | 4.11% | 0.15% | 99.85% | 1.00 | 99.85% | 1.00 |
| 4.12% | 4.12% | 0.16% | 99.84% | 1.00 | 4.12% | 0.16% | 99.84% | 1.00 | 99.84% | 1.00 |
| 4.13% | 4.13% | 0.17% | 99.83% | 1.00 | 4.13% | 0.17% | 99.83% | 1.00 | 99.83% | 1.00 |
| 4.14% | 4.14% | 0.18% | 99.82% | 1.00 | 4.14% | 0.18% | 99.82% | 1.00 | 99.82% | 1.00 |
| 4.15% | 4.15% | 0.19% | 99.81% | 1.00 | 4.15% | 0.19% | 99.81% | 1.00 | 99.81% | 1.00 |
| 4.16% | 4.16% | 0.20% | 99.80% | 1.00 | 4.16% | 0.20% | 99.80% | 1.00 | 99.80% | 1.00 |
| 4.17% | 4.17% | 0.21% | 99.79% | 1.00 | 4.17% | 0.21% | 99.79% | 1.00 | 99.79% | 1.00 |
| 4.18% | 4.18% | 0.22% | 99.78% | 1.00 | 4.18% | 0.22% | 99.78% | 1.00 | 99.78% | 1.00 |
| 4.19% | 4.19% | 0.23% | 99.77% | 1.00 | 4.19% | 0.23% | 99.77% | 1.00 | 99.77% | 1.00 |
| 4.20% | 4.20% | 0.24% | 99.76% | 1.00 | 4.20% | 0.24% | 99.76% | 1.00 | 99.76% | 1.00 |
| 4.21% | 4.21% | 0.25% | 99.75% | 1.00 | 4.21% | 0.25% | 99.75% | 1.00 | 99.75% | 1.00 |
| 4.22% | 4.22% | 0.27% | 99.73% | 1.00 | 4.22% | 0.27% | 99.73% | 1.00 | 99.73% | 1.00 |
| 4.23% | 4.23% | 0.28% | 99.72% | 1.00 | 4.23% | 0.28% | 99.72% | 1.00 | 99.72% | 1.00 |
| 4.24% | 4.24% | 0.29% | 99.71% | 1.00 | 4.24% | 0.29% | 99.71% | 1.00 | 99.71% | 1.00 |
| 4.25% | 4.25% | 0.31% | 99.69% | 1.00 | 4.25% | 0.31% | 99.69% | 1.00 | 99.69% | 1.00 |
| 4.26% | 4.26% | 0.32% | 99.68% | 1.00 | 4.26% | 0.32% | 99.68% | 1.00 | 99.68% | 1.00 |
| 4.27% | 4.27% | 0.34% | 99.66% | 1.00 | 4.27% | 0.34% | 99.66% | 1.00 | 99.66% | 1.00 |
| 4.28% | 4.28% | 0.35% | 99.65% | 1.00 | 4.28% | 0.35% | 99.65% | 1.00 | 99.65% | 1.00 |
| 4.29% | 4.29% | 0.37% | 99.63% | 1.00 | 4.29% | 0.37% | 99.63% | 1.00 | 99.63% | 1.00 |

FIG. 7-3A

| | | | | | | |
|---|---|---|---|---|---|---|
| 4.30% | 4.30% | 0.39% | 99.61% | 1.00 | 99.61% | 1.00 |
| 4.31% | 4.30% | 0.39% | 99.61% | 1.00 | 99.61% | 1.00 |
| 4.31% | 4.31% | 0.41% | 99.59% | 1.00 | 99.59% | 1.00 |
| 4.32% | 4.32% | 0.42% | 99.58% | 1.00 | 99.58% | 1.00 |
| 4.33% | 4.33% | 0.44% | 99.56% | 1.00 | 99.56% | 1.00 |
| 4.34% | 4.34% | 0.46% | 99.54% | 1.00 | 99.54% | 1.00 |
| 4.35% | 4.35% | 0.48% | 99.52% | 1.00 | 99.52% | 1.00 |
| 4.36% | 4.36% | 0.50% | 99.50% | 0.99 | 99.50% | 0.99 |
| 4.37% | 4.37% | 0.53% | 99.47% | 0.99 | 99.47% | 0.99 |
| 4.38% | 4.38% | 0.55% | 99.45% | 0.99 | 99.45% | 0.99 |
| 4.39% | 4.39% | 0.57% | 99.43% | 0.99 | 99.43% | 0.99 |
| 4.40% | 4.40% | 0.60% | 99.40% | 0.99 | 99.40% | 0.99 |
| 4.41% | 4.41% | 0.62% | 99.38% | 0.99 | 99.38% | 0.99 |
| 4.42% | 4.42% | 0.65% | 99.35% | 0.99 | 99.35% | 0.99 |
| 4.43% | 4.43% | 0.67% | 99.33% | 0.99 | 99.33% | 0.99 |
| 4.44% | 4.44% | 0.70% | 99.30% | 0.99 | 99.30% | 0.99 |
| 4.45% | 4.45% | 0.73% | 99.27% | 0.99 | 99.27% | 0.99 |
| 4.46% | 4.46% | 0.76% | 99.24% | 0.99 | 99.24% | 0.99 |
| 4.47% | 4.47% | 0.79% | 99.21% | 0.99 | 99.21% | 0.99 |
| 4.48% | 4.48% | 0.82% | 99.18% | 0.99 | 99.18% | 0.99 |
| 4.49% | 4.49% | 0.85% | 99.15% | 0.99 | 99.15% | 0.99 |
| 4.50% | 4.50% | 0.88% | 99.12% | 0.99 | 99.12% | 0.99 |
| 4.51% | 4.51% | 0.91% | 99.09% | 0.99 | 99.09% | 0.99 |
| 4.52% | 4.52% | 0.95% | 99.05% | 0.99 | 99.05% | 0.99 |
| 4.53% | 4.53% | 0.98% | 99.02% | 0.99 | 99.02% | 0.99 |
| 4.54% | 4.54% | 1.02% | 98.98% | 0.99 | 98.98% | 0.99 |
| 4.55% | 4.55% | 1.06% | 98.94% | 0.99 | 98.94% | 0.99 |
| 4.56% | 4.56% | 1.10% | 98.90% | 0.99 | 98.90% | 0.99 |

FIG. 7-3B

EFC SECURITIES SYSTEM
RISK ANALYSIS AND PLANNING MODULE
DERIVATIVES MODEL
APPLICATIONS PROGRAM OUTPUT

| libor | libor with d3 & d2 only | Z1=Z less d1 disp | CDY1(inv) from Z1 cap=25% | cor from CDY1 | libor with d3 only | ZZ=Z less d1 & d2 disp | CDY2(inv) from Z2 cap=25% | cor from CDY2 | from CDTX cap=25% | cor from CDY3 |
|---|---|---|---|---|---|---|---|---|---|---|
| 4.57% | 4.57% | 1.14% | 98.86% | 0.99 | 4.57% | 1.14% | 98.86% | 0.99 | 98.86% | 0.99 |
| 4.58% | 4.58% | 1.18% | 98.82% | 0.99 | 4.58% | 1.18% | 98.82% | 0.99 | 98.82% | 0.99 |
| 4.59% | 4.59% | 1.22% | 98.78% | 0.99 | 4.59% | 1.22% | 98.78% | 0.99 | 98.78% | 0.99 |
| 4.60% | 4.60% | 1.26% | 98.74% | 0.99 | 4.60% | 1.26% | 98.74% | 0.99 | 98.74% | 0.99 |
| 4.61% | 4.61% | 1.31% | 98.69% | 0.99 | 4.61% | 1.31% | 98.69% | 0.99 | 98.69% | 0.99 |
| 4.62% | 4.62% | 1.35% | 98.65% | 0.99 | 4.62% | 1.35% | 98.65% | 0.99 | 98.65% | 0.99 |
| 4.63% | 4.63% | 1.40% | 98.60% | 0.99 | 4.63% | 1.40% | 98.60% | 0.99 | 98.60% | 0.99 |
| 4.64% | 4.64% | 1.45% | 98.55% | 0.99 | 4.64% | 1.45% | 98.55% | 0.99 | 98.55% | 0.99 |
| 4.65% | 4.65% | 1.50% | 98.50% | 0.99 | 4.65% | 1.50% | 98.50% | 0.99 | 98.50% | 0.99 |
| 4.66% | 4.66% | 1.55% | 98.45% | 0.98 | 4.66% | 1.55% | 98.45% | 0.98 | 98.45% | 0.98 |
| 4.67% | 4.67% | 1.60% | 98.40% | 0.98 | 4.67% | 1.60% | 98.40% | 0.98 | 98.40% | 0.98 |
| 4.68% | 4.68% | 1.65% | 98.35% | 0.98 | 4.68% | 1.65% | 98.35% | 0.98 | 98.35% | 0.98 |
| 4.69% | 4.69% | 1.70% | 98.30% | 0.98 | 4.69% | 1.70% | 98.30% | 0.98 | 98.30% | 0.98 |
| 4.70% | 4.70% | 1.76% | 98.24% | 0.98 | 4.70% | 1.76% | 98.24% | 0.98 | 98.24% | 0.98 |
| 4.71% | 4.71% | 1.82% | 98.18% | 0.98 | 4.71% | 1.82% | 98.18% | 0.98 | 98.18% | 0.98 |
| 4.72% | 4.72% | 1.88% | 98.12% | 0.98 | 4.72% | 1.88% | 98.12% | 0.98 | 98.12% | 0.98 |
| 4.73% | 4.73% | 1.94% | 98.06% | 0.98 | 4.73% | 1.94% | 98.06% | 0.98 | 98.06% | 0.98 |
| 4.74% | 4.74% | 2.00% | 98.00% | 0.98 | 4.74% | 2.00% | 98.00% | 0.98 | 98.00% | 0.98 |
| 4.75% | 4.75% | 2.06% | 97.94% | 0.98 | 4.75% | 2.06% | 97.94% | 0.98 | 97.94% | 0.98 |
| 4.76% | 4.76% | 2.13% | 97.87% | 0.98 | 4.76% | 2.13% | 97.87% | 0.98 | 97.87% | 0.98 |
| 4.77% | 4.77% | 2.19% | 97.81% | 0.98 | 4.77% | 2.19% | 97.81% | 0.98 | 97.81% | 0.98 |
| 4.78% | 4.78% | 2.26% | 97.74% | 0.98 | 4.78% | 2.26% | 97.74% | 0.98 | 97.74% | 0.98 |
| 4.79% | 4.79% | 2.33% | 97.67% | 0.98 | 4.79% | 2.33% | 97.67% | 0.98 | 97.67% | 0.98 |
| 4.80% | 4.80% | 2.40% | 97.60% | 0.98 | 4.80% | 2.40% | 97.60% | 0.98 | 97.60% | 0.98 |
| 4.81% | 4.81% | 2.47% | 97.53% | 0.98 | 4.81% | 2.47% | 97.53% | 0.98 | 97.53% | 0.98 |
| 4.82% | 4.82% | 2.55% | 97.45% | 0.97 | 4.82% | 2.55% | 97.45% | 0.97 | 97.45% | 0.97 |
| 4.83% | 4.83% | 2.62% | 97.38% | 0.97 | 4.83% | 2.62% | 97.38% | 0.97 | 97.38% | 0.97 |
| 4.84% | 4.84% | 2.70% | 97.30% | 0.97 | 4.84% | 2.70% | 97.30% | 0.97 | 97.30% | 0.97 |
| 4.85% | 4.85% | 2.78% | 97.22% | 0.97 | 4.85% | 2.78% | 97.22% | 0.97 | 97.22% | 0.97 |
| 4.86% | 4.86% | 2.86% | 97.14% | 0.97 | 4.86% | 2.86% | 97.14% | 0.97 | 97.14% | 0.97 |

FIG. 7-4A

| | | | | | | | |
|---|---|---|---|---|---|---|---|
| 4.87% | 4.87% | 2.94% | 97.06% | 0.97 | 4.87% | 2.94% | 97.06% | 0.97 |
| 4.88% | 4.88% | 3.02% | 96.98% | 0.97 | 4.88% | 3.02% | 96.98% | 0.97 |
| 4.89% | 4.89% | 3.11% | 96.89% | 0.97 | 4.89% | 3.11% | 96.89% | 0.97 |
| 4.90% | 4.90% | 3.20% | 96.80% | 0.97 | 4.90% | 3.20% | 96.80% | 0.97 |
| 4.91% | 4.91% | 3.29% | 96.71% | 0.97 | 4.91% | 3.29% | 96.71% | 0.97 |
| 4.92% | 4.92% | 3.38% | 96.62% | 0.97 | 4.92% | 3.38% | 96.62% | 0.97 |
| 4.93% | 4.93% | 3.47% | 96.53% | 0.97 | 4.93% | 3.47% | 96.53% | 0.97 |
| 4.94% | 4.94% | 3.57% | 96.43% | 0.96 | 4.94% | 3.57% | 96.43% | 0.96 |
| 4.95% | 4.95% | 3.67% | 96.33% | 0.96 | 4.95% | 3.67% | 96.33% | 0.96 |
| 4.96% | 4.96% | 3.77% | 96.23% | 0.96 | 4.96% | 3.77% | 96.23% | 0.96 |
| 4.97% | 4.97% | 3.87% | 96.13% | 0.96 | 4.97% | 3.87% | 96.13% | 0.96 |
| 4.98% | 4.98% | 3.97% | 96.03% | 0.96 | 4.98% | 3.97% | 96.03% | 0.96 |
| 4.99% | 4.99% | 4.07% | 95.93% | 0.96 | 4.99% | 4.07% | 95.93% | 0.96 |
| 5.00% | 5.00% | 4.18% | 95.82% | 0.96 | 5.00% | 4.18% | 95.82% | 0.96 |
| 5.01% | 5.01% | 4.29% | 95.71% | 0.96 | 5.01% | 4.29% | 95.71% | 0.96 |
| 5.02% | 5.02% | 4.40% | 95.60% | 0.96 | 5.02% | 4.40% | 95.60% | 0.96 |
| 5.03% | 5.03% | 4.51% | 95.49% | 0.95 | 5.03% | 4.51% | 95.49% | 0.95 |
| 5.04% | 5.04% | 4.63% | 95.37% | 0.95 | 5.04% | 4.63% | 95.37% | 0.95 |
| 5.05% | 5.05% | 4.75% | 95.25% | 0.95 | 5.05% | 4.75% | 95.25% | 0.95 |
| 5.06% | 5.06% | 4.87% | 95.13% | 0.95 | 5.06% | 4.87% | 95.13% | 0.95 |
| 5.07% | 5.07% | 4.99% | 95.01% | 0.95 | 5.07% | 4.99% | 95.01% | 0.95 |
| 5.08% | 5.08% | 5.11% | 94.89% | 0.95 | 5.08% | 5.11% | 94.89% | 0.95 |
| 5.09% | 5.09% | 5.24% | 94.76% | 0.95 | 5.09% | 5.24% | 94.76% | 0.95 |
| 5.10% | 5.10% | 5.37% | 94.63% | 0.95 | 5.10% | 5.37% | 94.63% | 0.95 |
| 5.11% | 5.11% | 5.50% | 94.50% | 0.95 | 5.11% | 5.50% | 94.50% | 0.95 |

FIG. 7-4B

FIG. 7-5
NOTATION TABLE

EFC SECURITIES SYSTEM
RISK ANALYSIS AND PLANNING MODULE
DERIVATIVES MODEL
APPLICATIONS PROGRAM OUTPUT

| | |
|---|---|
| CDX (to 25%) | Cumulative Lognormal Distribution function of LIBOR values, from LIBOR = 0% to LIBOR = 25%. |
| CDTX (to 25%) | Truncated Cumulative Lognormal Distribution function of LIBOR values, from LIBOR = 0% to LIBOR = 25%. |
| disp libd0 < < libd1 | Cumulative Lognormal Distribution dispersion function 1 for LIBOR values between LIBOR = 1.70% (libd0) and LIBOR = 4.60% (libd1). |
| disp libd2 < < libd3 | Cumulative Lognormal Distribution dispersion function 2 for LIBOR values between LIBOR = 5.20% (libd2) and LIBOR = 10.20% (libd3). |
| disp libd4 < < libd5 | Cumulative Lognormal Distribution dispersion function 3 for LIBOR values between LIBOR = 9.10% (libd4) and LIBOR = 16.00% (libd5). |
| libor after disp | LIBOR values after adjustment by dispersion functions 1, 2 and 3. |
| d3 contrib to cor | dispersion function 3 contribution to corridor; the part of the dispersion adjusted LIBOR change from LIBOR resulting from dispersion function 3. |
| d2 contrib to cor | dispersion function 2 contribution to corridor; the part of the dispersion adjusted LIBOR change from LIBOR resulting from dispersion function 2. |
| d1 contrib to cor | dispersion function 1 contribution to corridor; the part of the dispersion adjusted LIBOR change from LIBOR resulting from dispersion function 1. |
| $d1 = .20$ | aggregate dispersion function 1 contribution to all corridors |
| $d2 = -.10$ | aggregate dispersion function 2 contribution to all corridors |
| $d3 = .10$ | aggregate dispersion function 3 contribution to all corridors |
| term = 5.00 | mode of Cumulative Lognormal Distribution function for this scenario is 5.00%. |
| trunc pt = 3.80% | Truncated Cumulative Lognormal Distribution function truncated for values of LIBOR below 3.80%. |
| Z = CDTX with disp (to 25%) | Z denotes the Truncated Cumulative Lognormal Distribution function of dispersion adjusted LIBOR values below 25.00%. |
| CDY(inv) from Z (norm to inf) | CDY denotes the inverse distribution of the Truncated Cumulative Lognormal Distribution function of dispersion adjusted LIBOR, normed to infinity (all values of LIBOR). |
| mean est from CDY(inv) | mean estimate of LIBOR derived from the Truncated Cumulative Lognormal Distribution function of dispersion adjusted LIBOR, contribution of each corridor. |
| mean\|adj = 6.7583% | aggregate mean estimate of LIBOR derived from the Truncated Cumulative Lognormal Distribution function of dispersion adjusted LIBOR (estimated average value) is 6.7583%. |

FIG. 7-6
NOTATION TABLE

EFC SECURITIES SYSTEM
RISK ANALYSIS AND PLANNING MODULE
DERIVATIVES MODEL
APPLICATIONS PROGRAM OUTPUT

| | |
|---|---|
| vol= 15.00% | volatility of Truncated Cumulative Lognormal Distribution function of dispersion adjusted LIBOR is 15.00%. |
| cor from CDY | corridor values derived from the inverse of the Truncated Cumulative Lognormal Distribution function of dispersion adjusted LIBOR. |
| cap from CDY cor in bp | likelihood that LIBOR will exceed the corresponding corridor base value, calculated from CDY and expressed in basis points. |
| libor | value of London Interbank Offered Rate ("LIBOR") used in each row of the model output. |
| libor with d3 & d2 only | values of LIBOR adjusted with dispersion functions 2 and 3, but not dispersion function 1. |
| Z1=Z less d1 disp | Z1 denotes the Truncated Cumulative Lognormal Distribution function of LIBOR values below 25.00%, adjusted with dispersion functions 2 and 3, but not dispersion function 1. |
| CDY1(inv) from Z1 cap=25% | CDY1 denotes the inverse distribution of Z1 |
| cor from CDY1 | corridor values derived from CDY1 |
| libor with d3 only | values of LIBOR adjusted with dispersion function 3, but not dispersion functions 1 and 2. |
| Z2=Z less d1 & d2 disp | Z2 denotes the Truncated Cumulative Lognormal Distribution function of LIBOR values below 25.00%, adjusted with dispersion function 3, but not dispersion functions 1 and 2. |
| CDY2(inv) from Z2 cap=25% | CDY2 denotes the inverse distribution of Z2 |
| cor from CDY2 | corridor values derived from CDY2 |
| CDY3(inv) from CDTX cap=25% | CDY denotes the inverse distribution of the Truncated Cumulative Lognormal Distribution function LIBOR, without dispersion adjustments, values of LIBOR less than 25%. |
| cor from CDY3 | corridor values derived from CDY3 |

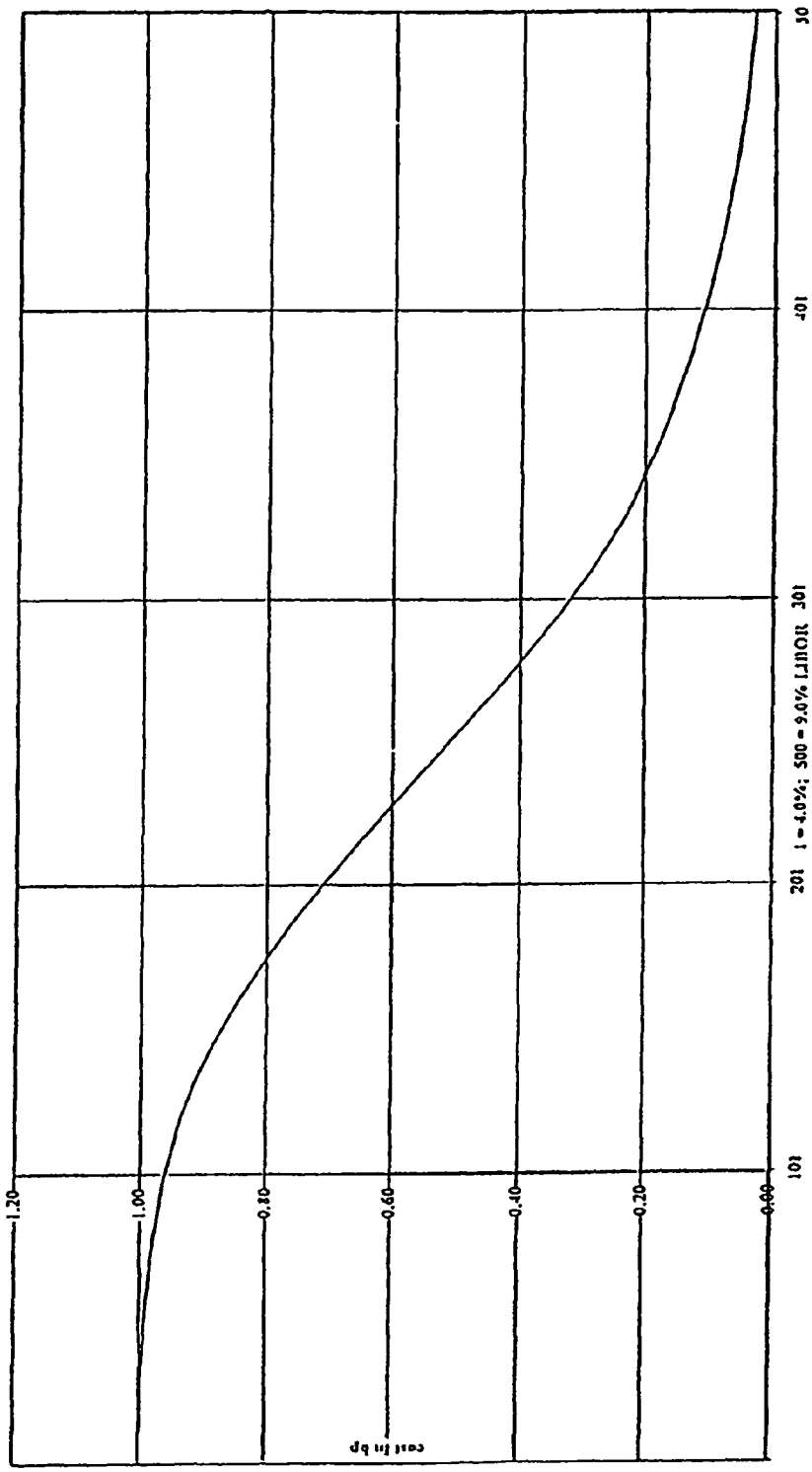

EFC SERIES SYSTEM
RISK ANALYSIS AND PLANNING MODULE
REMIC POOL PLANNING AND STRESS PROCESS
APPLICATIONS PROGRAM OUTPUT

| Series mo | date | group 1 mo prin pay g1mp-1 | z accrual amount z born opb1 z-opb1 | a accrual payable z-ac1 | a opb for z accrual a-opb1 | z accrual paid to a z-opb1 | a opb after z-ac2 a-opb2 | z opb after z-ac2 z-opb2 | z accrual paid to z opb channel | zp accrual a zp born opb zp-opb1 |
|---|---|---|---|---|---|---|---|---|---|---|
| 0 | | 919,742,477 | | 584,491 | | 584,419 | | | 0 | |
| 1 | 01/15/99 | 1,554,567 | 8,475,241 | 42,376 | 100,000,000 | 42,376 | 99,957,624 | 8,517,617 | 0 | 4,766,900 |
| 2 | 02/15/99 | 1,807,453 | 8,369,091 | 41,845 | 99,320,120 | 41,845 | 99,278,275 | 8,410,936 | 0 | 4,790,735 |
| 3 | 03/15/99 | 2,059,693 | 8,232,164 | 41,161 | 98,545,250 | 41,161 | 98,504,089 | 8,273,325 | 0 | 4,814,688 |
| 4 | 04/15/99 | 2,311,079 | 8,064,835 | 40,324 | 97,675,593 | 40,324 | 97,635,268 | 8,105,160 | 0 | 4,838,762 |
| 5 | 05/15/99 | 2,561,400 | 7,867,268 | 39,336 | 96,711,411 | 39,336 | 96,672,074 | 7,906,605 | 0 | 4,862,955 |
| 6 | 06/15/99 | 2,810,447 | 7,639,669 | 38,198 | 95,653,023 | 38,198 | 95,614,825 | 7,677,867 | 0 | 4,877,270 |
| 7 | 07/15/99 | 3,058,011 | 7,382,287 | 36,911 | 94,500,805 | 36,911 | 94,463,894 | 7,419,198 | 0 | 4,911,707 |
| 8 | 08/15/99 | 3,303,884 | 7,095,415 | 35,477 | 93,255,191 | 35,477 | 93,219,714 | 7,130,892 | 0 | 4,936,265 |
| 9 | 09/15/99 | 3,547,859 | 6,779,390 | 33,897 | 91,916,672 | 33,897 | 91,882,775 | 6,813,287 | 0 | 4,960,946 |
| 10 | 10/15/99 | 3,789,731 | 6,434,591 | 32,173 | 90,485,795 | 32,173 | 90,453,622 | 6,466,764 | 0 | 4,985,751 |
| 11 | 11/15/99 | 4,029,297 | 6,061,437 | 30,307 | 88,963,164 | 30,307 | 88,932,857 | 6,091,744 | 0 | 5,010,680 |
| 12 | 12/15/99 | 4,266,354 | 5,660,393 | 28,302 | 87,349,439 | 28,302 | 87,321,137 | 5,688,695 | 0 | 5,035,733 |
| 13 | 01/15/00 | 4,500,703 | 5,231,962 | 26,160 | 85,645,336 | 26,160 | 85,619,176 | 5,258,122 | 0 | 5,060,912 |
| 14 | 02/15/00 | 4,732,148 | 4,776,690 | 23,883 | 83,851,625 | 23,883 | 83,827,742 | 4,800,573 | 0 | 5,086,217 |
| 15 | 03/15/00 | 4,960,494 | 4,295,160 | 21,476 | 81,969,134 | 21,476 | 81,947,658 | 4,316,636 | 0 | 5,111,648 |
| 16 | 04/15/00 | 5,185,552 | 3,787,998 | 18,940 | 79,998,740 | 18,940 | 79,979,800 | 3,806,938 | 0 | 5,137,206 |
| 17 | 05/15/00 | 5,407,134 | 3,255,866 | 16,279 | 77,941,377 | 16,279 | 77,925,098 | 3,272,146 | 0 | 5,162,892 |
| 18 | 06/15/00 | 5,625,056 | 2,699,464 | 13,497 | 75,798,032 | 13,497 | 75,784,535 | 2,712,962 | 0 | 5,188,706 |
| 19 | 07/15/00 | 5,839,140 | 2,119,529 | 10,598 | 73,569,741 | 10,598 | 73,559,144 | 2,130,127 | 0 | 5,214,650 |
| 20 | 08/15/00 | 6,049,209 | 1,516,833 | 7,584 | 71,257,594 | 7,584 | 71,250,010 | 1,524,417 | 0 | 5,240,723 |
| 21 | 09/15/00 | 6,255,093 | 892,182 | 4,461 | 68,862,729 | 4,461 | 68,858,649 | 896,643 | 0 | 5,266,927 |
| 22 | 10/15/00 | 6,456,625 | 246,415 | 1,232 | 66,386,335 | 1,232 | 66,385,103 | 247,647 | 0 | 5,293,261 |
| 23 | 11/15/00 | 6,653,646 | 0 | 0 | 63,829,649 | 0 | 63,829,649 | 0 | 0 | 5,319,728 |
| 24 | 12/15/00 | 6,845,999 | 0 | 0 | 61,193,953 | 0 | 61,193,953 | 0 | 0 | 5,346,326 |
| 25 | 01/15/01 | 7,033,533 | 0 | 0 | 60,669,946 | 0 | 60,669,946 | 0 | 0 | 5,373,058 |

FIG. 9-1A

| | | | | | | |
|---|---|---|---|---|---|---|
| 26 | 02/15/01 | 7,216,104 | 0 | 59,623,838 | 0 | 5,399,923 |
| 27 | 03/15/01 | 7,393,573 | 0 | 58,550,372 | 0 | 5,426,923 |
| 28 | 04/15/01 | 7,565,807 | 0 | 57,450,881 | 0 | 5,454,057 |
| 29 | 05/15/01 | 7,499,193 | 0 | 56,331,557 | 0 | 5,481,328 |
| 30 | 06/15/01 | 7,433,151 | 0 | 55,204,601 | 0 | 5,508,734 |
| 31 | 07/15/01 | 7,367,677 | 0 | 54,092,759 | 0 | 5,536,278 |
| 32 | 08/15/01 | 7,302,766 | 0 | 52,999,393 | 0 | 5,563,959 |
| 33 | 09/15/01 | 7,238,412 | 0 | 51,924,307 | 0 | 5,591,779 |
| 34 | 10/15/01 | 7,174,612 | 0 | 50,867,309 | 0 | 5,619,738 |
| 35 | 11/15/01 | 7,111,359 | 0 | 49,828,207 | 0 | 5,647,837 |
| 36 | 12/15/01 | 7,048,651 | 0 | 48,806,811 | 0 | 5,676,076 |
| 37 | 01/15/02 | 6,986,481 | 0 | 47,802,932 | 0 | 5,704,456 |
| 38 | 02/15/02 | 6,924,846 | 0 | 46,816,384 | 0 | 5,732,979 |
| 39 | 03/15/02 | 6,863,740 | 0 | 45,846,983 | 0 | 5,761,644 |
| 40 | 04/15/02 | 6,803,160 | 0 | 44,894,546 | 0 | 5,790,452 |
| 41 | 05/15/02 | 6,743,101 | 0 | 43,958,891 | 0 | 5,819,404 |
| 42 | 06/15/02 | 6,683,559 | 0 | 43,039,839 | 0 | 5,848,501 |
| 43 | 07/15/02 | 6,624,528 | 0 | 42,137,212 | 0 | 5,877,744 |
| 44 | 08/15/02 | 6,566,005 | 0 | 41,250,834 | 0 | 5,907,132 |
| 45 | 09/15/02 | 6,507,986 | 0 | 40,380,531 | 0 | 5,936,668 |
| 46 | 10/15/02 | 6,450,465 | 0 | 39,526,129 | 0 | 5,966,351 |
| 47 | 11/15/02 | 6,393,440 | 0 | 38,687,456 | 0 | 5,996,183 |
| 48 | 12/15/02 | 6,336,905 | 0 | 37,864,348 | 0 | 6,026,164 |
| 49 | 01/15/03 | 6,280,856 | 0 | 37,056,630 | 0 | 6,056,295 |
| 50 | 02/15/03 | 6,225,289 | 0 | 36,264,139 | 0 | 6,086,576 |
| 51 | 03/15/03 | 6,170,201 | 0 | 35,486,709 | 0 | 6,117,009 |
| 52 | 04/15/03 | 6,115,587 | 0 | 34,724,177 | 0 | 6,147,594 |
| 53 | 05/15/03 | 6,061,443 | 0 | 33,976,381 | 0 | 6,178,332 |
| 54 | 06/15/03 | 6,007,765 | 0 | 33,243,161 | 0 | 6,209,224 |
| 55 | 07/15/03 | 5,954,548 | 0 | 32,524,358 | 0 | 6,240,270 |
| 56 | 08/15/03 | 5,901,790 | 0 | 31,819,816 | 0 | 6,271,471 |

FIG. 9-1B

EFC SERIES SYSTEM
RISK ANALYSIS AND PLANNING MODULE
REMIC POOL PLANNING AND STRESS PROCESS
APPLICATIONS PROGRAM OUTPUT

| ount zp accrual palable zp-ac1 | q opb for zp accrual q-opb1 | zq opb for zp accrual zp-opb1 | q+zq opb for zp accrual q+zp-opb1 | q+zq target bal eom q+zq-target | zp accrual for q+zp tar zpac2-1 | zp-ac not to q+zp tar zpac3 | part of zp q target bal eom q-target | accrual to q+zq zpac2-1 to q tar zpac2-2 | aggregate tar q opb after zpac2-2 q-opb2 |
|---|---|---|---|---|---|---|---|---|---|
| 16,571,851 | | | | | 5,715,815 | 10,856,036 | | 579,426 | |
| 23,835 | 100,000,000 | 5,720,278 | 105,720,278 | 105,020,189 | 23,835 | 0 | 99,336,147 | 23,835 | 99,976,166 |
| 23,954 | 99,336,147 | 5,684,042 | 105,020,189 | 104,200,419 | 23,954 | 0 | 98,580,170 | 23,954 | 99,312,193 |
| 24,073 | 98,580,170 | 5,620,249 | 104,200,419 | 103,261,855 | 24,073 | 0 | 97,732,267 | 24,073 | 98,556,097 |
| 24,194 | 97,732,267 | 5,529,588 | 103,261,855 | 102,204,842 | 24,194 | 0 | 96,792,692 | 24,194 | 97,708,704 |
| 24,315 | 96,792,692 | 5,412,150 | 102,204,842 | 101,029,817 | 24,315 | 0 | 95,761,755 | 24,315 | 96,768,378 |
| 24,436 | 95,761,755 | 5,268,062 | 101,029,817 | 99,737,313 | 24,436 | 0 | 94,639,824 | 24,436 | 95,737,319 |
| 24,559 | 94,639,824 | 5,097,489 | 99,737,313 | 98,327,957 | 24,559 | 0 | 93,427,320 | 24,559 | 94,615,265 |
| 24,681 | 93,427,320 | 4,900,637 | 98,327,957 | 96,802,471 | 24,681 | 0 | 92,124,725 | 24,681 | 93,402,639 |
| 24,805 | 92,124,725 | 4,677,746 | 96,802,471 | 95,161,671 | 24,805 | 0 | 90,732,573 | 24,805 | 92,099,920 |
| 24,929 | 90,732,573 | 4,429,098 | 95,161,671 | 93,406,466 | 24,929 | 0 | 89,251,456 | 24,929 | 90,707,644 |
| 25,053 | 89,251,456 | 4,155,009 | 93,406,466 | 91,537,857 | 25,053 | 0 | 87,682,021 | 25,053 | 89,226,403 |
| 25,179 | 87,682,021 | 3,855,836 | 91,537,857 | 89,556,938 | 25,179 | 0 | 86,024,969 | 25,179 | 87,656,842 |
| 25,305 | 86,024,969 | 3,531,869 | 89,556,938 | 87,464,892 | 25,305 | 0 | 84,281,055 | 25,305 | 85,999,664 |
| 25,431 | 84,281,055 | 3,183,837 | 87,464,892 | 85,262,995 | 25,431 | 0 | 82,451,090 | 25,431 | 84,255,624 |
| 25,558 | 82,451,090 | 2,811,906 | 85,262,995 | 82,952,609 | 25,558 | 0 | 80,535,936 | 25,558 | 82,425,532 |
| 25,686 | 80,535,936 | 2,416,673 | 82,952,609 | 80,535,183 | 25,686 | 0 | 78,536,509 | 25,686 | 80,510,250 |
| 25,814 | 78,536,509 | 1,998,675 | 80,535,183 | 78,012,254 | 25,814 | 0 | 76,453,775 | 25,814 | 78,510,694 |
| 25,944 | 76,453,775 | 1,558,478 | 78,012,254 | 75,385,440 | 25,944 | 0 | 74,288,755 | 25,944 | 76,427,832 |
| 26,073 | 74,288,755 | 1,096,685 | 75,385,440 | 72,656,444 | 26,073 | 0 | 72,042,515 | 26,073 | 74,262,681 |
| 26,204 | 72,042,515 | 613,929 | 72,656,444 | 69,827,050 | 26,204 | 0 | 69,716,174 | 26,204 | 72,016,311 |
| 26,335 | 69,716,174 | 110,875 | 69,827,050 | 66,899,119 | 26,335 | 0 | 67,310,900 | 26,335 | 69,689,840 |
| 26,466 | 66,899,119 | 0 | 66,899,119 | 63,874,590 | 26,466 | 0 | 64,827,905 | 26,466 | 66,872,653 |
| 26,599 | 63,874,590 | 0 | 63,874,590 | 60,755,477 | 26,599 | 0 | 62,268,451 | 26,599 | 63,847,992 |
| 26,732 | 60,755,477 | 0 | 60,755,477 | 59,774,141 | 26,732 | 0 | 61,864,118 | 0 | 60,755,477 |
| 26,865 | 59,774,141 | 0 | 59,774,141 | 58,767,098 | 26,865 | 0 | 61,450,618 | 0 | 59,774,141 |
| 27,000 | 58,767,098 | 0 | 58,767,098 | 57,734,246 | 27,000 | 0 | 61,027,016 | 0 | 58,767,098 |

FIG. 9-2A

| | | | | | | |
|---|---|---|---|---|---|---|
| 27,135 | 57,734,246 | 0 | 57,734,246 | 56,676,830 | 27,135 | 0 | 60,593,706 | 0 | 57,734,246 |
| 27,270 | 56,676,830 | 0 | 56,676,830 | 55,600,645 | 27,270 | 0 | 60,152,714 | 0 | 56,676,830 |
| 27,407 | 55,600,645 | 0 | 55,600,645 | 54,517,118 | 27,407 | 0 | 59,708,104 | 0 | 55,600,645 |
| 27,544 | 54,517,118 | 0 | 54,517,118 | 53,447,554 | 27,544 | 0 | 59,267,512 | 0 | 54,517,118 |
| 27,681 | 53,447,554 | 0 | 53,447,554 | 52,395,105 | 27,681 | 0 | 58,832,083 | 0 | 53,447,554 |
| 27,820 | 52,395,105 | 0 | 52,395,105 | 51,359,589 | 27,820 | 0 | 58,401,767 | 0 | 52,395,105 |
| 27,959 | 51,359,589 | 0 | 51,359,589 | 50,340,824 | 27,959 | 0 | 57,976,517 | 0 | 51,359,589 |
| 28,099 | 50,340,824 | 0 | 50,340,824 | 49,338,632 | 28,099 | 0 | 57,556,285 | 0 | 50,340,824 |
| 28,239 | 49,338,632 | 0 | 49,338,632 | 48,352,836 | 28,239 | 0 | 57,141,021 | 0 | 49,338,632 |
| 28,380 | 48,352,836 | 0 | 48,352,836 | 47,383,260 | 28,380 | 0 | 56,730,678 | 0 | 48,352,836 |
| 28,522 | 47,383,260 | 0 | 47,383,260 | 46,429,731 | 28,522 | 0 | 56,325,210 | 0 | 47,383,260 |
| 28,665 | 46,429,731 | 0 | 46,429,731 | 45,492,075 | 28,665 | 0 | 55,924,569 | 0 | 46,429,731 |
| 28,808 | 45,492,075 | 0 | 45,492,075 | 44,570,123 | 28,808 | 0 | 55,528,708 | 0 | 45,492,075 |
| 28,952 | 44,570,123 | 0 | 44,570,123 | 43,663,705 | 28,952 | 0 | 55,137,582 | 0 | 44,570,123 |
| 29,097 | 43,663,705 | 0 | 43,663,705 | 42,772,654 | 29,097 | 0 | 54,751,145 | 0 | 43,663,705 |
| 29,243 | 42,772,654 | 0 | 42,772,654 | 41,896,803 | 29,243 | 0 | 54,369,351 | 0 | 42,772,654 |
| 29,389 | 41,896,803 | 0 | 41,896,803 | 41,035,988 | 29,389 | 0 | 53,992,154 | 0 | 41,896,803 |
| 29,536 | 41,035,988 | 0 | 41,035,988 | 40,190,047 | 29,536 | 0 | 53,619,511 | 0 | 41,035,988 |
| 29,683 | 40,190,047 | 0 | 40,190,047 | 39,358,816 | 29,683 | 0 | 53,251,375 | 0 | 40,190,047 |
| 29,832 | 39,358,816 | 0 | 39,358,816 | 38,542,138 | 29,832 | 0 | 52,887,704 | 0 | 39,358,816 |
| 29,981 | 38,542,138 | 0 | 38,542,138 | 37,739,853 | 29,981 | 0 | 52,528,453 | 0 | 38,542,138 |
| 30,131 | 37,739,853 | 0 | 37,739,853 | 36,951,804 | 30,131 | 0 | 52,173,578 | 0 | 37,739,853 |
| 30,281 | 36,951,804 | 0 | 36,951,804 | 36,177,835 | 30,281 | 0 | 51,823,037 | 0 | 36,951,804 |
| 30,433 | 36,177,835 | 0 | 36,177,835 | 35,417,793 | 30,433 | 0 | 51,476,786 | 0 | 36,177,835 |
| 30,585 | 35,417,793 | 0 | 35,417,793 | 34,671,525 | 30,585 | 0 | 51,134,782 | 0 | 35,417,793 |
| 30,738 | 34,671,525 | 0 | 34,671,525 | 33,938,880 | 30,738 | 0 | 50,796,984 | 0 | 34,671,525 |
| 30,892 | 33,938,880 | 0 | 33,938,880 | 33,219,707 | 30,892 | 0 | 50,463,349 | 0 | 33,938,880 |
| 31,046 | 33,219,707 | 0 | 33,219,707 | 32,513,859 | 31,046 | 0 | 50,133,835 | 0 | 33,219,707 |
| 31,201 | 32,513,859 | 0 | 32,513,859 | 31,821,188 | 31,201 | 0 | 49,808,401 | 0 | 32,513,859 |
| 31,357 | 31,821,188 | 0 | 31,821,188 | 31,141,548 | 31,357 | 0 | 49,487,007 | 0 | 31,821,188 |

FIG. 9-2B

EFC SERIES SYSTEM
RISK ANALYSIS AND PLANNING MODULE
REMIC POOL PLANNING AND STRESS PROCESS
APPLICATIONS PROGRAM OUTPUT

| get zp opb after zpac2-2 sp-opb2 | zpac2-1 remaining zpac2-3 | zpac2-3 to zq zpac2-4 | zq opb after zpac2-4 zq-opb2 | zp opb after zpac2-4 zp-opb3 | zpac2-3 remaining zpac2-5 | zpac2-5 to q, no tar zpac2-6 | q opb after zpac2-6 q-opb3 | zp opb after zpac2-6 zp-opb4 | zpac2-5 remaining (should be 0) | zp accrual t fe+se opb for zp accrua fese-opb1 |
|---|---|---|---|---|---|---|---|---|---|---|
| | | 0 | | | | 5,136,389 | | | 0 | |
| 4,790,735 | 0 | 0 | 5,720,278 | 4,790,735 | 0 | 0 | 99,976,166 | 4,790,735 | 0 | 52,565,222 |
| 4,814,688 | 0 | 0 | 5,684,042 | 4,814,688 | 0 | 0 | 99,312,193 | 4,814,688 | 0 | 52,454,143 |
| 4,838,762 | 0 | 0 | 5,620,249 | 4,838,762 | 0 | 0 | 98,556,097 | 4,838,762 | 0 | 52,339,382 |
| 4,862,955 | 0 | 0 | 5,529,588 | 4,862,955 | 0 | 0 | 97,708,074 | 4,862,955 | 0 | 52,220,502 |
| 4,887,270 | 0 | 0 | 5,412,150 | 4,887,270 | 0 | 0 | 96,678,378 | 4,887,270 | 0 | 52,097,713 |
| 4,911,707 | 0 | 0 | 5,268,062 | 4,911,707 | 0 | 0 | 95,737,319 | 4,911,707 | 0 | 51,971,229 |
| 4,936,265 | 0 | 0 | 5,097,489 | 4,936,265 | 0 | 0 | 94,615,265 | 4,936,265 | 0 | 51,841,271 |
| 4,960,946 | 0 | 0 | 4,900,627 | 4,960,946 | 0 | 0 | 93,402,639 | 4,960,946 | 0 | 51,708,067 |
| 4,985,751 | 0 | 0 | 4,677,746 | 4,985,751 | 0 | 0 | 92,099,920 | 4,985,751 | 0 | 51,571,853 |
| 5,010,680 | 0 | 0 | 4,429,098 | 5,010,680 | 0 | 0 | 90,707,644 | 5,010,680 | 0 | 51,432,867 |
| 5,035,733 | 0 | 0 | 4,155,009 | 5,035,733 | 0 | 0 | 89,226,403 | 5,035,733 | 0 | 51,291,356 |
| 5,060,912 | 0 | 0 | 3,855,836 | 5,060,912 | 0 | 0 | 87,656,842 | 5,060,912 | 0 | 51,147,571 |
| 5,086,217 | 0 | 0 | 3,531,969 | 5,086,217 | 0 | 0 | 85,999,664 | 5,086,217 | 0 | 51,001,767 |
| 5,111,648 | 0 | 0 | 3,183,837 | 5,111,648 | 0 | 0 | 84,255,624 | 5,111,648 | 0 | 50,854,204 |
| 5,137,206 | 0 | 0 | 2,811,906 | 5,137,206 | 0 | 0 | 82,425,532 | 5,137,206 | 0 | 50,705,147 |
| 5,162,892 | 0 | 0 | 2,416,673 | 5,162,892 | 0 | 0 | 80,510,250 | 5,162,892 | 0 | 50,554,863 |
| 5,188,706 | 0 | 0 | 1,998,675 | 5,188,706 | 0 | 0 | 78,510,694 | 5,188,706 | 0 | 50,403,623 |
| 5,214,650 | 0 | 0 | 1,558,478 | 5,214,650 | 0 | 0 | 76,427,832 | 5,214,650 | 0 | 50,251,703 |
| 5,240,723 | 0 | 0 | 1,095,685 | 5,240,723 | 0 | 0 | 74,262,681 | 5,240,723 | 0 | 50,099,378 |
| 5,266,927 | 0 | 0 | 613,929 | 5,266,927 | 0 | 0 | 72,016,311 | 5,266,927 | 0 | 49,946,926 |
| 5,293,261 | 0 | 0 | 110,875 | 5,293,261 | 0 | 0 | 69,689,840 | 5,293,261 | 0 | 49,794,630 |
| 5,319,728 | 0 | 0 | 0 | 5,319,728 | | 0 | 66,872,653 | 5,319,728 | 0 | 49,642,769 |
| 5,346,326 | 0 | 0 | 0 | 5,346,326 | | 0 | 63,847,992 | 5,346,326 | 0 | 49,489,567 |
| 5,346,326 | 26,732 | 0 | 0 | 5,346,326 | 26,732 | 26,732 | 60,728,746 | 5,373,058 | 0 | 49,334,658 |
| 5,373,058 | 26,865 | 0 | 0 | 5,373,058 | 26,865 | 26,865 | 59,747,276 | 5,399,923 | 0 | 49,178,233 |
| 5,399,923 | 27,000 | 0 | 0 | 5,399,923 | 27,000 | 27,000 | 58,740,099 | 5,426,923 | 0 | 49,020,488 |

FIG. 9-3A

| | | | | | | |
|---|---|---|---|---|---|---|
| 5,426,923 | 27,135 | 0 | 5,426,923 | 27,135 | 27,135 | 57,707,111 | 5,454,057 | 0 | 48,861,620 |
| 5,454,057 | 27,270 | 0 | 5,454,057 | 27,270 | 27,270 | 56,649,560 | 5,481,328 | 0 | 48,701,831 |
| 5,481,328 | 27,407 | 0 | 5,481,328 | 27,407 | 27,407 | 55,573,238 | 5,508,734 | 0 | 48,528,484 |
| 5,508,734 | 27,544 | 0 | 5,508,734 | 27,544 | 27,544 | 54,489,574 | 5,536,278 | 0 | 48,426,772 |
| 5,536,278 | 27,681 | 0 | 5,536,278 | 27,681 | 27,681 | 53,419,873 | 5,563,959 | 0 | 48,336,495 |
| 5,563,959 | 27,820 | 0 | 5,563,959 | 27,820 | 27,820 | 52,367,285 | 5,591,779 | 0 | 48,248,269 |
| 5,591,779 | 27,959 | 0 | 5,591,779 | 27,959 | 27,959 | 51,331,630 | 5,619,738 | 0 | 48,162,066 |
| 5,619,738 | 28,099 | 0 | 5,619,738 | 28,099 | 28,099 | 50,312,725 | 5,647,837 | 0 | 48,077,857 |
| 5,647,837 | 28,239 | 0 | 5,647,837 | 28,239 | 28,239 | 49,310,393 | 5,676,076 | 0 | 47,995,617 |
| 5,676,076 | 28,380 | 0 | 5,676,076 | 28,380 | 28,380 | 48,324,455 | 5,704,456 | 0 | 47,915,318 |
| 5,704,456 | 28,522 | 0 | 5,704,456 | 28,522 | 28,522 | 47,354,738 | 5,732,979 | 0 | 47,836,932 |
| 5,732,979 | 28,665 | 0 | 5,732,979 | 28,665 | 28,665 | 46,401,066 | 5,761,644 | 0 | 47,760,435 |
| 5,761,644 | 28,808 | 0 | 5,761,644 | 28,808 | 28,808 | 45,463,267 | 5,790,452 | 0 | 47,685,799 |
| 5,790,452 | 28,952 | 0 | 5,790,452 | 28,952 | 28,952 | 44,541,171 | 5,819,404 | 0 | 47,613,000 |
| 5,819,404 | 29,097 | 0 | 5,819,404 | 29,097 | 29,097 | 43,634,608 | 5,848,501 | 0 | 47,542,010 |
| 5,848,501 | 29,243 | 0 | 5,848,501 | 29,243 | 29,243 | 42,743,411 | 5,877,744 | 0 | 47,472,807 |
| 5,877,744 | 29,389 | 0 | 5,877,744 | 29,389 | 29,389 | 41,867,414 | 5,907,132 | 0 | 47,405,363 |
| 5,907,132 | 29,536 | 0 | 5,907,132 | 29,536 | 29,536 | 41,006,453 | 5,936,668 | 0 | 47,339,656 |
| 5,936,668 | 29,683 | 0 | 5,936,668 | 29,683 | 29,683 | 40,160,363 | 5,966,351 | 0 | 47,275,660 |
| 5,966,351 | 28,832 | 0 | 5,966,351 | 28,832 | 28,832 | 39,328,985 | 5,996,183 | 0 | 47,213,352 |
| 5,996,183 | 29,981 | 0 | 5,996,183 | 29,981 | 29,981 | 38,512,157 | 6,026,164 | 0 | 47,152,707 |
| 6,026,164 | 30,131 | 0 | 6,026,164 | 30,131 | 30,131 | 37,709,722 | 6,056,295 | 0 | 47,093,703 |
| 6,056,295 | 30,281 | 0 | 6,056,295 | 30,281 | 30,281 | 36,921,522 | 6,086,576 | 0 | 47,036,316 |
| 6,086,576 | 30,433 | 0 | 6,086,576 | 30,433 | 30,433 | 36,147,402 | 6,117,009 | 0 | 46,980,524 |
| 6,117,009 | 30,585 | 0 | 6,117,009 | 30,585 | 30,585 | 35,387,208 | 6,147,594 | 0 | 46,926,303 |
| 6,147,594 | 30,738 | 0 | 6,147,594 | 30,738 | 30,738 | 34,640,787 | 6,178,332 | 0 | 46,873,631 |
| 6,178,332 | 30,892 | 0 | 6,178,332 | 30,892 | 30,892 | 33,907,988 | 6,209,224 | 0 | 46,822,486 |
| 6,209,224 | 31,046 | 0 | 6,209,224 | 31,046 | 31,046 | 33,188,661 | 6,240,270 | 0 | 46,772,847 |
| 6,240,270 | 31,201 | 0 | 6,240,270 | 31,201 | 31,201 | 32,482,657 | 6,271,471 | 0 | 46,724,691 |
| 6,271,471 | 31,357 | 0 | 6,271,471 | 31,357 | 31,357 | 31,789,830 | 6,302,829 | 0 | 46,677,997 |

FIG. 9-3B

EFC SERIES SYSTEM
RISK ANALYSIS AND PLANNING MODULE
REMIC POOL PLANNING AND STRESS PROCESS
APPLICATIONS PROGRAM OUTPUT

| fe+s | | | | | | zp accrual to q target, zq and q no target | | | |
|---|---|---|---|---|---|---|---|---|---|
| zp accrual for fese zp-ac2 | zp-ac2 to fese zp-ac3 | fese opb after zp-ac3 fese-opb2 | zp opb after zp-ac3 zp-opb5 | zp accrual remaining zp-ac4 | zp-ac4 to q tar zp-ac5 | q opb after zp-ac5 q-opb4 | zp opb after zp-ac5 zp-opb6 | zp-ac4 remaining zp-ac6 | zp-ac6 to zq zp-ac7 |
| | 7,214,718 | | | 3,641,381 | 0 | | | | 0 |
| 0 | 0 | 52,565,222 | 4,790,735 | 0 | 0 | 99,976,166 | 4,790,735 | 0 | 0 |
| 0 | 0 | 52,454,143 | 4,814,688 | 0 | 0 | 99,312,193 | 4,814,688 | 0 | 0 |
| 0 | 0 | 52,339,382 | 4,838,762 | 0 | 0 | 98,556,097 | 4,838,762 | 0 | 0 |
| 0 | 0 | 52,220,502 | 4,862,955 | 0 | 0 | 97,708,074 | 4,862,955 | 0 | 0 |
| 0 | 0 | 52,097,713 | 4,887,270 | 0 | 0 | 96,768,378 | 4,887,270 | 0 | 0 |
| 0 | 0 | 51,971,229 | 4,911,707 | 0 | 0 | 95,737,319 | 4,911,707 | 0 | 0 |
| 0 | 0 | 51,841,271 | 4,936,265 | 0 | 0 | 94,615,265 | 4,936,265 | 0 | 0 |
| 0 | 0 | 51,708,067 | 4,960,945 | 0 | 0 | 93,402,639 | 4,960,946 | 0 | 0 |
| 0 | 0 | 51,571,853 | 4,985,751 | 0 | 0 | 92,099,920 | 4,985,751 | 0 | 0 |
| 0 | 0 | 51,432,867 | 5,010,680 | 0 | 0 | 90,707,644 | 5,010,680 | 0 | 0 |
| 0 | 0 | 51,291,356 | 5,035,733 | 0 | 0 | 89,226,403 | 5,035,733 | 0 | 0 |
| 0 | 0 | 51,147,571 | 5,060,912 | 0 | 0 | 87,656,842 | 5,060,912 | 0 | 0 |
| 0 | 0 | 51,001,767 | 5,086,217 | 0 | 0 | 85,999,664 | 5,086,217 | 0 | 0 |
| 0 | 0 | 50,854,204 | 5,111,648 | 0 | 0 | 84,255,624 | 5,111,648 | 0 | 0 |
| 0 | 0 | 50,705,147 | 5,137,206 | 0 | 0 | 82,425,532 | 5,137,206 | 0 | 0 |
| 0 | 0 | 50,554,863 | 5,162,892 | 0 | 0 | 80,510,250 | 5,162,892 | 0 | 0 |
| 0 | 0 | 50,403,623 | 5,188,706 | 0 | 0 | 78,510,694 | 5,188,706 | 0 | 0 |
| 0 | 0 | 50,251,703 | 5,214,650 | 0 | 0 | 76,427,832 | 5,214,650 | 0 | 0 |
| 0 | 0 | 50,099,378 | 5,240,723 | 0 | 0 | 74,262,681 | 5,240,723 | 0 | 0 |
| 0 | 0 | 49,946,926 | 5,266,927 | 0 | 0 | 72,016,311 | 5,266,927 | 0 | 0 |
| 0 | 0 | 49,794,630 | 5,293,261 | 0 | 0 | 69,689,840 | 5,293,261 | 0 | 0 |
| 0 | 0 | 49,642,769 | 5,319,728 | 0 | 0 | 66,872,653 | 5,319,728 | 0 | 0 |
| 0 | 0 | 49,489,567 | 5,346,326 | 0 | 0 | 63,847,992 | 5,346,326 | 0 | 0 |
| 0 | 0 | 49,334,658 | 5,373,058 | 0 | 0 | 60,728,746 | 5,373,058 | 0 | 0 |
| 0 | 0 | 49,178,233 | 5,399,923 | 0 | 0 | 59,747,276 | 5,399,923 | 0 | 0 |
| 0 | 0 | 49,020,488 | 5,426,923 | 0 | 0 | 58,740,099 | 5,426,923 | 0 | 0 |
| 0 | 0 | 48,861,620 | 5,454,057 | 0 | 0 | 57,707,111 | 5,454,057 | 0 | 0 |
| 0 | 0 | 48,701,831 | 5,481,328 | 0 | 0 | 56,649,560 | 5,481,328 | 0 | 0 |

FIG. 9-4A

| | | | | | | |
|---|---|---|---|---|---|---|
| 0 | 48,528,484 | 5,508,734 | 0 | 55,573,238 | 5,508,734 | 0 |
| 0 | 48,426,772 | 5,536,278 | 0 | 54,489,574 | 5,536,278 | 0 |
| 0 | 48,336,495 | 5,563,959 | 0 | 53,419,873 | 5,563,959 | 0 |
| 0 | 48,248,269 | 5,591,779 | 0 | 52,367,285 | 5,591,779 | 0 |
| 0 | 48,162,066 | 5,619,738 | 0 | 51,331,630 | 5,619,738 | 0 |
| 0 | 48,077,857 | 5,647,837 | 0 | 50,312,725 | 5,647,837 | 0 |
| 0 | 47,995,617 | 5,676,076 | 0 | 49,310,393 | 5,676,076 | 0 |
| 0 | 47,915,318 | 5,704,456 | 0 | 48,324,455 | 5,704,456 | 0 |
| 0 | 47,836,932 | 5,732,979 | 0 | 47,354,738 | 5,732,979 | 0 |
| 0 | 47,760,435 | 5,761,644 | 0 | 46,401,066 | 5,761,644 | 0 |
| 0 | 47,685,799 | 5,790,452 | 0 | 45,463,267 | 5,790,452 | 0 |
| 0 | 47,613,000 | 5,819,404 | 0 | 44,541,171 | 5,819,404 | 0 |
| 0 | 47,542,010 | 5,848,501 | 0 | 43,634,608 | 5,848,501 | 0 |
| 0 | 47,472,807 | 5,877,744 | 0 | 42,743,411 | 5,877,744 | 0 |
| 0 | 47,405,363 | 5,907,132 | 0 | 41,867,414 | 5,907,132 | 0 |
| 0 | 47,339,656 | 5,936,668 | 0 | 41,006,453 | 5,936,668 | 0 |
| 0 | 47,275,660 | 5,966,351 | 0 | 40,160,363 | 5,966,351 | 0 |
| 0 | 47,213,352 | 5,996,183 | 0 | 39,328,985 | 5,996,183 | 0 |
| 0 | 47,152,707 | 6,026,164 | 0 | 38,512,157 | 6,026,164 | 0 |
| 0 | 47,093,703 | 6,056,295 | 0 | 37,709,722 | 6,056,295 | 0 |
| 0 | 47,036,316 | 6,086,576 | 0 | 36,921,522 | 6,086,576 | 0 |
| 0 | 46,980,524 | 6,117,009 | 0 | 36,147,402 | 6,117,009 | 0 |
| 0 | 46,926,303 | 6,147,594 | 0 | 35,387,208 | 6,147,594 | 0 |
| 0 | 46,873,631 | 6,178,332 | 0 | 34,640,787 | 6,178,332 | 0 |
| 0 | 46,822,486 | 6,209,224 | 0 | 33,907,988 | 6,209,224 | 0 |
| 0 | 46,772,847 | 6,240,270 | 0 | 33,188,661 | 6,240,270 | 0 |
| 0 | 46,724,691 | 6,271,471 | 0 | 32,482,657 | 6,271,471 | 0 |
| 0 | 46,677,997 | 6,302,829 | 0 | 31,789,830 | 6,302,829 | 0 |

FIG. 9-4B

EFC SERIES SYSTEM
RISK ANALYSIS AND PLANNING MODULE
REMIC POOL PLANNING AND STRESS PROCESS
APPLICATIONS PROGRAM OUTPUT

| zq opb after zp-ac7 zq-opb3 | zp opb after zp-ac7 zp-opb7 | zp-ac6 remaining zp-ac9 | zp-ac9 to q no tar zp-ac10 | q opb after zp-ac10 q-opb5 | zp opb after zp-ac9 zp-opb8 | zp accrual to zp q opb (change) | zq opb for zq ac amt zq-opg1(c) | zq accrual palable zq-ac1 | q opb for zq accrual q-opb5(c) |
|---|---|---|---|---|---|---|---|---|---|
| | | | | | | 3,641,318 | | 388,366 | |
| 5,720,278 | 4,790,735 | 0 | 0 | 99,976,166 | 4,790,735 | 0 | 5,720,278 | 28,601 | 99,976,166 |
| 5,684,042 | 4,814,688 | 0 | 0 | 99,312,193 | 4,814,688 | 0 | 5,684,042 | 28,420 | 99,312,193 |
| 5,620,249 | 4,838,762 | 0 | 0 | 98,556,097 | 4,838,762 | 0 | 5,620,249 | 28,101 | 98,556,097 |
| 5,529,588 | 4,862,955 | 0 | 0 | 97,708,074 | 4,862,955 | 0 | 5,529,588 | 27,648 | 97,708,074 |
| 5,412,150 | 4,887,270 | 0 | 0 | 96,768,378 | 4,887,270 | 0 | 5,412,150 | 27,061 | 96,768,378 |
| 5,268,062 | 4,911,707 | 0 | 0 | 95,737,319 | 4,911,707 | 0 | 5,268,062 | 26,340 | 95,737,319 |
| 5,097,489 | 4,936,265 | 0 | 0 | 94,615,265 | 4,936,265 | 0 | 5,097,489 | 25,487 | 94,615,265 |
| 4,900,637 | 4,960,946 | 0 | 0 | 93,402,639 | 4,960,946 | 0 | 4,900,637 | 24,503 | 93,402,639 |
| 4,677,746 | 4,985,751 | 0 | 0 | 92,099,920 | 4,985,751 | 0 | 4,677,746 | 23,389 | 92,099,920 |
| 4,429,098 | 5,010,680 | 0 | 0 | 90,707,644 | 5,010,680 | 0 | 4,429,098 | 22,145 | 90,707,644 |
| 4,155,009 | 5,035,733 | 0 | 0 | 89,226,403 | 5,035,733 | 0 | 4,155,009 | 20,775 | 89,226,403 |
| 3,855,836 | 5,060,912 | 0 | 0 | 87,656,842 | 5,060,912 | 0 | 3,855,836 | 19,279 | 87,656,842 |
| 3,531,969 | 5,086,217 | 0 | 0 | 85,999,664 | 5,086,217 | 0 | 3,531,969 | 17,660 | 85,999,664 |
| 3,183,837 | 5,111,648 | 0 | 0 | 84,255,624 | 5,111,648 | 0 | 3,183,837 | 15,919 | 84,255,624 |
| 2,811,906 | 5,137,206 | 0 | 0 | 82,425,532 | 5,137,206 | 0 | 2,811,906 | 14,060 | 82,425,532 |
| 2,416,673 | 5,162,892 | 0 | 0 | 80,510,250 | 5,162,892 | 0 | 2,416,673 | 12,083 | 80,510,250 |
| 1,998,675 | 5,188,706 | 0 | 0 | 78,510,694 | 5,188,706 | 0 | 1,998,675 | 9,993 | 78,510,694 |
| 1,558,478 | 5,214,650 | 0 | 0 | 76,427,832 | 5,214,650 | 0 | 1,558,478 | 7,792 | 76,427,832 |
| 1,096,685 | 5,240,723 | 0 | 0 | 74,262,681 | 5,240,723 | 0 | 1,096,685 | 5,483 | 74,262,681 |
| 613,929 | 5,266,927 | 0 | 0 | 72,016,311 | 5,266,927 | 0 | 613,929 | 3,070 | 72,016,311 |
| 110,875 | 5,293,261 | 0 | 0 | 69,689,840 | 5,293,261 | 0 | 110,875 | 554 | 69,689,840 |
| 0 | 5,319,728 | 0 | 0 | 66,872,653 | 5,319,728 | 0 | 0 | 0 | 66,872,653 |
| 0 | 5,346,326 | 0 | 0 | 63,847,992 | 5,346,326 | 0 | 0 | 0 | 63,847,992 |
| 0 | 5,373,058 | 0 | 0 | 60,728,746 | 5,373,058 | 0 | 0 | 0 | 60,728,746 |
| 0 | 5,399,923 | 0 | 0 | 59,747,276 | 5,399,923 | 0 | 0 | 0 | 59,747,276 |
| 0 | 5,426,923 | 0 | 0 | 58,740,099 | 5,426,923 | 0 | 0 | 0 | 58,740,099 |
| 0 | 5,454,057 | 0 | 0 | 57,707,111 | 5,454,057 | 0 | 0 | 0 | 57,707,111 |

FIG. 9-5A

| | | | | | | |
|---|---|---|---|---|---|---|
| 0 | 5,481,328 | 0 | 56,649,560 | | | 56,649,560 |
| 0 | 5,508,734 | 0 | 55,573,238 | | | 55,573,238 |
| 0 | 5,536,278 | 0 | 54,489,574 | | | 54,489,574 |
| 0 | 5,563,959 | 0 | 53,419,873 | | | 53,419,873 |
| 0 | 5,591,779 | 0 | 52,367,285 | | | 52,367,285 |
| 0 | 5,619,738 | 0 | 51,331,630 | | | 51,331,630 |
| 0 | 5,647,837 | 0 | 50,312,725 | | | 50,312,725 |
| 0 | 5,676,076 | 0 | 49,310,393 | | | 49,310,393 |
| 0 | 5,704,456 | 0 | 48,324,455 | | | 48,324,455 |
| 0 | 5,732,979 | 0 | 47,354,738 | | | 47,354,738 |
| 0 | 5,761,644 | 0 | 46,401,066 | | | 46,401,066 |
| 0 | 5,790,452 | 0 | 45,463,267 | | | 45,463,267 |
| 0 | 5,819,404 | 0 | 44,541,171 | | | 44,541,171 |
| 0 | 5,848,501 | 0 | 43,634,608 | | | 43,634,608 |
| 0 | 5,877,744 | 0 | 42,743,411 | | | 42,743,411 |
| 0 | 5,907,132 | 0 | 41,867,414 | | | 41,867,414 |
| 0 | 5,936,668 | 0 | 41,006,453 | | | 41,006,453 |
| 0 | 5,966,351 | 0 | 40,160,363 | | | 40,160,363 |
| 0 | 5,996,183 | 0 | 39,328,985 | | | 39,328,985 |
| 0 | 6,026,164 | 0 | 38,512,157 | | | 38,512,157 |
| 0 | 6,056,295 | 0 | 37,709,722 | | | 37,709,722 |
| 0 | 6,086,576 | 0 | 36,921,522 | | | 36,921,522 |
| 0 | 6,117,009 | 0 | 36,147,402 | | | 36,147,402 |
| 0 | 6,147,594 | 0 | 35,387,208 | | | 35,387,208 |
| 0 | 6,178,332 | 0 | 34,640,787 | | | 34,640,787 |
| 0 | 6,209,224 | 0 | 33,907,988 | | | 33,907,988 |
| 0 | 6,240,270 | 0 | 33,188,661 | | | 33,188,661 |
| 0 | 6,271,471 | 0 | 32,482,657 | | | 32,482,657 |
| 0 | 6,302,829 | 0 | 31,789,830 | | | 31,789,830 |

FIG. 9-5B

EFC SERIES SYSTEM
RISK ANALYSIS AND PLANNING MODULE
REMIC POOL PLANNING AND STRESS PROCESS
APPLICATIONS PROGRAM OUTPUT

| | | | | group 1 step 1, PAC to aggregate target | | | | | group 1 step 2(a step2(a) |
|---|---|---|---|---|---|---|---|---|---|
| zq accrual to q tar zq-ac2 | q opb after zq-ac2 q-opb6 | zq opb after zp&zp ac zq-opb4 | zq accrual to zq opb change) | PAC opb for g1 prin pac-opb1 | pac eom target pac-target | g1 prin to pac tar g1-p1 | pac opb after g1-p1 pac-opb2 | g1 prin remaining g1-p2 | g1 prin q2a-p1 |
| 388,366 | | | 0 | | | 585,549,509 | | 334,192,968 | 171,084,486 |
| 28,601 | 99,947,564 | 5,748,879 | 0 | 585,664,416 | 585,664,416 | 0 | 585,664,416 | 1,554,567 | 795,835 |
| 28,420 | 99,283,773 | 5,712,463 | 0 | 585,664,416 | 585,664,416 | 0 | 585,664,416 | 1,807,453 | 925,295 |
| 28,101 | 98,527,995 | 5,648,350 | 0 | 585,664,416 | 585,664,416 | 0 | 585,664,416 | 2,059,693 | 1,054,425 |
| 27,648 | 97,680,426 | 5,557,236 | 0 | 585,664,416 | 585,664,416 | 0 | 585,664,416 | 2,311,079 | 1,183,118 |
| 27,061 | 96,741,317 | 5,439,211 | 0 | 585,664,416 | 585,664,416 | 0 | 585,664,416 | 2,561,400 | 1,311,266 |
| 26,340 | 95,710,979 | 5,294,402 | 0 | 585,664,416 | 585,664,416 | 0 | 585,664,416 | 2,810,447 | 1,438,761 |
| 25,487 | 94,589,778 | 5,122,977 | 0 | 585,664,416 | 585,664,416 | 0 | 585,664,416 | 3,058,011 | 1,565,497 |
| 24,503 | 93,378,136 | 4,925,140 | 0 | 585,664,416 | 585,664,416 | 0 | 585,664,416 | 3,303,884 | 1,691,368 |
| 23,389 | 92,076,531 | 4,701,135 | 0 | 585,664,416 | 585,664,416 | 0 | 585,664,416 | 3,547,859 | 1,816,267 |
| 22,145 | 90,685,499 | 4,451,243 | 0 | 585,664,416 | 585,664,416 | 0 | 585,664,416 | 3,789,731 | 1,940,089 |
| 20,775 | 89,205,628 | 4,175,784 | 0 | 585,664,416 | 585,664,416 | 0 | 585,664,416 | 4,029,297 | 2,062,731 |
| 19,279 | 87,637,563 | 3,875,115 | 0 | 585,664,416 | 585,664,416 | 0 | 585,664,416 | 4,266,354 | 2,184,088 |
| 17,660 | 85,982,004 | 3,549,629 | 0 | 585,664,416 | 585,664,416 | 0 | 585,664,416 | 4,500,703 | 2,304,059 |
| 15,919 | 84,239,705 | 3,199,756 | 0 | 585,664,416 | 585,664,416 | 0 | 585,664,416 | 4,732,148 | 2,422,544 |
| 14,060 | 82,411,472 | 2,825,965 | 0 | 585,664,416 | 585,664,416 | 0 | 585,664,416 | 4,960,494 | 2,539,442 |
| 12,083 | 80,498,167 | 2,428,757 | 0 | 585,664,416 | 585,664,416 | 0 | 585,664,416 | 5,185,552 | 2,654,657 |
| 9,993 | 78,500,701 | 2,008,668 | 0 | 585,664,416 | 585,664,416 | 0 | 585,664,416 | 5,407,134 | 2,768,092 |
| 7,792 | 76,420,039 | 1,566,271 | 0 | 585,664,416 | 585,664,416 | 0 | 585,664,416 | 5,625,056 | 2,879,653 |
| 5,483 | 74,257,198 | 1,102,169 | 0 | 585,664,416 | 585,664,416 | 0 | 585,664,416 | 5,839,140 | 2,989,250 |
| 3,070 | 72,013,242 | 616,999 | 0 | 585,664,416 | 585,664,416 | 0 | 585,664,416 | 6,049,209 | 3,096,791 |
| 554 | 69,689,285 | 111,430 | 0 | 585,664,416 | 585,664,416 | 0 | 585,664,416 | 6,255,093 | 3,202,190 |
| 0 | 66,872,653 | | 0 | 585,664,416 | 585,664,416 | 0 | 585,664,416 | 6,456,625 | 3,305,361 |
| 0 | 63,847,992 | 0 | 0 | 585,664,416 | 585,664,416 | 4,569,612 | 585,664,416 | 6,653,646 | 3,406,223 |
| 0 | 60,728,746 | 0 | 0 | 581,094,804 | 581,094,804 | 4,702,043 | 581,094,804 | 2,276,287 | 1,165,358 |
| 0 | 59,747,276 | 0 | 0 | 576,392,761 | 576,392,761 | 4,829,708 | 576,392,761 | 2,331,490 | 1,193,567 |
| 0 | 58,740,099 | 0 | 0 | 571,563,053 | 571,563,053 | 4,955,237 | 571,563,053 | 2,386,396 | 1,221,675 |
| 0 | 57,707,111 | 0 | 0 | 571,563,053 | 566,607,816 | | 566,607,816 | 2,438,336 | 1,248,265 |

FIG. 9-6A

| | | | | | |
|---|---|---|---|---|---|
| 0 | 56,649,560 | 0 | | 5,061,516 | 561,546,300 | 2,504,291 | 1,282,030 |
| 0 | 55,573,238 | 0 | 566,607,816 | 5,126,908 | 556,419,392 | 2,372,285 | 1,214,452 |
| 0 | 54,489,574 | 0 | 561,546,300 | 5,113,189 | 551,306,203 | 2,319,962 | 1,187,666 |
| 0 | 53,419,873 | 0 | 556,419,392 | 5,087,265 | 546,218,938 | 2,280,413 | 1,167,419 |
| 0 | 52,367,285 | 0 | 551,306,203 | 5,061,474 | 541,157,464 | 2,241,292 | 1,147,392 |
| 0 | 51,331,630 | 0 | 546,218,938 | 5,035,816 | 536,121,649 | 2,202,596 | 1,127,582 |
| 0 | 50,312,725 | 0 | 541,157,464 | 5,010,290 | 531,111,359 | 2,164,322 | 1,107,988 |
| 0 | 49,310,393 | 0 | 536,121,649 | 4,984,896 | 526,126,463 | 2,126,464 | 1,088,607 |
| 0 | 48,324,455 | 0 | 531,111,359 | 4,959,632 | 521,166,831 | 2,089,019 | 1,069,438 |
| 0 | 47,354,738 | 0 | 526,126,463 | 4,934,498 | 516,232,333 | 2,051,983 | 1,050,478 |
| 0 | 46,401,066 | 0 | 521,166,831 | 4,909,494 | 511,322,839 | 2,015,352 | 1,031,725 |
| 0 | 45,463,267 | 0 | 516,232,333 | 4,884,619 | 506,438,220 | 1,979,122 | 1,013,178 |
| 0 | 44,541,171 | 0 | 511,322,839 | 4,859,871 | 501,578,349 | 1,943,289 | 994,834 |
| 0 | 43,634,608 | 0 | 506,438,220 | 4,835,251 | 496,743,098 | 1,907,850 | 976,692 |
| 0 | 42,743,411 | 0 | 501,578,349 | 4,810,758 | 491,932,339 | 1,872,800 | 958,749 |
| 0 | 41,867,414 | 0 | 496,743,098 | 4,786,391 | 487,145,948 | 1,838,137 | 941,003 |
| 0 | 41,006,453 | 0 | 491,932,339 | 4,762,150 | 482,383,798 | 1,803,855 | 923,454 |
| 0 | 40,160,363 | 0 | 487,145,948 | 4,738,033 | 477,645,765 | 1,769,953 | 906,098 |
| 0 | 39,326,985 | 0 | 482,383,798 | 4,714,041 | 472,931,724 | 1,736,425 | 888,933 |
| 0 | 38,512,157 | 0 | 477,645,765 | 4,690,172 | 468,241,553 | 1,703,268 | 871,959 |
| 0 | 37,709,722 | 0 | 472,931,724 | 4,666,426 | 463,575,127 | 1,670,479 | 855,174 |
| 0 | 36,921,522 | 0 | 468,241,553 | 4,642,802 | 458,932,325 | 1,638,054 | 838,574 |
| 0 | 36,147,402 | 0 | 463,575,127 | 4,619,300 | 454,313,025 | 1,605,989 | 822,159 |
| 0 | 35,387,208 | 0 | 458,932,325 | 4,595,919 | 449,717,106 | 1,574,282 | 805,927 |
| 0 | 34,640,787 | 0 | 454,313,025 | 4,572,658 | 445,144,447 | 1,542,929 | 789,876 |
| 0 | 33,907,988 | 0 | 449,717,106 | 4,549,496 | 440,594,930 | 1,511,925 | 774,005 |
| 0 | 33,188,661 | 0 | 445,144,447 | 4,526,518 | 436,068,434 | 1,481,269 | 758,311 |
| 0 | 32,482,657 | 0 | 440,594,930 | 4,503,593 | 431,564,841 | 1,450,956 | 742,792 |
| 0 | 31,789,830 | 0 | 436,068,434 | 4,480,808 | 427,084,033 | 1,420,983 | 727,448 |

FIG. 9-6B

EFC SERIES SYSTEM
RISK ANALYSIS AND PLANNING MODULE
REMIC POOL PLANNING AND STRESS PROCESS
APPLICATIONS PROGRAM OUTPUT

| a and z to multiple targets | | | | | | | | | |
|---|---|---|---|---|---|---|---|---|---|
| a opb for g2a-p1 a-opb2(c) | a high eom target a-hi-tar | g2a-p1 to a-hi-tar g2a-p2 | a opb after g2a-p2 a-opb3 | g2a prin remaining g2a-p3 | z opb for g2a-p3 z-opb2(c) | z high eom target z-hi-tar | g2a-p3 to z-hi-tar g2a-p4 | z opb after g2a-p4 z-opb3 | g2a prin remaining g2a-p5 |
| | | 17,590,145 | | | | | 11,437 | | |
| 99,957,624 | 99,339,173.92 | 618,450 | 99,339,174 | 177,385 | 8,517,617 | 8,506,180.29 | 11,447 | 8,506,180 | 165,948 |
| 99,278,275 | 98,591,226.46 | 687,048 | 98,591,226 | 238,247 | 8,410,936 | 8,532,607.11 | 0 | 8,410,936 | 238,247 |
| 98,504,089 | 97,756,345.63 | 747,743 | 97,756,346 | 306,682 | 8,273,325 | 8,554,531.82 | 0 | 8,273,325 | 306,682 |
| 97,635,268 | 96,834,767.87 | 800,501 | 96,834,768 | 382,617 | 8,105,160 | 8,571,970.64 | 0 | 8,105,160 | 382,617 |
| 96,672,074 | 95,826,777.90 | 845,297 | 95,826,778 | 465,969 | 7,906,605 | 8,584,945.71 | 0 | 7,906,605 | 465,969 |
| 95,614,825 | 94,732,708.70 | 882,116 | 94,732,709 | 556,645 | 7,677,867 | 8,593,485.02 | 0 | 7,677,867 | 556,645 |
| 94,463,894 | 93,552,941.40 | 910,952 | 93,552,941 | 654,545 | 7,419,198 | 8,597,622.43 | 0 | 7,419,198 | 654,545 |
| 93,219,714 | 92,287,905.05 | 931,809 | 92,287,905 | 759,559 | 7,130,892 | 8,597,397.66 | 0 | 7,130,892 | 759,559 |
| 91,882,775 | 90,938,076.51 | 944,699 | 90,938,077 | 871,568 | 6,813,287 | 8,592,856.27 | 0 | 6,813,287 | 871,568 |
| 90,453,622 | 89,503,980.11 | 949,642 | 89,503,980 | 990,447 | 6,466,764 | 8,584,049.57 | 0 | 6,466,764 | 990,447 |
| 88,932,857 | 87,986,187.38 | 946,669 | 87,986,187 | 1,116,061 | 6,091,744 | 8,571,034.58 | 0 | 6,091,744 | 1,116,061 |
| 87,321,137 | 86,385,316.68 | 935,820 | 86,385,317 | 1,248,268 | 5,688,695 | 8,553,874.05 | 0 | 5,688,695 | 1,248,268 |
| 85,619,176 | 84,702,032.85 | 917,143 | 84,702,033 | 1,386,916 | 5,258,122 | 8,532,636.34 | 0 | 5,258,122 | 1,386,916 |
| 83,827,742 | 82,937,046.77 | 890,695 | 82,937,047 | 1,531,849 | 4,800,573 | 8,507,395.30 | 0 | 4,800,573 | 1,531,849 |
| 81,947,658 | 81,091,114.84 | 856,543 | 81,091,115 | 1,682,899 | 4,316,636 | 8,478,230.26 | 0 | 4,316,636 | 1,682,899 |
| 79,979,800 | 79,165,038.48 | 814,761 | 79,165,038 | 1,839,895 | 3,806,938 | 8,445,225.93 | 0 | 3,806,938 | 1,839,895 |
| 77,925,098 | 77,159,663.63 | 765,435 | 77,159,664 | 2,002,657 | 3,272,146 | 8,408,472.24 | 0 | 3,272,146 | 2,002,657 |
| 75,784,535 | 75,075,880.03 | 708,655 | 75,075,880 | 2,170,999 | 2,712,962 | 8,368,064.28 | 0 | 2,712,962 | 2,170,999 |
| 73,559,144 | 72,914,620.62 | 644,523 | 72,914,621 | 2,344,726 | 2,130,127 | 8,324,102.20 | 0 | 2,130,127 | 2,344,726 |
| 71,250,010 | 70,676,860.93 | 573,149 | 70,676,861 | 2,523,642 | 1,524,417 | 8,276,691.01 | 0 | 1,524,417 | 2,523,642 |
| 68,858,649 | 68,363,618.19 | 494,650 | 68,363,618 | 2,707,539 | 896,643 | 8,225,940.51 | 0 | 896,643 | 2,707,539 |
| 66,385,103 | 65,975,950.70 | 409,153 | 65,975,951 | 2,896,208 | 247,647 | 8,171,965.14 | 0 | 247,647 | 2,896,208 |
| 63,829,649 | 63,514,956.96 | 314,692 | 63,514,957 | 3,091,531 | 0 | 8,114,883.80 | 0 | 0 | 3,091,531 |
| 61,193,953 | 63,321,111.51 | 0 | 61,193,953 | 1,165,358 | 0 | 8,054,819.70 | 0 | 0 | 1,165,358 |
| 60,669,946 | 63,124,049.50 | 0 | 60,669,946 | 1,193,567 | 0 | 7,991,900.22 | 0 | 0 | 1,193,567 |
| 59,623,838 | 62,922,545.26 | 0 | 59,623,838 | 1,221,675 | 0 | 7,926,256.68 | 0 | 0 | 1,221,675 |
| 58,550,372 | 62,716,755.50 | 0 | 58,550,372 | 1,248,265 | 0 | 7,858,024.29 | 0 | 0 | 1,248,265 |
| 57,450,881 | 62,507,524.43 | 0 | 57,450,881 | 1,282,030 | 0 | 7,787,850.60 | 0 | 0 | 1,282,030 |

FIG. 9-7A

| | | | | | | |
|---|---|---|---|---|---|---|
| 56,331,557 | 62,296,553.37 | 0 | 56,331,557 | 1,214,452 | 0 | 0 | 1,214,452 |
| 55,204,601 | 62,087,050.04 | 0 | 55,204,601 | 1,187,666 | 0 | 0 | 1,187,666 |
| 54,092,759 | 61,879,496.59 | 0 | 54,092,759 | 1,167,419 | 0 | 0 | 1,167,419 |
| 52,999,393 | 61,673,874.03 | 0 | 52,999,393 | 1,147,392 | 0 | 0 | 1,147,392 |
| 51,924,307 | 61,470,163.49 | 0 | 51,924,307 | 1,127,582 | 0 | 0 | 1,127,582 |
| 50,867,309 | 61,268,346.21 | 0 | 50,867,309 | 1,107,988 | 0 | 0 | 1,107,988 |
| 49,828,207 | 61,068,403.58 | 0 | 49,828,207 | 1,088,607 | 0 | 0 | 1,088,607 |
| 48,806,811 | 60,870,317.07 | 0 | 48,806,811 | 1,069,438 | 0 | 0 | 1,069,438 |
| 47,802,932 | 60,674,068.29 | 0 | 47,802,932 | 1,050,478 | 0 | 0 | 1,050,478 |
| 46,816,384 | 60,479,638.97 | 0 | 46,816,384 | 1,031,725 | 0 | 0 | 1,031,725 |
| 45,846,983 | 60,287,010.94 | 0 | 45,846,983 | 1,013,178 | 0 | 0 | 1,013,178 |
| 44,894,546 | 60,096,166.18 | 0 | 44,894,546 | 994,834 | 0 | 0 | 994,834 |
| 43,958,891 | 59,907,086.73 | 0 | 43,958,891 | 976,692 | 0 | 0 | 976,692 |
| 43,039,839 | 59,719,754.81 | 0 | 43,039,839 | 958,749 | 0 | 0 | 958,749 |
| 42,137,212 | 59,534,152.70 | 0 | 42,137,212 | 941,003 | 0 | 0 | 941,003 |
| 41,250,834 | 59,350,262.81 | 0 | 41,250,834 | 923,454 | 0 | 0 | 923,454 |
| 40,380,531 | 59,168,067.66 | 0 | 40,380,531 | 906,098 | 0 | 0 | 906,098 |
| 39,526,129 | 58,987,549.90 | 0 | 39,526,129 | 888,933 | 0 | 0 | 888,933 |
| 38,687,458 | 58,808,692.27 | 0 | 38,687,458 | 871,959 | 0 | 0 | 871,959 |
| 37,864,348 | 58,631,477.60 | 0 | 37,864,348 | 855,174 | 0 | 0 | 855,174 |
| 37,056,630 | 58,455,888.88 | 0 | 37,056,630 | 838,574 | 0 | 0 | 838,574 |
| 36,264,139 | 58,281,909.16 | 0 | 36,264,139 | 822,159 | 0 | 0 | 822,159 |
| 35,486,709 | 58,109,521.62 | 0 | 35,486,709 | 805,927 | 0 | 0 | 805,927 |
| 34,724,177 | 57,938,709.53 | 0 | 34,724,177 | 789,876 | 0 | 0 | 789,876 |
| 33,976,381 | 57,769,456.30 | 0 | 33,976,381 | 774,005 | 0 | 0 | 774,005 |
| 33,243,161 | 57,601,745.38 | 0 | 33,243,161 | 758,311 | 0 | 0 | 758,311 |
| 32,524,358 | 57,435,560.40 | 0 | 32,524,358 | 742,792 | 0 | 0 | 742,792 |
| 31,819,816 | 57,270,885.05 | 0 | 31,819,816 | 727,448 | 0 | 0 | 727,448 |

FIG. 9-7B

EFC SERIES SYSTEM
RISK ANALYSIS AND PLANNING MODULE
REMIC POOL PLANNING AND STRESS PROCESS
APPLICATIONS PROGRAM OUTPUT

| a int eom target a-int-tar | g2a-p5 to a-int-tar g2a-p6 | a opb after g2a-p6 a-opb4 | g2a prin remaining g2a-p7 | z low eom target z-low-tar | g2a-p7 to z-low-tar g2a-p8 | z opb after g2a-p8 z-opb4 | g2a prin remaining g2a-p9 | a low eom target a-low-tar | g2a-p9 to a-low-tar g2a-p10 |
|---|---|---|---|---|---|---|---|---|---|
| | 21,238,098 | | | | 92,734 | | | | 60,587,337 |
| 99,320,119.96 | 19,054 | 99,320,120 | 146,894 | 8,443,471.57 | 62,709 | 8,443,472 | 84,185 | 99,320,119.96 | 0 |
| 98,545,249.53 | 45,977 | 98,545,250 | 192,270 | 8,380,910.74 | 30,025 | 8,380,911 | 162,245 | 98,545,249.53 | 0 |
| 97,675,592.67 | 80,753 | 97,675,593 | 225,929 | 8,287,871.94 | 0 | 8,273,325 | 225,929 | 97,675,592.67 | 0 |
| 96,711,410.80 | 123,357 | 96,711,411 | 259,260 | 8,164,456.72 | 0 | 8,105,160 | 259,260 | 96,711,410.80 | 0 |
| 95,653,022.87 | 173,755 | 95,653,023 | 292,214 | 8,010,810.04 | 0 | 7,906,605 | 292,214 | 95,653,022.87 | 0 |
| 94,500,805.24 | 231,903 | 94,500,805 | 324,742 | 7,827,120.14 | 0 | 7,677,867 | 324,742 | 94,500,805.24 | 0 |
| 93,255,191.49 | 297,750 | 93,255,191 | 356,795 | 7,613,618.65 | 0 | 7,419,198 | 356,795 | 93,255,191.49 | 0 |
| 91,916,672.31 | 371,233 | 91,916,672 | 388,326 | 7,370,580.27 | 0 | 7,130,892 | 388,326 | 91,916,672.31 | 0 |
| 90,485,795.15 | 452,281 | 90,485,795 | 419,287 | 7,098,322.71 | 0 | 6,813,287 | 419,287 | 90,485,795.15 | 0 |
| 88,963,164.00 | 540,816 | 88,963,164 | 449,631 | 6,797,206.28 | 0 | 6,466,764 | 449,631 | 88,963,164.00 | 0 |
| 87,349,438.94 | 636,748 | 87,349,439 | 479,313 | 6,467,633.56 | 0 | 6,091,744 | 479,313 | 87,349,438.94 | 0 |
| 85,645,335.75 | 739,981 | 85,645,336 | 508,287 | 6,110,048.93 | 0 | 5,688,695 | 508,287 | 85,645,335.75 | 0 |
| 83,851,625.41 | 850,407 | 83,851,625 | 536,509 | 5,724,938.08 | 0 | 5,258,122 | 536,509 | 83,851,625.41 | 0 |
| 81,969,133.56 | 967,913 | 81,969,134 | 563,935 | 5,312,827.37 | 0 | 4,800,573 | 563,935 | 81,969,133.56 | 0 |
| 79,998,739.90 | 1,092,375 | 79,998,740 | 590,524 | 4,874,283.16 | 0 | 4,316,636 | 590,524 | 79,998,739.90 | 0 |
| 77,941,377.49 | 1,223,661 | 77,941,377 | 616,234 | 4,409,911.04 | 0 | 3,806,938 | 616,234 | 77,941,377.49 | 0 |
| 75,798,032.11 | 1,361,632 | 75,798,032 | 641,026 | 3,920,355.03 | 0 | 3,272,146 | 641,026 | 75,798,032.11 | 0 |
| 73,569,741.44 | 1,506,139 | 73,569,741 | 664,860 | 3,406,296.68 | 0 | 2,712,962 | 664,860 | 73,569,741.44 | 0 |
| 71,257,594.24 | 1,657,026 | 71,257,594 | 687,700 | 2,868,454.06 | 0 | 2,130,127 | 687,700 | 71,257,594.24 | 0 |
| 68,862,729.48 | 1,814,131 | 68,862,729 | 709,510 | 2,307,580.75 | 0 | 1,524,417 | 709,510 | 68,862,729.48 | 0 |
| 66,386,335.43 | 1,977,283 | 66,386,335 | 730,257 | 1,724,464.76 | 0 | 896,643 | 730,257 | 66,386,335.43 | 0 |
| 63,829,648.62 | 2,146,302 | 63,829,649 | 749,906 | 1,119,927.24 | 0 | 247,647 | 749,906 | 63,829,648.62 | 0 |
| 61,193,952.90 | 2,321,004 | 61,193,953 | 770,527 | 494,821.44 | 0 | 0 | 770,527 | 61,193,952.90 | 0 |
| 60,819,914.95 | 374,038 | 60,819,915 | 791,320 | 0.00 | 0 | 0 | 791,320 | 60,669,941.14 | 149,969 |
| 60,437,368.67 | 232,577 | 60,437,369 | 960,990 | 0.00 | 0 | 0 | 960,990 | 59,623,838.37 | 813,530 |
| 60,045,293.49 | 0 | 59,623,838 | 1,221,675 | 0.00 | 0 | 0 | 1,221,675 | 58,550,371.56 | 1,073,467 |
| 59,644,057.22 | 0 | 58,550,372 | 1,248,265 | 0.00 | 0 | 0 | 1,248,265 | 57,450,881.10 | 1,099,490 |
| 59,235,571.81 | 0 | 57,450,881 | 1,282,030 | 0.00 | 0 | 0 | 1,282,030 | 56,331,556.90 | 1,119,324 |
| 58,823,671.58 | 0 | 56,331,557 | 1,214,452 | 0.00 | 0 | 0 | 1,214,452 | 55,204,601.16 | 1,126,956 |

FIG. 9-8A

| | | | | | |
|---|---|---|---|---|---|
| 58,415,568.03 | 0 | 55,204,601 | 1,187,666 | 0.00 | 0 | 1,187,666 | 54,092,758.79 | 1,111,842 |
| 58,012,342.64 | 0 | 54,092,759 | 1,167,419 | 0.00 | 0 | 1,167,419 | 52,999,392.62 | 1,093,366 |
| 57,613,950.17 | 0 | 52,999,393 | 1,147,392 | 0.00 | 0 | 1,147,392 | 51,924,307.34 | 1,075,085 |
| 57,220,345.74 | 0 | 51,924,307 | 1,127,582 | 0.00 | 0 | 1,127,582 | 50,867,309.42 | 1,056,998 |
| 56,831,484.78 | 0 | 50,867,309 | 1,107,988 | 0.00 | 0 | 1,107,988 | 49,828,207.17 | 1,039,102 |
| 56,447,323.03 | 0 | 49,828,207 | 1,088,607 | 0.00 | 0 | 1,088,607 | 48,806,810.66 | 1,021,397 |
| 56,067,816.54 | 0 | 46,806,811 | 1,069,438 | 0.00 | 0 | 1,069,438 | 47,802,931.77 | 1,003,879 |
| 55,692,921.73 | 0 | 47,802,932 | 1,050,478 | 0.00 | 0 | 1,050,478 | 46,816,384.12 | 986,548 |
| 55,322,595.26 | 0 | 46,816,384 | 1,031,725 | 0.00 | 0 | 1,031,725 | 45,846,983.05 | 969,401 |
| 54,956,794.16 | 0 | 45,846,983 | 1,013,178 | 0.00 | 0 | 1,013,178 | 44,894,545.66 | 952,437 |
| 54,595,475.77 | 0 | 44,894,546 | 994,834 | 0.00 | 0 | 994,834 | 43,958,890.76 | 935,655 |
| 54,238,597.72 | 0 | 43,958,891 | 976,692 | 0.00 | 0 | 976,692 | 43,039,838.84 | 919,052 |
| 53,886,117.96 | 0 | 43,039,839 | 958,749 | 0.00 | 0 | 958,749 | 42,137,212.09 | 902,627 |
| 53,537,994.73 | 0 | 42,137,212 | 941,003 | 0.00 | 0 | 941,003 | 41,250,834.32 | 886,378 |
| 53,194,186.55 | 0 | 41,250,834 | 923,454 | 0.00 | 0 | 923,454 | 40,380,531.08 | 870,303 |
| 52,854,652.31 | 0 | 40,380,531 | 906,098 | 0.00 | 0 | 906,098 | 39,526,129.47 | 854,402 |
| 52,519,351.16 | 0 | 39,526,129 | 888,933 | 0.00 | 0 | 888,933 | 38,687,458.26 | 838,671 |
| 52,188,242.50 | 0 | 38,687,456 | 871,959 | 0.00 | 0 | 871,959 | 37,864,347.83 | 823,110 |
| 51,861,286.10 | 0 | 37,864,348 | 855,174 | 0.00 | 0 | 855,174 | 37,056,630.12 | 807,718 |
| 51,538,441.98 | 0 | 37,056,630 | 838,574 | 0.00 | 0 | 838,574 | 36,264,138.66 | 792,491 |
| 51,219,670.47 | 0 | 36,264,139 | 822,159 | 0.00 | 0 | 822,159 | 35,486,708.51 | 777,430 |
| 50,904,932.15 | 0 | 35,486,709 | 805,927 | 0.00 | 0 | 805,927 | 34,724,176.60 | 762,532 |
| 50,594,187.93 | 0 | 34,724,177 | 789,876 | 0.00 | 0 | 789,876 | 33,976,380.84 | 747,796 |
| 50,287,398.96 | 0 | 33,976,381 | 774,005 | 0.00 | 0 | 774,005 | 33,243,161.03 | 733,220 |
| 49,984,526.70 | 0 | 33,243,161 | 758,311 | 0.00 | 0 | 758,311 | 32,524,358.44 | 718,803 |
| 49,685,532.89 | 0 | 32,524,358 | 742,792 | 0.00 | 0 | 742,792 | 31,819,815.80 | 704,543 |
| 49,390,379.53 | 0 | 31,819,816 | 727,448 | 0.00 | 0 | 727,448 | 31,129,377.32 | 690,438 |

FIG. 9-8B

EFC SERIES SYSTEM
RISK ANALYSIS AND PLANNING MODULE
REMIC POOL PLANNING AND STRESS PROCESS
APPLICATIONS PROGRAM OUTPUT

| a opb after g2a-p10 a-opb5 | g2a prin remaining g2a-p11 | ca+cb+zo+f+s opb for g1-pcabzfs-opb1 | ca+cb+zc+f+s eom target cabzfs-tar | g2a-p11 to cabzfs-tar g2a-p12 | gwa prin not to cabzfs-tar g2a-p13 | ca+cb+zc opb for g2a-p cabz-opb1 | ca+cb+zc eom target cabz-tar | g2a-p12 to cabz-tar g2a-p14 | cabz-opb after g2a-p14 cabz-opb2 |
|---|---|---|---|---|---|---|---|---|---|
| | 71,564,734 | | | 24,755,294 | 71,564,734 | | | 3,008,149 | |
| | | | | | 46,809,440 | | | | |
| 99,320,120 | 84,185 | 62,550,420 | 62,540,615.87 | 9,804 | 74,381 | 26,190,065 | 26,187,900.25 | 2,165 | 26,187,900 |
| 98,545,250 | 162,245 | 62,540,616 | 62,527,118.00 | 13,498 | 148,747 | 26,187,900 | 26,185,200.99 | 2,699 | 26,185,201 |
| 97,675,593 | 225,929 | 62,527,118 | 62,509,678.01 | 17,440 | 208,489 | 26,185,201 | 26,181,713.45 | 3,488 | 26,181,713 |
| 96,711,411 | 259,260 | 62,509,678 | 62,488,309.12 | 21,369 | 237,891 | 26,181,713 | 26,177,440.24 | 4,273 | 26,177,440 |
| 95,653,023 | 292,214 | 62,488,309 | 62,463,030.94 | 25,278 | 266,936 | 26,177,440 | 26,172,385.30 | 5,055 | 26,172,385 |
| 94,500,805 | 324,742 | 62,463,031 | 62,433,869.60 | 29,161 | 295,580 | 26,172,385 | 26,166,553.78 | 5,832 | 26,166,554 |
| 93,255,191 | 356,795 | 62,433,870 | 62,400,857.57 | 33,012 | 323,783 | 26,166,554 | 26,159,952.14 | 6,602 | 26,159,952 |
| 91,916,672 | 388,326 | 62,400,858 | 62,364,033.84 | 36,824 | 351,502 | 26,159,952 | 26,152,588.11 | 7,364 | 26,152,588 |
| 90,485,795 | 419,287 | 62,364,034 | 62,323,443.73 | 40,590 | 378,697 | 26,152,588 | 26,144,470.66 | 8,117 | 26,144,471 |
| 88,963,164 | 449,631 | 62,323,444 | 62,279,138.90 | 44,305 | 405,326 | 26,144,471 | 26,135,610.02 | 8,861 | 26,135,610 |
| 87,349,439 | 479,313 | 62,279,139 | 62,231,177.32 | 47,962 | 431,351 | 26,135,610 | 26,126,017.66 | 9,592 | 26,126,018 |
| 85,645,336 | 508,287 | 62,231,177 | 62,179,623.14 | 51,554 | 456,733 | 26,126,018 | 26,115,706.29 | 10,311 | 26,115,706 |
| 83,851,625 | 536,509 | 62,179,623 | 62,124,546.61 | 55,077 | 481,432 | 26,115,706 | 26,104,689.81 | 11,016 | 26,104,690 |
| 81,969,134 | 563,935 | 62,124,547 | 62,066,024.06 | 58,523 | 505,413 | 26,104,690 | 26,092,983.32 | 11,706 | 26,092,983 |
| 79,998,740 | 590,524 | 62,066,024 | 62,004,137.69 | 61,886 | 528,638 | 26,092,983 | 26,080,603.07 | 12,380 | 26,080,603 |
| 77,941,377 | 616,234 | 62,004,138 | 61,938,975.50 | 65,162 | 551,072 | 26,080,603 | 26,067,566.48 | 13,037 | 26,067,566 |
| 75,798,032 | 641,026 | 61,938,976 | 61,870,631.09 | 68,344 | 572,681 | 26,067,566 | 26,053,892.08 | 13,674 | 26,053,892 |
| 73,569,741 | 664,860 | 61,870,631 | 61,799,203.64 | 71,427 | 593,433 | 26,053,892 | 26,039,599.46 | 14,293 | 26,039,599 |
| 71,257,594 | 687,700 | 61,799,204 | 61,724,797.59 | 74,406 | 613,294 | 26,039,599 | 26,024,709.30 | 14,890 | 26,024,709 |
| 68,862,729 | 709,510 | 61,724,798 | 61,647,522.56 | 77,275 | 632,235 | 26,024,709 | 26,009,243.28 | 15,466 | 26,009,243 |
| 66,386,335 | 730,257 | 61,647,523 | 61,567,493.18 | 80,029 | 650,227 | 26,009,243 | 25,993,224.09 | 16,019 | 25,993,224 |
| 63,829,649 | 749,906 | 61,567,493 | 61,484,828.83 | 82,664 | 667,242 | 25,993,224 | 25,976,675.32 | 16,549 | 25,976,675 |
| 61,193,953 | 770,527 | 61,065,234 | 61,399,653.46 | 0 | 770,527 | 25,976,675 | 25,959,621.52 | 0 | 25,959,622 |
| 60,669,946 | 641,351 | 60,294,707 | 61,312,095.38 | 0 | 641,351 | 25,959,622 | 25,942,087.68 | 0 | 25,942,088 |
| 59,623,838 | 147,459 | 59,653,356 | 61,222,287.03 | 0 | 147,459 | 25,942,088 | 25,924,100.81 | | |

FIG. 9-9A

| | | | | | | | |
|---|---|---|---|---|---|---|---|
| 58,550,372 | 148,208 | 59,505,897 | 61,130,364.77 | 0 | 148,208 | 25,905,687.49 | 0 | 25,924,101 |
| 57,450,881 | 148,775 | 59,357,688 | 61,036,468.56 | 0 | 148,775 | 25,886,875.41 | 0 | 25,905,687 |
| 56,331,557 | 162,705 | 59,208,913 | 60,941,159.29 | 0 | 162,705 | 25,867,776.55 | 0 | 25,886,875 |
| 55,204,601 | 87,496 | 59,046,208 | 60,845,514.73 | 0 | 87,496 | 25,848,606.36 | 0 | 25,867,777 |
| 54,092,759 | 75,824 | 58,958,712 | 60,751,516.33 | 0 | 75,824 | 25,829,761.32 | 0 | 25,848,606 |
| 52,999,393 | 74,053 | 58,882,889 | 60,659,449.14 | 0 | 74,053 | 25,811,298.58 | 0 | 25,829,761 |
| 51,924,307 | 72,307 | 58,808,836 | 60,569,287.45 | 0 | 72,307 | 25,793,213.11 | 0 | 25,811,299 |
| 50,867,309 | 70,584 | 58,736,529 | 60,481,005.81 | 0 | 70,584 | 25,775,499.96 | 0 | 25,793,213 |
| 49,828,207 | 68,886 | 58,665,945 | 60,394,579.08 | 0 | 68,886 | 25,758,154.22 | 0 | 25,775,500 |
| 48,806,811 | 67,211 | 58,597,059 | 60,309,982.40 | 0 | 67,211 | 25,741,171.03 | 0 | 25,758,154 |
| 47,802,932 | 65,559 | 58,529,848 | 60,227,191.21 | 0 | 65,559 | 25,724,545.59 | 0 | 25,741,171 |
| 46,816,384 | 63,930 | 58,464,289 | 60,146,181.23 | 0 | 63,930 | 25,708,273.16 | 0 | 25,724,546 |
| 45,846,983 | 62,324 | 58,400,358 | 60,066,928.41 | 0 | 62,324 | 25,692,349.05 | 0 | 25,708,273 |
| 44,894,546 | 60,741 | 58,338,034 | 59,989,409.04 | 0 | 60,741 | 25,676,768.62 | 0 | 25,692,349 |
| 43,958,891 | 59,179 | 58,277,293 | 59,913,599.64 | 0 | 59,179 | 25,661,527.28 | 0 | 25,676,769 |
| 43,039,839 | 57,640 | 58,218,114 | 59,839,477.03 | 0 | 57,640 | 25,646,620.50 | 0 | 25,661,527 |
| 42,137,212 | 56,122 | 58,160,474 | 59,767,018.28 | 0 | 56,122 | 25,632,043.80 | 0 | 25,646,620 |
| 41,250,834 | 54,626 | 58,104,352 | 59,696,200.70 | 0 | 54,626 | 25,617,792.75 | 0 | 25,632,044 |
| 40,380,531 | 53,150 | 58,049,726 | 59,627,001.91 | 0 | 53,150 | 25,603,862.96 | 0 | 25,617,793 |
| 39,526,129 | 51,696 | 57,996,576 | 59,559,399.76 | 0 | 51,696 | 25,590,250.10 | 0 | 25,603,863 |
| 38,687,456 | 50,262 | 57,994,880 | 59,493,372.36 | 0 | 50,262 | 25,576,949.90 | 0 | 25,590,250 |
| 37,864,348 | 48,849 | 57,894,618 | 59,428,898.06 | 0 | 48,849 | 25,563,958.11 | 0 | 25,576,950 |
| 37,056,630 | 47,456 | 57,845,769 | 58,365,955.47 | 0 | 47,456 | 25,551,270.56 | 0 | 25,563,958 |
| 36,264,139 | 46,083 | 57,798,313 | 59,304,523.47 | 0 | 46,083 | 25,538,883.10 | 0 | 25,551,271 |
| 35,486,709 | 44,729 | 57,752,230 | 59,244,581.13 | 0 | 44,729 | 25,526,791.65 | 0 | 25,538,883 |
| 34,724,177 | 43,395 | 57,707,501 | 59,186,107.84 | 0 | 43,395 | 25,514,992.15 | 0 | 25,526,792 |
| 33,976,381 | 42,081 | 57,664,105 | 59,129,083.15 | 0 | 42,081 | 25,503,480.62 | 0 | 25,514,992 |
| 33,243,161 | 40,785 | 57,622,025 | 59,073,486.88 | 0 | 40,785 | 25,492,253.11 | 0 | 25,503,481 |
| 32,524,358 | 38,508 | 57,581,240 | 59,019,299.11 | 0 | 39,508 | 25,481,305.69 | 0 | 25,492,253 |
| 31,819,816 | 38,250 | 57,541,732 | 58,966,500.11 | 0 | 38,250 | 25,470,634.52 | 0 | 25,481,306 |
| 31,129,377 | 37,010 | 57,503,482 | 58,915,070.42 | 0 | 37,010 | 25,460,235.78 | 0 | 25,470,635 |

FIG. 9-9B

EFC SERIES SYSTEM
RISK ANALYSIS AND PLANNING MODULE
REMIC POOL PLANNING AND STRESS PROCESS
APPLICATIONS PROGRAM OUTPUT

| g2a-p14 remaining g2a-p15 | f+s opb for g2a-p15 fs-opb1 | g2a-p15 to fs-opb g2a-p16 | fs-opb after g2a-p16 fs-opb2 | g2a-p16 remaining g2a-p17 | g2a-p17 to cabz no tar g2a-p18 | cabz-opb after g2a-p1 cabz-opb3 | g2a-p18 remaining g2a-p19 | all ga2 remaining p13+p19 | group 1 step 2(a)(vii); z pay o ||| 
|---|---|---|---|---|---|---|---|---|---|---|---|
| | | | | | | | | | z-opb for p13+p19 z-opb4(c) | g2a p13+p19 to z-opb4 g2a-p20 | |
| 21,747,145 | | 21,747,145 | | | 0 | | | 46,809,440 | | 8,955,489 | |
| 7,639 | 36,360,355 | 7,639 | 36,352,716 | | 0 | 26,187,900 | 0 | 74,381 | 8,443,472 | 74,381 | |
| 10,799 | 36,352,716 | 10,799 | 36,341,917 | | 0 | 26,185,201 | 0 | 148,747 | 8,380,911 | 148,747 | |
| 13,952 | 36,341,917 | 13,952 | 36,327,965 | | 0 | 26,181,713 | 0 | 208,489 | 8,273,325 | 208,489 | |
| 17,096 | 36,327,965 | 17,096 | 36,310,869 | | 0 | 26,177,440 | 0 | 237,891 | 8,105,160 | 237,891 | |
| 20,223 | 36,310,869 | 20,223 | 36,290,646 | | 0 | 26,172,385 | 0 | 266,936 | 7,906,605 | 266,936 | |
| 23,330 | 36,290,646 | 23,330 | 36,267,316 | | 0 | 26,166,554 | 0 | 295,580 | 7,677,867 | 295,580 | |
| 26,410 | 36,267,316 | 26,410 | 36,240,905 | | 0 | 26,159,952 | 0 | 323,783 | 7,419,198 | 323,783 | |
| 29,460 | 36,240,905 | 29,460 | 36,211,446 | | 0 | 26,152,588 | 0 | 351,502 | 7,130,892 | 351,502 | |
| 32,473 | 36,211,446 | 32,473 | 36,178,973 | | 0 | 26,144,471 | 0 | 378,697 | 6,813,287 | 378,697 | |
| 35,444 | 36,178,973 | 35,444 | 36,143,529 | | 0 | 26,135,610 | 0 | 405,326 | 6,466,764 | 405,326 | |
| 38,369 | 36,143,529 | 38,369 | 36,105,160 | | 0 | 26,126,018 | 0 | 431,351 | 6,091,744 | 431,351 | |
| 41,243 | 36,105,160 | 41,243 | 36,063,917 | | 0 | 26,115,706 | 0 | 456,733 | 5,688,595 | 456,733 | |
| 44,060 | 36,063,917 | 44,060 | 36,019,857 | | 0 | 26,104,690 | 0 | 481,432 | 5,258,122 | 481,432 | |
| 46,816 | 36,019,857 | 46,816 | 35,973,041 | | 0 | 26,092,983 | 0 | 505,413 | 4,800,573 | 505,413 | |
| 49,506 | 35,973,041 | 49,506 | 35,923,535 | | 0 | 26,080,603 | 0 | 528,638 | 4,316,636 | 528,638 | |
| 52,126 | 35,923,535 | 52,126 | 35,871,409 | | 0 | 26,067,566 | 0 | 551,072 | 3,806,938 | 551,072 | |
| 54,670 | 35,871,409 | 54,670 | 35,816,739 | | 0 | 26,053,892 | 0 | 572,681 | 3,272,146 | 572,681 | |
| 57,135 | 35,816,739 | 57,135 | 35,759,604 | | 0 | 26,039,599 | 0 | 593,433 | 2,712,962 | 593,433 | |
| 59,516 | 35,759,604 | 59,516 | 35,700,088 | | 0 | 26,024,709 | 0 | 613,294 | 2,130,127 | 613,294 | |
| 61,809 | 35,700,088 | 61,809 | 35,638,279 | | 0 | 26,009,243 | 0 | 632,235 | 1,524,417 | 632,235 | |
| 64,010 | 35,638,279 | 64,010 | 35,574,269 | | 0 | 25,993,224 | 0 | 650,227 | 896,643 | 650,227 | |
| 66,116 | 35,574,269 | 66,116 | 35,508,154 | | 0 | 25,976,675 | 0 | 667,242 | 247,647 | 247,647 | |
| 0 | 35,508,154 | 0 | 35,088,559 | | 0 | 25,976,675 | 0 | 770,527 | 0 | 0 | |
| 0 | 35,088,559 | 0 | 34,335,086 | | 0 | 25,959,622 | 0 | 641,351 | | 0 | |
| 0 | 34,335,086 | 0 | 33,711,268 | | 0 | 25,942,088 | 0 | 147,459 | | 0 | |
| 0 | 33,711,268 | 0 | 33,581,796 | | 0 | 25,924,101 | 0 | 148,208 | | 0 | |
| 0 | 33,581,796 | 0 | 33,452,001 | | 0 | 25,905,687 | 0 | 148,775 | | 0 | |

FIG. 9-10A

| | | | | | | | | |
|---|---|---|---|---|---|---|---|---|
| 0 | 33,322,038 | 0 | 33,322,038 | 0 | 25,886,875 | 0 | 162,705 | 0 |
| 0 | 33,178,431 | 0 | 33,178,431 | 0 | 25,867,777 | 0 | 87,496 | 0 |
| 0 | 33,110,106 | 0 | 33,110,106 | 0 | 25,848,606 | 0 | 75,824 | 0 |
| 0 | 33,053,127 | 0 | 33,053,127 | 0 | 25,829,761 | 0 | 74,053 | 0 |
| 0 | 32,997,537 | 0 | 32,997,537 | 0 | 25,811,299 | 0 | 72,307 | 0 |
| 0 | 32,943,316 | 0 | 32,943,316 | 0 | 25,793,213 | 0 | 70,584 | 0 |
| 0 | 32,890,445 | 0 | 32,890,445 | 0 | 25,775,500 | 0 | 68,886 | 0 |
| 0 | 32,838,905 | 0 | 32,838,905 | 0 | 25,758,154 | 0 | 67,211 | 0 |
| 0 | 32,788,677 | 0 | 32,788,677 | 0 | 25,741,171 | 0 | 65,559 | 0 |
| 0 | 32,739,743 | 0 | 32,739,743 | 0 | 25,724,546 | 0 | 63,930 | 0 |
| 0 | 32,692,085 | 0 | 32,692,085 | 0 | 25,708,273 | 0 | 62,324 | 0 |
| 0 | 32,645,685 | 0 | 32,645,685 | 0 | 25,692,349 | 0 | 60,741 | 0 |
| 0 | 32,600,524 | 0 | 32,600,524 | 0 | 25,676,769 | 0 | 59,179 | 0 |
| 0 | 32,556,586 | 0 | 32,556,586 | 0 | 25,661,527 | 0 | 57,640 | 0 |
| 0 | 32,513,853 | 0 | 32,513,853 | 0 | 25,646,621 | 0 | 56,122 | 0 |
| 0 | 32,472,308 | 0 | 32,472,308 | 0 | 25,632,044 | 0 | 54,626 | 0 |
| 0 | 32,431,933 | 0 | 32,431,933 | 0 | 25,617,793 | 0 | 53,150 | 0 |
| 0 | 32,392,713 | 0 | 32,392,713 | 0 | 25,603,863 | 0 | 51,696 | 0 |
| 0 | 32,354,630 | 0 | 32,354,630 | 0 | 25,590,250 | 0 | 50,262 | 0 |
| 0 | 32,317,668 | 0 | 32,317,668 | 0 | 25,576,950 | 0 | 48,849 | 0 |
| 0 | 32,281,811 | 0 | 32,281,811 | 0 | 25,563,958 | 0 | 47,456 | 0 |
| 0 | 32,247,042 | 0 | 32,247,042 | 0 | 25,551,271 | 0 | 46,083 | 0 |
| 0 | 32,213,347 | 0 | 32,213,347 | 0 | 25,538,883 | 0 | 44,729 | 0 |
| 0 | 32,180,709 | 0 | 32,180,709 | 0 | 25,526,792 | 0 | 43,395 | 0 |
| 0 | 32,149,113 | 0 | 32,149,113 | 0 | 25,514,992 | 0 | 42,081 | 0 |
| 0 | 32,118,544 | 0 | 32,118,544 | 0 | 25,503,481 | 0 | 40,785 | 0 |
| 0 | 32,088,987 | 0 | 32,088,987 | 0 | 25,492,253 | 0 | 39,508 | 0 |
| 0 | 32,060,426 | 0 | 32,060,425 | 0 | 25,481,306 | 0 | 38,250 | 0 |
| 0 | 32,032,848 | 0 | 32,032,848 | 0 | 25,470,635 | 0 | 37,010 | 0 |

FIG. 9-10B

EFC SERIES SYSTEM
RISK ANALYSIS AND PLANNING MODULE
REMIC POOL PLANNING AND STRESS PROCESS
APPLICATIONS PROGRAM OUTPUT

| | | group 1 step 2(a)(viii) | | | | | | | |
|---|---|---|---|---|---|---|---|---|---|
| z-opb4 after g2a-p20 z-opb5 | g2a-p20 remaining g2a-p21 | ca+cb+zc opb for g2a-p2 cabz-opb3(c) | ca+cb+zc eom target cabz-tar(c) | g2a-p21 to cabz-tar g2a-p22 | cabz-opb after g2a-p22 cabz-opb4 | g2a-p22 remaining g2a-p23 | f+s opb for g2a-p23 fs-opb2(c) | g2a-p23 to fs-opb g2a-p24 | fs-opb after g2a-p24 fs-opb3 |
| 8,369,091 | 0 | 26,187,900 | 26,187,900 | 23,181,916 | 26,187,900 | 0 | 36,352,716 | 14,613,210 | 36,352,716 |
| 8,232,164 | 0 | 26,185,201 | 26,185,201 | 0 | 26,185,201 | 0 | 36,341,917 | 0 | 36,341,917 |
| 8,064,835 | 0 | 26,181,713 | 26,181,713 | 0 | 26,181,713 | 0 | 36,327,965 | 0 | 36,327,965 |
| 7,867,268 | 0 | 26,177,440 | 26,177,440 | 0 | 26,177,440 | 0 | 36,310,869 | 0 | 36,310,869 |
| 7,639,669 | 0 | 26,172,385 | 26,172,385 | 0 | 26,172,385 | 0 | 36,290,646 | 0 | 36,290,646 |
| 7,382,287 | 0 | 26,166,554 | 26,166,554 | 0 | 26,166,554 | 0 | 36,267,316 | 0 | 36,267,316 |
| 7,095,415 | 0 | 26,159,952 | 26,159,952 | 0 | 26,159,952 | 0 | 36,240,905 | 0 | 36,240,905 |
| 6,779,390 | 0 | 26,152,588 | 26,152,588 | 0 | 26,152,588 | 0 | 36,211,446 | 0 | 36,211,446 |
| 6,434,591 | 0 | 26,144,471 | 26,144,471 | 0 | 26,144,471 | 0 | 36,178,973 | 0 | 36,178,973 |
| 6,061,437 | 0 | 26,135,610 | 26,135,610 | 0 | 26,135,610 | 0 | 36,143,529 | 0 | 36,143,529 |
| 5,660,393 | 0 | 26,126,018 | 26,126,018 | 0 | 26,126,018 | 0 | 36,105,160 | 0 | 36,105,160 |
| 5,231,962 | 0 | 26,115,706 | 26,115,706 | 0 | 26,115,706 | 0 | 36,063,917 | 0 | 36,063,917 |
| 4,776,690 | 0 | 26,104,690 | 26,104,690 | 0 | 26,104,690 | 0 | 36,019,857 | 0 | 36,019,857 |
| 4,295,160 | 0 | 26,092,983 | 26,092,983 | 0 | 26,092,983 | 0 | 35,973,041 | 0 | 35,973,041 |
| 3,787,998 | 0 | 26,080,603 | 26,080,603 | 0 | 26,080,603 | 0 | 35,923,535 | 0 | 35,923,535 |
| 3,255,866 | 0 | 26,067,566 | 26,067,566 | 0 | 26,067,566 | 0 | 35,871,409 | 0 | 35,871,409 |
| 2,699,464 | 0 | 26,053,892 | 26,053,892 | 0 | 26,053,892 | 0 | 35,816,739 | 0 | 35,816,739 |
| 2,119,529 | 0 | 26,039,599 | 26,039,599 | 0 | 26,039,599 | 0 | 35,759,604 | 0 | 35,759,604 |
| 1,516,833 | 0 | 26,024,709 | 26,024,709 | 0 | 26,024,709 | 0 | 35,700,088 | 0 | 35,700,088 |
| 892,182 | 0 | 26,009,243 | 26,009,243 | 0 | 26,009,243 | 0 | 35,638,279 | 0 | 35,638,279 |
| 246,415 | 0 | 25,993,224 | 25,993,224 | 0 | 25,993,224 | 0 | 35,574,269 | 0 | 35,574,269 |
| 0 | 419,595 | 25,976,675 | 25,976,675 | 0 | 25,976,675 | 419,595 | 35,508,154 | 419,595 | 35,088,559 |
| 0 | 770,527 | 25,959,622 | 25,959,622 | 0 | 25,959,622 | 753,473 | 35,088,559 | 753,473 | 34,335,086 |
| 0 | 641,351 | 25,942,088 | 25,942,088 | 17,054 | 25,942,088 | 623,818 | 34,335,086 | 623,818 | 33,711,268 |
| 0 | 147,459 | 25,924,101 | 25,924,101 | 17,534 | 25,924,101 | 129,472 | 33,711,268 | 129,472 | 33,581,796 |
| 0 | 148,208 | 25,905,687 | 25,905,687 | 17,987 | 25,905,687 | 129,795 | 33,581,796 | 129,795 | 33,452,001 |
| 0 | 148,775 | 25,886,875 | 25,886,875 | 18,413 | 25,886,875 | 129,963 | 33,452,001 | 129,963 | 33,322,038 |
| | | | | 18,812 | | | | | |

FIG. 9-11A

| | | | | | | |
|---|---|---|---|---|---|---|
| 0 | 162,705 | 25,886,875 | 25,867,777 | 19,099 | 33,322,038 | 143,607 | 33,178,431 |
| 0 | 87,496 | 25,867,777 | 25,848,606 | 19,170 | 33,178,431 | 68,326 | 33,110,106 |
| 0 | 75,824 | 25,848,606 | 25,829,761 | 19,945 | 33,110,106 | 56,978 | 33,053,127 |
| 0 | 74,053 | 25,829,761 | 25,811,299 | 18,463 | 33,053,127 | 55,590 | 32,997,537 |
| 0 | 72,307 | 25,811,299 | 25,793,213 | 18,085 | 32,997,537 | 54,221 | 32,943,316 |
| 0 | 70,584 | 25,793,213 | 25,775,500 | 17,713 | 32,943,316 | 52,871 | 32,890,445 |
| 0 | 68,886 | 25,775,500 | 25,758,154 | 17,346 | 32,890,445 | 51,540 | 32,838,905 |
| 0 | 67,211 | 25,758,154 | 25,741,171 | 16,983 | 32,838,905 | 50,228 | 32,788,677 |
| 0 | 65,559 | 25,741,171 | 25,724,546 | 16,625 | 32,788,677 | 48,934 | 32,739,743 |
| 0 | 63,930 | 25,724,546 | 25,708,273 | 16,272 | 32,739,743 | 47,658 | 32,692,085 |
| 0 | 62,324 | 25,708,273 | 25,692,349 | 15,924 | 32,692,085 | 48,400 | 32,645,685 |
| 0 | 60,741 | 25,692,349 | 25,676,769 | 15,580 | 32,645,685 | 45,160 | 32,600,524 |
| 0 | 59,179 | 25,676,769 | 25,661,527 | 15,241 | 32,600,524 | 43,938 | 32,556,586 |
| 0 | 57,640 | 25,661,527 | 25,646,621 | 14,907 | 32,556,586 | 42,733 | 32,513,853 |
| 0 | 56,122 | 25,646,621 | 25,632,044 | 14,577 | 32,513,853 | 41,545 | 32,472,308 |
| 0 | 54,626 | 25,632,044 | 25,617,793 | 14,251 | 32,472,308 | 40,375 | 32,431,933 |
| 0 | 53,150 | 25,617,793 | 25,603,863 | 13,930 | 32,431,933 | 39,221 | 32,392,713 |
| 0 | 51,696 | 25,603,863 | 25,590,250 | 13,613 | 32,392,713 | 38,083 | 32,354,630 |
| 0 | 50,262 | 25,590,250 | 25,576,950 | 13,300 | 32,354,630 | 36,962 | 32,317,668 |
| 0 | 48,849 | 25,576,950 | 25,563,958 | 12,992 | 32,317,668 | 35,857 | 32,281,811 |
| 0 | 47,456 | 25,563,958 | 25,551,271 | 12,688 | 32,281,811 | 34,768 | 32,247,042 |
| 0 | 46,083 | 25,551,271 | 25,538,883 | 12,387 | 32,247,042 | 33,695 | 32,213,347 |
| 0 | 44,729 | 25,538,883 | 25,526,792 | 12,091 | 32,213,347 | 32,638 | 32,180,709 |
| 0 | 43,395 | 25,526,792 | 25,514,992 | 11,800 | 32,180,709 | 31,598 | 32,149,113 |
| 0 | 42,081 | 25,514,992 | 25,503,481 | 11,512 | 32,149,113 | 30,569 | 32,118,544 |
| 0 | 40,785 | 25,503,481 | 25,492,253 | 11,228 | 32,118,544 | 29,557 | 32,088,987 |
| 0 | 38,508 | 25,492,253 | 25,481,306 | 10,947 | 32,088,987 | 28,561 | 32,060,426 |
| 0 | 38,250 | 25,481,306 | 25,470,635 | 10,671 | 32,060,426 | 27,579 | 32,032,848 |
| 0 | 37,010 | 25,470,635 | 25,460,236 | 10,399 | 32,032,848 | 26,611 | 32,006,237 |

FIG. 9-11B

EFC SERIES SYSTEM
RISK ANALYSIS AND PLANNING MODULE
REMIC POOL PLANNING AND STRESS PROCESS
APPLICATIONS PROGRAM OUTPUT

| g2a-p24 remaining g2a-p25 | g2a-p25 to cabz-opb g2a-p26 | cabz-opb after g2a-p26 cabz-opb5 | g2a-p26 remaining g2a-p27 | group 1 step 2(a)(1x) | | | g2a-p28 remaining g2a-p29 | group 1 step step2(b) g1 prin g2b-p1 |
|---|---|---|---|---|---|---|---|---|
| | | | | a opb for g2a-p27 a-opb5(c) | g2a-p27 to a-opb g2a-p28 | a-opb after g2a-p28 a-opb6 | | |
| | 0 | | | | | | 58,825 | 163,108,482 |
| 0 | 0 | 26,187,900 | 0 | 99,320,120 | 0 | 99,320,120 | 0 | 758,733 |
| 0 | 0 | 26,185,201 | 0 | 98,545,250 | 0 | 98,545,250 | 0 | 882,158 |
| 0 | 0 | 26,181,713 | 0 | 97,675,593 | 0 | 97,675,593 | 0 | 1,005,268 |
| 0 | 0 | 26,177,440 | 0 | 96,711,411 | 0 | 96,711,411 | 0 | 1,127,961 |
| 0 | 0 | 26,172,385 | 0 | 95,653,023 | 0 | 95,653,023 | 0 | 1,250,134 |
| 0 | 0 | 26,166,554 | 0 | 94,500,805 | 0 | 94,500,805 | 0 | 1,371,686 |
| 0 | 0 | 26,159,952 | 0 | 93,255,191 | 0 | 93,255,191 | 0 | 1,492,513 |
| 0 | 0 | 26,152,588 | 0 | 91,916,672 | 0 | 91,916,672 | 0 | 1,612,516 |
| 0 | 0 | 26,144,471 | 0 | 90,485,795 | 0 | 90,485,795 | 0 | 1,731,592 |
| 0 | 0 | 26,135,610 | 0 | 88,963,164 | 0 | 88,963,164 | 0 | 1,849,642 |
| 0 | 0 | 26,126,018 | 0 | 87,349,439 | 0 | 87,349,439 | 0 | 1,966,566 |
| 0 | 0 | 26,115,706 | 0 | 85,645,336 | 0 | 85,645,336 | 0 | 2,082,265 |
| 0 | 0 | 26,104,690 | 0 | 83,851,625 | 0 | 83,851,625 | 0 | 2,196,644 |
| 0 | 0 | 26,092,983 | 0 | 81,969,134 | 0 | 81,969,134 | 0 | 2,309,604 |
| 0 | 0 | 26,080,603 | 0 | 79,998,740 | 0 | 79,998,740 | 0 | 2,421,053 |
| 0 | 0 | 26,067,566 | 0 | 77,941,377 | 0 | 77,941,377 | 0 | 2,530,896 |
| 0 | 0 | 26,053,892 | 0 | 75,798,032 | 0 | 75,798,032 | 0 | 2,639,042 |
| 0 | 0 | 26,039,599 | 0 | 73,569,741 | 0 | 73,569,741 | 0 | 2,745,403 |
| 0 | 0 | 26,024,709 | 0 | 71,257,594 | 0 | 71,257,594 | 0 | 2,849,890 |
| 0 | 0 | 26,009,243 | 0 | 68,862,729 | 0 | 68,862,729 | 0 | 2,952,418 |
| 0 | 0 | 25,993,224 | 0 | 66,386,335 | 0 | 66,386,335 | 0 | 3,052,903 |
| 0 | 0 | 25,976,675 | 0 | 63,829,649 | 0 | 63,829,649 | 0 | 3,151,264 |
| 0 | 0 | 25,959,622 | 0 | 61,193,953 | 0 | 61,193,953 | 0 | 3,247,424 |
| 0 | 0 | 25,942,088 | 0 | 60,669,946 | 0 | 60,669,946 | 0 | 1,111,029 |
| 0 | 0 | 25,924,101 | 0 | 59,623,838 | 0 | 59,623,838 | 0 | 1,137,923 |
| 0 | 0 | 25,905,687 | 0 | 58,550,372 | 0 | 58,550,372 | 0 | 1,164,720 |
| 0 | 0 | 25,886,875 | 0 | 57,450,881 | 0 | 57,450,881 | 0 | 1,190,071 |

FIG. 9-12A

| | | | | | | |
|---|---|---|---|---|---|---|
| 0 | 25,867,777 | 0 | 56,331,557 | 0 | 56,331,557 | 1,222,261 |
| 0 | 25,848,606 | 0 | 55,204,601 | 0 | 55,204,601 | 1,157,834 |
| 0 | 25,829,761 | 0 | 54,092,759 | 0 | 54,092,759 | 1,132,297 |
| 0 | 25,811,299 | 0 | 52,999,393 | 0 | 52,999,393 | 1,112,994 |
| 0 | 25,793,213 | 0 | 51,924,307 | 0 | 51,924,307 | 1,093,900 |
| 0 | 25,775,500 | 0 | 50,867,309 | 0 | 50,867,309 | 1,075,014 |
| 0 | 25,758,154 | 0 | 49,828,207 | 0 | 49,828,207 | 1,056,333 |
| 0 | 25,741,171 | 0 | 48,806,811 | 0 | 48,806,811 | 1,037,856 |
| 0 | 25,724,546 | 0 | 47,802,932 | 0 | 47,802,932 | 1,019,581 |
| 0 | 25,708,273 | 0 | 46,816,384 | 0 | 46,816,384 | 1,001,505 |
| 0 | 25,692,349 | 0 | 45,846,983 | 0 | 45,846,983 | 983,626 |
| 0 | 25,676,769 | 0 | 44,894,546 | 0 | 44,894,546 | 965,944 |
| 0 | 25,661,527 | 0 | 43,958,891 | 0 | 43,958,891 | 948,455 |
| 0 | 25,646,621 | 0 | 43,039,839 | 0 | 43,039,839 | 931,158 |
| 0 | 25,632,044 | 0 | 42,137,212 | 0 | 42,137,212 | 914,052 |
| 0 | 25,617,793 | 0 | 41,250,834 | 0 | 41,250,834 | 897,134 |
| 0 | 25,603,863 | 0 | 40,380,531 | 0 | 40,380,531 | 880,402 |
| 0 | 25,590,250 | 0 | 39,526,129 | 0 | 39,526,129 | 863,855 |
| 0 | 25,576,950 | 0 | 38,687,456 | 0 | 38,687,456 | 847,491 |
| 0 | 25,563,958 | 0 | 37,864,348 | 0 | 37,864,348 | 831,038 |
| 0 | 25,551,271 | 0 | 37,056,630 | 0 | 37,056,630 | 815,305 |
| 0 | 25,538,883 | 0 | 36,264,139 | 0 | 36,264,139 | 799,480 |
| 0 | 25,526,792 | 0 | 35,486,709 | 0 | 35,486,709 | 783,830 |
| 0 | 25,514,992 | 0 | 34,724,177 | 0 | 34,724,177 | 768,355 |
| 0 | 25,503,481 | 0 | 33,976,381 | 0 | 33,976,381 | 753,052 |
| 0 | 25,492,253 | 0 | 33,243,161 | 0 | 33,243,161 | 737,920 |
| 0 | 25,481,306 | 0 | 32,524,358 | 0 | 32,524,358 | 722,958 |
| 0 | 25,470,635 | 0 | 31,819,816 | 0 | 31,819,816 | 708,163 |
| 0 | 25,460,236 | 0 | 31,129,377 | 0 | 31,129,377 | 693,534 |

FIG. 9-12B

EFC SERIES SYSTEM
RISK ANALYSIS AND PLANNING MODULE
REMIC POOL PLANNING AND STRESS PROCESS
APPLICATIONS PROGRAM OUTPUT

| (b)(i) to 1+zq aggregate target | | | | | | | | |
|---|---|---|---|---|---|---|---|---|
| q opb for g2b-p1 q-opb6(c) | zq opb for zp accrual zq-opb3(c) | q+zq opb for zp accrual q+zq-opb2 | g2b-p1 to q+zq-target g2b-p2 | g2b-p1 not to q+zq-target g2b-p3 | g2b-p2 to q target g2b-p4 | q opb after g2b-p4 q-opb6 | g2b-p4 remaining g2b-p5 | g2b-p5 to zq g2b-p6 |
| | | | | | 35,398,661 | | | 5,720,278 |
| 99,947,564 | 5,720,278 | 105,667,842 | 647,653 | 111,079 | 611,417 | 99,336,147 | 36,236 | 36,236 |
| 99,283,773 | 5,684,042 | 104,967,815 | 767,397 | 114,761 | 703,603 | 98,580,170 | 63,794 | 63,794 |
| 98,527,995 | 5,620,249 | 104,148,244 | 886,389 | 118,879 | 795,728 | 97,732,267 | 90,661 | 90,661 |
| 97,680,426 | 5,529,588 | 103,210,014 | 1,005,171 | 122,789 | 887,733 | 96,792,692 | 117,438 | 117,438 |
| 96,741,317 | 5,412,150 | 102,153,467 | 1,123,650 | 126,485 | 979,561 | 95,761,755 | 144,088 | 144,088 |
| 95,710,979 | 5,268,062 | 100,979,041 | 1,241,728 | 129,958 | 1,071,155 | 94,639,824 | 170,572 | 170,572 |
| 94,589,778 | 5,097,489 | 99,687,267 | 1,359,310 | 133,203 | 1,162,457 | 93,427,320 | 196,853 | 196,853 |
| 93,378,136 | 4,900,637 | 98,278,773 | 1,476,301 | 136,215 | 1,253,411 | 92,124,725 | 222,891 | 222,891 |
| 92,076,531 | 4,677,746 | 96,754,278 | 1,592,607 | 138,985 | 1,343,958 | 90,732,573 | 248,648 | 248,648 |
| 90,685,499 | 4,429,098 | 95,114,597 | 1,708,131 | 141,511 | 1,434,043 | 89,251,456 | 274,089 | 274,089 |
| 89,205,628 | 4,155,009 | 93,360,637 | 1,822,781 | 143,785 | 1,523,607 | 87,682,021 | 299,174 | 299,174 |
| 87,637,563 | 3,855,836 | 91,493,399 | 1,936,461 | 145,804 | 1,612,594 | 86,024,969 | 323,867 | 323,867 |
| 85,982,004 | 3,531,969 | 89,513,973 | 2,049,081 | 147,563 | 1,700,949 | 84,281,055 | 348,132 | 348,132 |
| 84,239,705 | 3,183,837 | 87,423,542 | 2,160,547 | 149,057 | 1,788,615 | 82,451,090 | 371,932 | 371,932 |
| 82,411,472 | 2,811,906 | 85,223,378 | 2,270,769 | 150,284 | 1,875,536 | 80,535,936 | 395,232 | 395,232 |
| 80,498,167 | 2,416,673 | 82,914,840 | 2,379,656 | 151,239 | 1,961,658 | 78,536,509 | 417,999 | 417,999 |
| 78,500,701 | 1,998,675 | 80,499,375 | 2,487,122 | 151,921 | 2,046,925 | 76,453,775 | 440,197 | 440,197 |
| 76,420,039 | 1,558,478 | 77,978,518 | 2,593,078 | 152,325 | 2,131,285 | 74,288,755 | 461,793 | 461,793 |
| 74,257,198 | 1,096,685 | 75,353,883 | 2,697,439 | 152,451 | 2,214,683 | 72,042,515 | 482,756 | 482,756 |
| 72,013,242 | 613,929 | 72,627,171 | 2,800,121 | 152,297 | 2,297,067 | 69,716,174 | 503,054 | 503,054 |
| 69,689,285 | 110,875 | 69,800,161 | 2,901,042 | 151,861 | 2,378,386 | 67,310,900 | 522,656 | 110,875 |
| 66,872,653 | 0 | 66,872,653 | 2,998,062 | 153,202 | 2,044,748 | 64,827,905 | 953,315 | 0 |
| 63,847,992 | 0 | 63,847,992 | 3,092,514 | 154,909 | 1,579,541 | 62,268,451 | 1,512,973 | 0 |
| 60,728,746 | 0 | 60,728,746 | 954,604 | 156,425 | 0 | 60,728,746 | 954,604 | 0 |
| 59,747,276 | 0 | 59,747,276 | 980,178 | 157,745 | 0 | 59,747,276 | 980,178 | 0 |
| 58,740,099 | 0 | 58,740,099 | 1,005,853 | 158,868 | 0 | 58,740,099 | 1,005,853 | 0 |
| 57,707,111 | 0 | 57,707,111 | 1,030,281 | 159,790 | 0 | 57,707,111 | 1,030,281 | 0 |
| 56,649,560 | 0 | 56,649,560 | 1,048,915 | 173,346 | 0 | 56,649,560 | 1,048,915 | 0 |

FIG. 9-13A

| | | | | | | |
|---|---|---|---|---|---|---|
| 55,573,238 | 0 | 55,573,238 | 1,056,121 | | 55,573,238 | 0 |
| 54,489,574 | 0 | 54,489,574 | 1,042,020 | 101,713 | 54,489,574 | 0 |
| 53,419,873 | 0 | 53,419,873 | 1,024,768 | 90,277 | 53,419,873 | 0 |
| 52,367,285 | 0 | 52,367,285 | 1,007,697 | 88,226 | 52,367,285 | 0 |
| 51,331,630 | 0 | 51,331,630 | 990,806 | 86,203 | 51,331,630 | 0 |
| 50,312,725 | 0 | 50,312,725 | 974,093 | 84,208 | 50,312,725 | 0 |
| 49,310,393 | 0 | 49,310,393 | 957,557 | 82,240 | 49,310,393 | 0 |
| 48,324,455 | 0 | 48,324,455 | 941,195 | 80,299 | 48,324,455 | 0 |
| 47,354,738 | 0 | 47,354,738 | 925,007 | 78,385 | 47,354,738 | 0 |
| 46,401,066 | 0 | 46,401,066 | 908,990 | 76,497 | 46,401,066 | 0 |
| 45,463,267 | 0 | 45,463,267 | 893,144 | 74,636 | 45,463,267 | 0 |
| 44,541,171 | 0 | 44,541,171 | 877,466 | 72,800 | 44,541,171 | 0 |
| 43,634,608 | 0 | 43,634,608 | 861,954 | 70,989 | 43,634,608 | 0 |
| 42,743,411 | 0 | 42,743,411 | 846,608 | 69,204 | 47,743,411 | 0 |
| 41,867,414 | 0 | 41,867,414 | 831,426 | 67,443 | 41,867,414 | 0 |
| 41,006,453 | 0 | 41,006,453 | 816,406 | 65,707 | 41,006,453 | 0 |
| 40,160,363 | 0 | 40,160,363 | 801,547 | 63,996 | 40,160,363 | 0 |
| 39,326,985 | 0 | 39,328,985 | 786,847 | 62,308 | 39,328,985 | 0 |
| 38,512,157 | 0 | 38,512,157 | 772,304 | 60,644 | 38,512,157 | 0 |
| 37,709,722 | 0 | 37,709,722 | 757,918 | 59,004 | 37,709,722 | 0 |
| 36,921,522 | 0 | 36,921,522 | 743,687 | 57,387 | 36,921,522 | 0 |
| 36,147,402 | 0 | 36,147,402 | 729,609 | 55,793 | 36,147,402 | 0 |
| 35,387,208 | 0 | 35,387,208 | 715,683 | 54,221 | 35,387,208 | 0 |
| 34,640,787 | 0 | 34,640,787 | 701,907 | 52,672 | 34,640,787 | 0 |
| 33,907,988 | 0 | 33,907,988 | 688,281 | 51,145 | 33,907,988 | 0 |
| 33,188,661 | 0 | 33,188,661 | 674,802 | 49,639 | 33,188,661 | 0 |
| 32,482,657 | 0 | 32,482,657 | 661,470 | 48,156 | 32,482,657 | 0 |
| 31,789,830 | 0 | 31,789,830 | 648,282 | 46,694 | 31,789,830 | 0 |
| | | | | 45,252 | | |

FIG. 9-13B

EFC SERIES SYSTEM
RISK ANALYSIS AND PLANNING MODULE
REMIC POOL PLANNING AND STRESS PROCESS
APPLICATIONS PROGRAM OUTPUT

| zq opb after g2b-p6 zq-opb4 | g2b-p6 remaining g2b-p7 | g2b-p7 to q no tar g2b-p8 | q opb after g2b-p8 q-opb7 | g2b-p8 remaining (should be 0) | fe+se opb for step 2(b)(i) fese-opb2(c) | g2b-p3 to fe+se g2b-p9 | fe+se opb after g2b-p9 fese+opb3 | g2b-p9 remaining g2b-p10 |
|---|---|---|---|---|---|---|---|---|
| | | | | | | | group 1 step 2(b)(ii) to fe+se | |
| | | 58,497,157 | | | | 45,350,504 | | |
| 5,684,042 | 0 | 0 | 99,336,147 | 0 | 52,565,222 | 111,079 | 52,454,143 | 0 |
| 5,620,249 | 0 | 0 | 98,580,170 | 0 | 52,454,143 | 114,761 | 52,339,382 | 0 |
| 5,529,588 | 0 | 0 | 97,732,267 | 0 | 52,339,382 | 118,879 | 52,220,502 | 0 |
| 5,412,150 | 0 | 0 | 96,792,692 | 0 | 52,220,502 | 122,789 | 52,097,713 | 0 |
| 5,268,062 | 0 | 0 | 95,761,755 | 0 | 52,097,713 | 126,485 | 51,971,229 | 0 |
| 5,097,489 | 0 | 0 | 94,639,824 | 0 | 51,971,229 | 129,958 | 51,841,271 | 0 |
| 4,900,637 | 0 | 0 | 93,427,320 | 0 | 51,841,271 | 133,203 | 51,708,067 | 0 |
| 4,677,746 | 0 | 0 | 92,124,725 | 0 | 51,708,067 | 136,215 | 51,571,853 | 0 |
| 4,429,098 | 0 | 0 | 90,732,573 | 0 | 51,571,853 | 138,985 | 51,432,867 | 0 |
| 4,155,009 | 0 | 0 | 89,251,456 | 0 | 51,432,867 | 141,511 | 51,291,356 | 0 |
| 3,855,836 | 0 | 0 | 87,682,021 | 0 | 51,291,356 | 143,785 | 51,147,571 | 0 |
| 3,531,969 | 0 | 0 | 86,024,969 | 0 | 51,147,571 | 145,804 | 51,001,767 | 0 |
| 3,183,837 | 0 | 0 | 84,281,055 | 0 | 51,001,767 | 147,563 | 50,854,204 | 0 |
| 2,811,906 | 0 | 0 | 82,451,090 | 0 | 50,854,204 | 149,057 | 50,705,147 | 0 |
| 2,416,673 | 0 | 0 | 80,535,936 | 0 | 50,705,147 | 150,284 | 50,554,863 | 0 |
| 1,998,675 | 0 | 0 | 78,536,509 | 0 | 50,554,863 | 151,239 | 50,403,623 | 0 |
| 1,558,478 | 0 | 0 | 76,453,775 | 0 | 50,403,623 | 151,921 | 50,251,703 | 0 |
| 1,096,685 | 0 | 0 | 74,288,755 | 0 | 50,251,703 | 152,325 | 50,099,378 | 0 |
| 613,929 | 0 | 0 | 72,042,515 | 0 | 50,099,378 | 152,451 | 49,946,926 | 0 |
| 110,875 | 0 | 0 | 69,716,174 | 0 | 49,946,926 | 152,297 | 49,794,630 | 0 |
| 0 | 411,781 | 411,781 | 66,899,119 | 0 | 49,794,630 | 151,861 | 49,642,769 | 0 |
| 0 | 953,315 | 953,315 | 63,874,590 | 0 | 49,642,769 | 153,202 | 49,489,567 | 0 |
| 0 | 1,512,973 | 1,512,973 | 60,755,477 | 0 | 49,489,567 | 154,909 | 49,334,658 | 0 |
| 0 | 954,604 | 954,604 | 59,774,141 | 0 | 49,334,658 | 156,425 | 49,178,233 | 0 |
| 0 | 980,178 | 980,178 | 58,767,098 | 0 | 49,178,233 | 157,745 | 49,020,488 | 0 |

FIG. 9-14A

| | | | | | | |
|---|---|---|---|---|---|---|
| 0 | 1,005,853 | 1,005,853 | 57,734,246 | 0 | 49,020,488 | 158,868 | 48,861,620 | 0 |
| 0 | 1,030,281 | 1,030,281 | 56,676,830 | 0 | 48,861,620 | 159,790 | 48,701,831 | 0 |
| 0 | 1,048,915 | 1,048,915 | 55,600,645 | 0 | 48,701,831 | 173,346 | 48,528,484 | 0 |
| 0 | 1,056,121 | 1,056,121 | 54,517,118 | 0 | 48,528,484 | 101,713 | 48,426,772 | 0 |
| 0 | 1,042,020 | 1,042,020 | 53,447,554 | 0 | 48,426,772 | 90,277 | 48,336,495 | 0 |
| 0 | 1,024,768 | 1,024,768 | 53,395,105 | 0 | 48,336,495 | 88,226 | 48,248,269 | 0 |
| 0 | 1,007,697 | 1,007,697 | 51,359,589 | 0 | 48,248,269 | 86,203 | 48,162,066 | 0 |
| 0 | 990,806 | 990,806 | 50,340,824 | 0 | 48,162,066 | 84,208 | 48,077,857 | 0 |
| 0 | 974,093 | 974,093 | 49,338,632 | 0 | 48,077,857 | 82,240 | 47,995,617 | 0 |
| 0 | 957,557 | 957,557 | 48,352,836 | 0 | 47,995,617 | 80,299 | 47,915,318 | 0 |
| 0 | 941,195 | 941,195 | 47,383,260 | 0 | 47,915,318 | 78,385 | 47,836,932 | 0 |
| 0 | 925,007 | 925,007 | 46,429,731 | 0 | 47,836,932 | 76,497 | 47,760,435 | 0 |
| 0 | 908,990 | 908,990 | 45,492,075 | 0 | 47,760,435 | 74,636 | 47,685,799 | 0 |
| 0 | 893,144 | 893,144 | 44,570,123 | 0 | 47,685,799 | 72,800 | 47,613,000 | 0 |
| 0 | 877,466 | 877,466 | 43,663,705 | 0 | 47,613,000 | 70,989 | 47,542,010 | 0 |
| 0 | 861,954 | 861,954 | 42,772,654 | 0 | 47,542,010 | 69,204 | 47,472,807 | 0 |
| 0 | 846,608 | 846,608 | 41,896,803 | 0 | 47,472,807 | 67,443 | 47,405,363 | 0 |
| 0 | 831,426 | 831,426 | 41,035,988 | 0 | 47,405,363 | 65,707 | 47,339,656 | 0 |
| 0 | 816,406 | 816,406 | 40,190,047 | 0 | 47,339,656 | 63,996 | 47,275,660 | 0 |
| 0 | 801,547 | 801,547 | 39,358,816 | 0 | 47,275,660 | 62,308 | 47,213,352 | 0 |
| 0 | 786,847 | 786,847 | 38,542,138 | 0 | 47,213,352 | 60,644 | 47,152,707 | 0 |
| 0 | 772,304 | 772,304 | 37,739,853 | 0 | 47,152,707 | 59,004 | 47,093,703 | 0 |
| 0 | 757,918 | 757,918 | 36,951,804 | 0 | 47,093,703 | 57,387 | 47,036,316 | 0 |
| 0 | 743,687 | 743,687 | 36,177,835 | 0 | 47,036,316 | 55,793 | 46,980,524 | 0 |
| 0 | 729,609 | 729,609 | 35,417,793 | 0 | 46,980,524 | 54,221 | 46,926,303 | 0 |
| 0 | 715,683 | 715,683 | 34,671,525 | 0 | 46,926,303 | 52,672 | 46,873,631 | 0 |
| 0 | 701,907 | 701,907 | 33,938,880 | 0 | 46,873,631 | 51,145 | 46,822,486 | 0 |
| 0 | 688,281 | 688,281 | 33,219,707 | 0 | 46,822,486 | 49,639 | 46,772,847 | 0 |
| 0 | 674,802 | 674,802 | 32,513,859 | 0 | 46,772,847 | 48,156 | 46,724,691 | 0 |
| 0 | 661,470 | 661,470 | 31,821,188 | 0 | 46,724,691 | 46,694 | 46,677,997 | 0 |
| 0 | 648,282 | 648,282 | 31,141,548 | 0 | 46,677,997 | 45,252 | 46,632,745 | 0 |

FIG. 9-14B

EFC SERIES SYSTEM
RISK ANALYSIS AND PLANNING MODULE
REMIC POOL PLANNING AND STRESS PROCESS
APPLICATIONS PROGRAM OUTPUT

| group 1 step 2(b)(iii) to q, zq no aggregate target | | | | | | | | |
|---|---|---|---|---|---|---|---|---|
| g2b-p10 to q target g2b-p11 | q opb after g2b-p10 g2b-p11 q-opb8 | 2b-p10 remaining g2b-p11 | g2b-p11 to zq g2b-p12 | zq opb after g2b-p12 zq-opb5 | g2b-p12 remaining g2b-p13 | g2b-p13 to q no tar g2b-p14 | q opb after g2b-p14 q-opb9 | g2b-p14 remaining g2b-p15 | group 1 step zp opb for step 2(b)(iv) zp-opb8(c) |
| 0 | | | 0 | | | 0 | | | |
| 0 | 99,336,147 | 0 | 0 | 5,684,042 | 0 | 0 | 99,336,147 | 0 | 4,790,735 |
| 0 | 98,580,170 | 0 | 0 | 5,620,249 | 0 | 0 | 98,580,170 | 0 | 4,814,688 |
| 0 | 97,732,267 | 0 | 0 | 5,529,588 | 0 | 0 | 97,732,267 | 0 | 4,838,762 |
| 0 | 96,792,692 | 0 | 0 | 5,412,150 | 0 | 0 | 96,792,692 | 0 | 4,862,955 |
| 0 | 95,761,755 | 0 | 0 | 5,268,062 | 0 | 0 | 95,761,755 | 0 | 4,887,270 |
| 0 | 94,639,824 | 0 | 0 | 5,097,489 | 0 | 0 | 94,639,824 | 0 | 4,911,707 |
| 0 | 93,427,320 | 0 | 0 | 4,900,637 | 0 | 0 | 93,427,320 | 0 | 4,936,265 |
| 0 | 92,124,725 | 0 | 0 | 4,677,746 | 0 | 0 | 92,124,725 | 0 | 4,960,946 |
| 0 | 90,732,573 | 0 | 0 | 4,429,098 | 0 | 0 | 90,732,573 | 0 | 4,985,751 |
| 0 | 89,251,456 | 0 | 0 | 4,155,009 | 0 | 0 | 89,251,456 | 0 | 5,010,680 |
| 0 | 87,682,021 | 0 | 0 | 3,855,836 | 0 | 0 | 87,682,021 | 0 | 5,035,733 |
| 0 | 86,024,969 | 0 | 0 | 3,531,969 | 0 | 0 | 86,024,969 | 0 | 5,060,912 |
| 0 | 84,281,055 | 0 | 0 | 3,183,837 | 0 | 0 | 84,281,055 | 0 | 5,086,217 |
| 0 | 82,451,090 | 0 | 0 | 2,811,906 | 0 | 0 | 82,451,090 | 0 | 5,111,648 |
| 0 | 80,535,936 | 0 | 0 | 2,416,673 | 0 | 0 | 80,535,936 | 0 | 5,137,206 |
| 0 | 78,536,509 | 0 | 0 | 1,998,675 | 0 | 0 | 78,536,509 | 0 | 5,162,892 |
| 0 | 76,453,775 | 0 | 0 | 1,558,478 | 0 | 0 | 76,453,775 | 0 | 5,188,706 |
| 0 | 74,288,755 | 0 | 0 | 1,096,685 | 0 | 0 | 74,288,755 | 0 | 5,214,650 |
| 0 | 72,042,515 | 0 | 0 | 613,929 | 0 | 0 | 72,042,515 | 0 | 5,240,723 |
| 0 | 69,716,174 | 0 | 0 | 110,875 | 0 | 0 | 69,716,174 | 0 | 5,266,927 |
| 0 | 66,899,119 | 0 | 0 | 0 | 0 | 0 | 66,899,119 | 0 | 5,293,261 |
| 0 | 63,874,590 | 0 | 0 | 0 | 0 | 0 | 63,874,590 | 0 | 5,319,728 |
| 0 | 60,755,477 | 0 | 0 | 0 | 0 | 0 | 60,755,477 | 0 | 5,346,326 |
| 0 | 59,774,141 | 0 | 0 | 0 | 0 | 0 | 59,774,141 | 0 | 5,373,058 |
| 0 | 58,767,098 | 0 | 0 | 0 | 0 | 0 | 58,767,098 | 0 | 5,399,923 |
| 0 | 57,734,246 | 0 | 0 | 0 | 0 | 0 | 57,734,246 | 0 | 5,426,923 |
| 0 | 56,676,830 | 0 | 0 | 0 | 0 | 0 | 56,676,830 | 0 | 5,454,057 |

FIG. 9-15A

| | | | | | |
|---|---|---|---|---|---|
| 0 | 55,600,645 | 0 | 0 | 55,600,645 | 0 | 5,481,328 |
| 0 | 54,517,118 | 0 | 0 | 54,517,118 | 0 | 5,508,734 |
| 0 | 53,447,554 | 0 | 0 | 53,447,554 | 0 | 5,536,278 |
| 0 | 52,395,105 | 0 | 0 | 52,395,105 | 0 | 5,563,959 |
| 0 | 51,359,589 | 0 | 0 | 51,359,589 | 0 | 5,591,779 |
| 0 | 50,340,824 | 0 | 0 | 50,340,824 | 0 | 5,619,738 |
| 0 | 49,338,632 | 0 | 0 | 49,338,632 | 0 | 5,647,837 |
| 0 | 48,352,836 | 0 | 0 | 48,352,836 | 0 | 5,676,076 |
| 0 | 47,383,260 | 0 | 0 | 47,383,260 | 0 | 5,704,456 |
| 0 | 46,429,731 | 0 | 0 | 46,429,731 | 0 | 5,732,979 |
| 0 | 45,492,075 | 0 | 0 | 45,492,075 | 0 | 5,761,644 |
| 0 | 44,570,123 | 0 | 0 | 44,570,123 | 0 | 5,790,452 |
| 0 | 43,663,705 | 0 | 0 | 43,663,705 | 0 | 5,819,404 |
| 0 | 42,772,654 | 0 | 0 | 42,772,654 | 0 | 5,848,501 |
| 0 | 41,896,803 | 0 | 0 | 41,896,803 | 0 | 5,877,744 |
| 0 | 41,035,988 | 0 | 0 | 41,035,988 | 0 | 5,907,132 |
| 0 | 40,190,047 | 0 | 0 | 40,190,047 | 0 | 5,936,668 |
| 0 | 39,358,816 | 0 | 0 | 39,358,816 | 0 | 5,966,351 |
| 0 | 38,542,138 | 0 | 0 | 38,542,138 | 0 | 5,996,183 |
| 0 | 37,739,853 | 0 | 0 | 37,739,853 | 0 | 6,026,164 |
| 0 | 36,951,804 | 0 | 0 | 36,951,804 | 0 | 6,056,295 |
| 0 | 36,177,835 | 0 | 0 | 36,177,835 | 0 | 6,086,576 |
| 0 | 35,417,793 | 0 | 0 | 35,417,793 | 0 | 6,117,009 |
| 0 | 34,671,525 | 0 | 0 | 34,671,525 | 0 | 6,147,594 |
| 0 | 33,938,880 | 0 | 0 | 33,938,880 | 0 | 6,178,332 |
| 0 | 33,219,707 | 0 | 0 | 33,219,707 | 0 | 6,209,224 |
| 0 | 32,513,859 | 0 | 0 | 32,513,859 | 0 | 6,240,270 |
| 0 | 31,821,188 | 0 | 0 | 31,821,188 | 0 | 6,271,471 |
| 0 | 31,141,548 | 0 | 0 | 31,141,548 | 0 | 6,302,829 |

FIG. 9-15B

EFC SERIES SYSTEM
RISK ANALYSIS AND PLANNING MODULE
REMIC POOL PLANNING AND STRESS PROCESS
APPLICATIONS PROGRAM OUTPUT

| (b)(iv) to zp g2b-p15 to zp g2b-p16 | zp opb after g2b-p16 zp-opb9 | g2b-p16 remaining g2b-p17 | g1 principal remaining g1-p3 | pac opb for step 3 pac-opb2(c) | g1-p3 to pac-opb2 g1-p4 | pac-opb2 after g1-p4 pac-opb3 | g1-p4 remaining (should be 0) |
|---|---|---|---|---|---|---|---|
| 17,697,433 | | 444,449 | | | | | 388,366 |
| 0 | 4,790,735 | 0 | | 585,664,416 | 114,907 | 585,664,416 | 0 |
| 0 | 4,814,688 | 0 | 0 | 585,664,416 | 0 | 585,664,416 | 0 |
| 0 | 4,838,762 | 0 | 0 | 585,664,416 | 0 | 585,664,416 | 0 |
| 0 | 4,862,955 | 0 | 0 | 585,664,416 | 0 | 585,664,416 | 0 |
| 0 | 4,887,270 | 0 | 0 | 585,664,416 | 0 | 585,646,416 | 0 |
| 0 | 4,911,707 | 0 | 0 | 585,664,416 | 0 | 585,664,416 | 0 |
| 0 | 4,936,265 | 0 | 0 | 585,664,416 | 0 | 585,664,416 | 0 |
| 0 | 4,960,946 | 0 | 0 | 585,664,416 | 0 | 585,664,416 | 0 |
| 0 | 4,985,751 | 0 | 0 | 585,664,416 | 0 | 585,664,416 | 0 |
| 0 | 5,010,680 | 0 | 0 | 585,664,416 | 0 | 585,664,416 | 0 |
| 0 | 5,035,733 | 0 | 0 | 585,664,416 | 0 | 585,664,416 | 0 |
| 0 | 5,060,912 | 0 | 0 | 585,664,416 | 0 | 585,664,416 | 0 |
| 0 | 5,086,217 | 0 | 0 | 585,664,416 | 0 | 585,664,416 | 0 |
| 0 | 5,111,648 | 0 | 0 | 585,664,416 | 0 | 585,664,416 | 0 |
| 0 | 5,137,206 | 0 | 0 | 585,664,416 | 0 | 585,664,416 | 0 |
| 0 | 5,162,892 | 0 | 0 | 585,664,416 | 0 | 585,664,416 | 0 |
| 0 | 5,188,706 | 0 | 0 | 585,664,416 | 0 | 585,664,416 | 0 |
| 0 | 5,214,650 | 0 | 0 | 585,664,416 | 0 | 585,664,416 | 0 |
| 0 | 5,240,723 | 0 | 0 | 585,664,416 | 0 | 585,664,416 | 0 |
| 0 | 5,266,927 | 0 | 0 | 585,664,416 | 0 | 585,664,416 | 0 |
| 0 | 5,293,261 | 0 | 0 | 585,664,416 | 0 | 585,664,416 | 0 |
| 0 | 5,319,728 | 0 | 0 | 585,664,416 | 0 | 585,664,416 | 0 |
| 0 | 5,346,326 | 0 | 0 | 585,664,416 | 0 | 585,664,416 | 0 |
| 0 | 5,373,058 | 0 | 0 | 581,094,804 | 0 | 581,094,804 | 0 |
| 0 | 5,399,923 | 0 | 0 | 576,392,761 | 0 | 576,392,761 | 0 | group 1 step 3 to PACs, no aggregate target balance

FIG. 9-16A

| | | | | | |
|---|---|---|---|---|---|
| 0 | 5,426,923 | 0 | | 0 | 0 |
| 0 | 5,454,057 | 0 | | 0 | 0 |
| 0 | 5,481,328 | 0 | | 0 | 0 |
| 0 | 5,508,734 | 0 | | 0 | 0 |
| 0 | 5,536,278 | 0 | | 0 | 0 |
| 0 | 5,563,959 | 0 | 571,563,053 | 0 | 571,563,053 |
| 0 | 5,591,779 | 0 | 566,607,816 | 0 | 566,607,816 |
| 0 | 5,619,738 | 0 | 561,546,300 | 0 | 561,546,300 |
| 0 | 5,647,837 | 0 | 556,419,392 | 0 | 556,419,392 |
| 0 | 5,676,076 | 0 | 551,306,203 | 0 | 551,306,203 |
| 0 | 5,704,456 | 0 | 546,218,938 | 0 | 546,218,938 |
| 0 | 5,732,979 | 0 | 541,157,464 | 0 | 541,157,464 |
| 0 | 5,761,644 | 0 | 536,121,649 | 0 | 536,121,649 |
| 0 | 5,790,452 | 0 | 531,111,359 | 0 | 531,111,359 |
| 0 | 5,819,404 | 0 | 526,126,463 | 0 | 526,126,463 |
| 0 | 5,848,501 | 0 | 521,166,831 | 0 | 521,166,831 |
| 0 | 5,877,744 | 0 | 516,232,333 | 0 | 516,232,333 |
| 0 | 5,907,132 | 0 | 511,322,839 | 0 | 511,322,839 |
| 0 | 5,936,668 | 0 | 506,438,220 | 0 | 506,438,220 |
| 0 | 5,966,351 | 0 | 501,578,349 | 0 | 501,578,349 |
| 0 | 5,996,183 | 0 | 496,743,098 | 0 | 496,743,098 |
| 0 | 6,026,164 | 0 | 491,932,339 | 0 | 491,932,339 |
| 0 | 6,056,295 | 0 | 487,145,948 | 0 | 487,145,948 |
| 0 | 6,086,576 | 0 | 482,383,798 | 0 | 482,383,798 |
| 0 | 6,117,009 | 0 | 477,645,765 | 0 | 477,645,765 |
| 0 | 6,147,594 | 0 | 472,931,724 | 0 | 472,931,724 |
| 0 | 6,178,332 | 0 | 468,241,553 | 0 | 468,241,553 |
| 0 | 6,209,224 | 0 | 463,575,127 | 0 | 463,575,127 |
| 0 | 6,240,270 | 0 | 458,932,325 | 0 | 458,932,325 |
| 0 | 6,271,471 | 0 | 454,313,025 | 0 | 454,313,025 |
| 0 | 6,302,829 | 0 | 449,717,106 | 0 | 449,717,106 |
| | | 0 | 445,144,447 | 0 | 445,144,447 |
| | | 0 | 440,594,930 | 0 | 440,594,930 |
| | | 0 | 436,068,434 | 0 | 436,068,434 |
| | | 0 | 431,564,841 | 0 | 431,564,841 |
| | | 0 | 427,084,033 | 0 | 427,084,033 |

FIG. 9-16B

FIG. 9-17
NOTATION TABLE

EFC SERIES SYSTEM
RISK ANALYSIS AND PLANNING MODULE
REMIC POOL PLANNING AND STRESS PROCESS
APPLICATIONS PROGRAM OUTPUT

| | |
|---|---|
| Series mo | Series month; REMIC Series cash flow calculations are made monthly counting consecutively from REMIC origination. |
| date | date; payment date within month |
| group 1 mo prin pay g1mp-1 | group 1 mortgages principal payment g1mp-1; group 1 is one of the asset pools of the REMIC and g1mp-1 denotes the expected principal cash flow from these assets. |
| z accrual amount | REMIC Z Class accrued interest allocation calculations. |
| z bom opb z-opb1 | Z Class beginning of month outstanding principal balance, denoted by z-opb1. |
| z accrual payable z-ac1 | Z Class monthly accrued interest, denoted by z-ac1 |
| a opb for z accrual a-opb1 | REMIC A Class outstanding principal balance for the purpose of calculating Z Class accrued interest allocable to A Class, denoted by a-opb1. |
| z accrual paid to a z-ac2 | Z Class accrued interest allocated to A Class, denoted by z-ac2. |
| a opb after z-ac2 a-opb2 | A Class outstanding principal balance after accruing z-ac2 amount, denoted by a-opb2. |
| z opb after z-ac2 z-opb2 | A Class outstanding principal balance after accruing z-ac2 amount, denoted by z-opb2. |
| z accrual paid to z (no opb change) | Z Class accrued interest allocated to Z Class, (no change in Z Class outstanding principal balance). |
| zp accrual amount | REMIC ZP Class accrued interest allocation calculations. |
| zp bom opb zp-opb1 | ZP Class beginning of month outstanding principal balance, denoted by zp-opb1. |
| zp accrual payable zp-ac1 | ZP Class monthly accrued interest, denoted by zp-ac1 |
| q opb for zp accrual q-opb1 | REMIC Q Class outstanding principal balance for the purpose of calculating ZP Class accrued interest allocable to Q Class, denoted by q-opb1. |
| zq opb for zp accrual zq-opb1 | REMIC ZQ Class outstanding principal balance for the purpose of calculating ZP Class accrued interest allocable to ZQ Class, denoted by zq-opb1. |
| q+zq opb for zp accrual q+zq-opb1 | aggregate of Q Class and ZQ Class outstanding principal balances for the purpose of calculating ZP Class accrued interest allocations, denoted by q+zq-opb1. |
| q+zq target bal eom q+zq-target | aggregate of Q Class and ZQ Class principal balances target at end of month for the purpose of calculating ZP Class accrued interest allocations, denoted by q+zq-target. |
| zp accrual for q+zp tar zpac2-1 | ZP Class accrued interest allocated to Q Class and ZQ Class in the aggregate to achieve end of month targeted principal balances, denoted by zpac2-1. |

FIG. 9-18
NOTATION TABLE

EFC SERIES SYSTEM
RISK ANALYSIS AND PLANNING MODULE
REMIC POOL PLANNING AND STRESS PROCESS
APPLICATIONS PROGRAM OUTPUT

| | |
|---|---|
| zp-ac not to q+zp tar zpac3 | ZP Class accrued interest not allocated to Q Class and ZQ Class in the aggregate to achieve targeted principal balance, denoted by zpac2-1. |
| part of zp accrual to q+zq aggregate target | calculations related to the part of ZP Class accrued interest allocable to Q Class and ZQ Class in the aggregate to achieve the aggregate end of month targeted principal balance. |
| q target bal eom q-target | Q Class principal balance target end of month for the purpose of calculating ZP Class accrued interest allocations, denoted by q-target. |
| zpac2-1 to q tar zpac2-2 | part of zpac2-1 amount allocated to Q Class to achieve end of month targeted principal balance, denoted by zpac2-2. |
| q opb after zpac2-2 q-opb2 | Q Class outstanding principal balance after accruing zpac2-2 amount, denoted by q-opb2. |
| zp opb after zpac2-2 zp-opb2 | ZP Class outstanding principal balance after allocating zpac2-2 amount, denoted by zp-opb2. |
| zpac2-1 remaining zpac2-3 | part of zpac2-1 amount not allocated to Q Class to achieve end of month targeted principal balance, denoted by zpac2-3. |
| zpac2-3 to zq zpac2-4 | part of zpac2-3 amount allocated to ZQ Class to achieve end of month targeted principal balance, denoted by zpac2-4. |
| zq opb after zpac2-4 zq-opb2 | ZQ Class outstanding principal balance after accruing zpac2-4 amount, denoted by zq-opb2. |
| zp opb after zpac2-4 zp-opb3 | ZP Class outstanding principal balance after accruing zpac2-4 amount, denoted by zp-opb3. |
| zpac2-3 remaining zpac2-5 | part of zpac2-3 amount not allocated to Q Class or ZQ Class to achieve end of month targeted principal balances, denoted by zpac2-5. |
| zpac2-5 to q, no tar zpac2-6 | part of zpac2-5 amount allocated to Q Class without regard to its end of month targeted principal balances, denoted by zpac2-6. |
| q opb after zpac2-6 q-opb3 | Q Class outstanding principal balance after accruing zpac2-6 amount, denoted by q-opb3. |
| zp opb after zpac2-6 zp-opb4 | ZP Class outstanding principal balance after accruing zpac2-6 amount, denoted by zp-opb4. |
| zpac2-5 remaining (should be 0) | part of zpac2-5 amount not allocated to Q Class or ZQ Class (the amount should be 0 if the allocation formulas are correct). |
| zp accrual to fe+se | calculations related to the part of ZP Class accrued interest allocable to REMIC FE Class and REMIC SE Class. |
| fe+se opb for zp accrual fese-opb1 | FE Class and SE Class aggregate outstanding principal balance for the purpose of calculating ZP Class accrued interest allocable to FE Class and SE Class aggregate in the aggregate, denoted by fese-opb1. |

FIG. 9-19
NOTATION TABLE

EFC SERIES SYSTEM
RISK ANALYSIS AND PLANNING MODULE
REMIC POOL PLANNING AND STRESS PROCESS
APPLICATIONS PROGRAM OUTPUT

| | |
|---|---|
| zp accrual for fese zp-ac2 | ZP Class accrued interest available for allocation to FE Class and SE Class in the aggregate, denoted by zp-ac2. |
| zp-ac2 to fese zp-ac3 | part of ap-ac2 amount allocated to FE Class and SE Class in the aggregate, denoted by zp-ac3. |
| fese opb after zp-ac3 fese-opb2 | FE Class and SE Class aggregate outstanding principal balance after allocation of zp-ac3 amount, denoted by fese-opb2. |
| zp opb after zp-ac3 zp-opb5 | ZP Class outstanding principal balance after allocation of zp-ac3 amount, denoted by zp-opb5. |
| zp accrual remaining zp-ac4 | part of ZP Class accrued interest not previously allocated to Q Class, ZP Class, FE Class or SE Class in the aggregate, denoted by zp-ac4. |
| zp-ac4 to q tar zp-ac5 | part of zp-ac4 amount allocated to Q Class without regard to its end of month target principal balance, denoted by zp-ac5. |
| q opb after zp-ac5 q-opb4 | Q Class outstanding principal balance after allocation of zp-ac5 amount, denoted by q-opb4. |
| zp opb after zp-ac5 zp-opb6 | ZP Class outstanding principal balance after allocation of zp-ac5 amount, denoted by zp-opb6. |
| zp-ac4 remaining zp-ac6 | part of zp-ac4 amount not previously allocated to Q Class, ZQ Class, FE Class or SE Class in the aggregate, denoted by zp-ac6. |
| zp-ac6 to zq zp-ac7 | part of zp-ac6 amount allocated to ZQ Class without regard to end of month targeted principal balances, denoted by zp-ac7. |
| zq opb after zp-ac7 zq-opb3 | ZQ Class outstanding principal balance after allocation of zp-ac7 amount, denoted by zq-opb3. |
| zp opb after zp-ac7 zp-opb7 | ZP Class outstanding principal balance after allocation of zp-ac7 amount, denoted by zp-opb7. |
| zp-ac6 remaining zp-ac9 | part of zp-ac6 amount not previously allocated, denoted by zp-ac9. |
| zp-ac9 to q no tar zp-ac10 | part of zp-ac9 amount allocated to Q Class without regard to end of month targeted principal balances, denoted by zp-ac10. |
| q opb after zp-ac10 q-opb5 | Q Class outstanding principal balance after allocation of zp-ac10 amount, denoted by q-opb5. |
| zp opb after zp-ac9 zp-opb8 | ZP Class outstanding principal balance after allocation of zp-ac9 amount, denoted by zp-opb8. |
| zp accrual to zp (no opb change) | ZP Class accrued interest allocated to ZP Class, (no change in ZP Class outstanding principal balance). |
| zq accrual amount | REMIC ZQ Class accrued interest allocation calculations. |
| zq opb for zq ac amt zq-opb1(c) | ZQ Class outstanding principal balance for the purpose of calculating ZQ Class accrued interest amount, denoted by zq-opb1(c). |
| zq accrual payable zq-ac1 | ZQ Class accrued interest amount, denoted by zq-ac1. |

FIG. 9-20
NOTATION TABLE

EFC SERIES SYSTEM
RISK ANALYSIS AND PLANNING MODULE
REMIC POOL PLANNING AND STRESS PROCESS
APPLICATIONS PROGRAM OUTPUT

| | |
|---|---|
| q opb for zq accrual q-opb5(c) | Q Class outstanding principal balance for the purpose of calculating ZP Class accrued interest allocable to Q Class, denoted by q-opb5(c). |
| zq accrual to q tar zq-ac2 | ZQ Class accrued interest amount allocable to Q Class to achieve end of month targeted principal balance, denoted by zq-ac2. |
| q opb after zq-ac2 q-opb6 | Q Class outstanding principal balance after allocation of zp-ac2 amount, denoted by q-opb6. |
| zq opb after zp&zp ac zq-opb4 | ZQ Class outstanding principal balance after allocation of ZP Class accrued interest and ZP Class accrued interest, denoted by zq-opb4. |
| zq accrual to zq (no opb change) | ZQ Class accrued interest allocated to ZQ Class, (no change in ZQ Class outstanding principal balance). |
| group 1 step 1, PAC aggregate target | calculations related to the step 1 allocation, as described in the REMIC Offering Circular Supplement, of cash flow from the group 1 assets to Planned Amortization Classes ("PAC Classes") aggregate end of month targeted principal balance. |
| PAC opb for g1 prin pac-opb1 | PAC Classes aggregate outstanding principal balances funded from group 1 principal amounts, denoted by pac-opb1. |
| pac eom target pac-target | PAC Classes aggregate end of month targeted principal balance, denoted by pac-target. |
| g1 prin to pac tar g1-p1 | group 1 principal funds allocated to PAC Classes to achieve end of month targeted principal balance, denoted by g1-p1. |
| pac opb after g1-p1 pac-opb2 | PAC Classes aggregate outstanding principal balance after allocation of g1-p1 amount, denoted by pac-opb2. |
| g1 prin remaining g1-p2 | group 1 principal funds not allocated to PAC Classes to achieve end of month targeted principal balance, denoted by g1-p2. |
| group 1 step 2(a); a and z multiple targets | calculations related to the step 2(a) allocation, as described in the REMIC Offering Circular Supplement, of cash flow from the group 1 assets to A Class and Z Class to achieve end of month multiple targeted principal balances. |
| step2(a) g1 prin g2a-p1 | amount of the group 1 principal funds available for step2(a) allocations, denoted by g2a-p1. |
| a opb for g2a-p1 a-opb2(c) | A Class outstanding principal balance for the purpose of allocating g2a-p1 amount, denoted by a-opb2(c). |
| a high eom target a-hi-tar | A Class end of month high targeted principal balance, denoted by a-hi-tar. |
| g2a-p1 to a-hi-tar g2a-p2 | part of the g2a-p1 amount allocated to A Class to achieve its end of month high targeted principal balance, denoted by g2a-p2. |

FIG. 9-21
NOTATION TABLE

EFC SERIES SYSTEM
RISK ANALYSIS AND PLANNING MODULE
REMIC POOL PLANNING AND STRESS PROCESS
APPLICATIONS PROGRAM OUTPUT

| | |
|---|---|
| a opb after g2a-p2 a-opb3 | A Class outstanding principal balance after allocation of g2a-p2 amount, denoted by a-opb3. |
| g2a prin remaining g2a-p3 | part of the g2a-p1 amount not allocated to A Class to achieve its end of month high targeted principal balance, denoted by g2a-p3. |
| z opb for g2a-p3 z-opb2(c) | Z Class outstanding principal balance for the purpose of allocating g2a-p3 amount, denoted by z-opb2(c). |
| z high eom target z-hi-tar | Z Class end of month high targeted principal balance, denoted by z-hi-tar. |
| g2a-p3 to z-hi-tar g2a-p4 | part of the g2a-p3 amount allocated to Z Class to achieve its end of month high targeted principal balance, denoted by g2a-p4. |
| z opb after g2a-p4 z-opb3 | Z Class outstanding principal balance after allocation of g2a-p4 amount, denoted by z-opb3. |
| g2a prin remaining g2a-p5 | part of the g2a-p3 amount not allocated to Z Class to achieve its end of month high targeted principal balance, denoted by g2a-p5. |
| a int eom target a-int-tar | A Class end of month inermediate targeted principal balance, denoted by a-int-tar. |
| g2a-p5 to a-int-tar g2a-p6 | part of the g2a-p5 amount allocated to A Class to achieve its end of month intermediate targeted principal balance, denoted by g2a-p6. |
| a opb after g2a-p6 a-opb4 | A Class outstanding principal balance after allocation of g2a-p6 amount, denoted by a-opb4. |
| g2a prin remaining g2a-p7 | part of the g2a-p5 amount not allocated to A Class to achieve its end of month intermediate targeted principal balance, denoted by g2a-p7. |
| z low eom target z-low-tar | Z Class end of month low targeted principal balance, denoted by z-low-tar. |
| g2a-p7 to z-low-tar g2a-p8 | part of the g2a-p7 amount allocated to Z Class to achieve its end of month low targeted principal balance, denoted by g2a-p8. |
| z opb after g2a-p8 z-opb4 | Z Class outstanding principal balance after allocation of g2a-p8 amount, denoted by z-opb4. |
| g2a prin remaining g2a-p9 | part of the g2a-p7 amount not allocated to Z Class to achieve its end of month low targeted principal balance, denoted by g2a-p9. |
| a low eom target a-low-tar | A Class end of month low targeted principal balance, denoted by a-low-tar. |
| g2a-p9 to a-low-tar g2a-p10 | part of the g2a-p9 amount allocated to A Class to achieve its end of month low targeted principal balance, denoted by g2a-p10. |
| a opb after g2a-p10 a-opb5 | A Class outstanding principal balance after allocation of g2a-p10 amount, denoted by a-opb5. |
| g2a prin remaining g2a-p11 | part of the g2a-p9 amount not allocated to A Class to achieve its end of month low targeted principal balance, denoted by g2a-p11. |

FIG. 9-22
NOTATION TABLE

EFC SERIES SYSTEM
RISK ANALYSIS AND PLANNING MODULE
REMIC POOL PLANNING AND STRESS PROCESS
APPLICATIONS PROGRAM OUTPUT

| | |
|---|---|
| group 1 step 2(a)(vi) ca+cb+zc+f+s to aggregate targeted balance | calculations related to the step 2(a)(vi) allocation, as described in the REMIC Offering Circular Supplement, of cash flow from the group 1 assets to CA Class, CB Class, ZC Class, F Class and S Class to achieve end of month aggregate targeted principal balances. |
| ca+cb+zc+f+s opb for g1-p cabzfs-opb1 | CA Class, CB Class, ZC Class, F Class and S Class aggregate outstanding principal balance for the purpose of allocating group 1 principal funds, denoted by cabzfs-opb1. |
| ca+cb+zc+f+s eom target cabzfs-tar | CA Class, CB Class, ZC Class, F Class and S Class end of month aggregate targeted principal balance, denoted by cabzfs-tar. |
| g2a-p11 to cabzfs-tar g2a-p12 | part of g2a-p11 amount allocable to CA Class, CB Class, ZC Class, F Class and S Class to achieve their aggregate end of month targeted principal balance, denoted by g2a-p12. |
| g2a prin not to cabzfs-tar g2a-p13 | part of g2a-p11 amount not allocable to CA Class, CB Class, ZC Class, F Class and S Class to achieve their aggregate end of month targeted principal balance, denoted by g2a-p13. |
| ca+cb+zc opb for g2a-p cabz-opb1 | CA Class, CB Class and ZC Class aggregate outstanding principal balance after allocation of g2a-p12 amount, denoted by cabz-opb1. |
| ca+cb+zc eom target cabz-tar | CA Class, CB Class and ZC Class end of month aggregate targeted principal balance, denoted by cabz-tar. |
| g2a-p12 to cabz-tar g2a-p14 | part of g2a-p12 amount allocated to CA Class, CB Class and ZC Class to achieve their aggregate end of month targeted principal balance, denoted by g2a-p14. |
| cabz-opb after g2a-p14 cabz-opb2 | CA Class, CB Class and ZC Class aggregate outstanding principal balance after allocation of g2a-p14 amount, denoted by cabz-opb2. |
| g2a-p14 remaining g2a-p15 | part of g2a-p12 amount not allocated to CA Class, CB Class and ZC Class to achieve their aggregate end of month targeted principal balance, denoted by g2a-p15. |
| f+s opb for g2a-p15 fs-opb1 | F Class and S Class aggregate outstanding principal balance for the purpose of allocating g2a-p15 amount, denoted by fs-opb1. |
| g2a-p15 to fs-opb g2a-p16 | part of g2a-p15 amount allocated to F Class and S Class, denoted by g2a-p16. |
| fs-opb after g2a-p16 fs-opb2 | F Class and S Class aggregate outstanding principal balance after allocating g2a-p16 amount, denoted by fs-opb2. |
| g2a-p15 remaining g2a-p17 | part of g2a-p15 amount not allocated to F Class and S Class, denoted by g2a-p17. |
| g2a-p17 to cabz no tar g2a-p18 | part of g2a-p17 amount allocated to CA Class, CB Class and ZC Class without regard for their aggregate end of month targeted principal balance, denoted by g2a-p18. |

FIG. 9-23
NOTATION TABLE

EFC SERIES SYSTEM
RISK ANALYSIS AND PLANNING MODULE
REMIC POOL PLANNING AND STRESS PROCESS
APPLICATIONS PROGRAM OUTPUT

| | |
|---|---|
| cabz-opb after g2a-p18 cabz-opb3 | CA Class, CB Class and ZC Class aggregate outstanding principal balance after allocation of g2a-p18 amount, denoted by cabz-opb3. |
| g2a-p17 remaining g2a-p19 | part of g2a-p17 amount not allocated to CA Class, CB Class and ZC Class, denoted by g2a-p19. |
| all ga2 remaining p13+p19 | sum of g2a-p13 and g2a-p19 amounts. |
| group 1 step 2(a)(vii); z pay of | calculations related to the step 2(a)(vii) allocation, as described in the REMIC Offering Circular Supplement, of remaining cash flow from the group 1 assets to Z Class. |
| z-opb for p13+p19 z-opb4(c) | Z Class outstanding principal balance for the purpose of allocating sum of g2a-p13 and g2a-p19 amounts, denoted by z-opb4(c). |
| g2a p13+p19 to z-opb4 g2a-p20 | part of g2a-p13 and g2a-p19 amounts allocated to Z Class reducing z-opb4(c), denoted by g2a-p20. |
| z-opb4 after g2a-p20 z-opb5 | Z Class outstanding principal balance after allocating g2a-p20 amount, denoted by z-opb5. |
| g2a-p20 remaining g2a-p21 | part of g2a-p13 and g2a-p19 amounts not allocated to Z Class reducing z-opb4(c), denoted by g2a-p21. |
| group 1 step 2(a)(viii) | calculations related to the step 2(a)(viii) allocation, as described in the REMIC Offering Circular Supplement. |
| ca+cb+zc opb for g2a-p21 cabz-opb3(c) | CA Class, CB Class and ZC Class outstanding principal balance for the purpose of allocating the g2a-p21 amount, denoted by cxabz-opb3(c). |
| ca+cb+zc eom target cabz-tar(c) | CA Class, CB Class and ZC Class end of month aggregate targeted principal balance for the purpose of allocating the g2a-p21 amount, denoted by cabz-tar(c). |
| g2a-p21 to cabz-tar g2a-p22 | part of g2a-p12 amount allocated to CA Class, CB Class and ZC Class to achieve their aggregate end of month targeted principal balance, denoted by g2a-p22. |
| cabz-opb after g2a-p22 cabz-opb4 | CA Class, CB Class and ZC Class aggregate outstanding principal balance after allocation of g2a-p22 amount, denoted by cabz-opb4. |
| g2a-p22 remaining g2a-p23 | part of g2a-p12 amount not allocated to CA Class, CB Class and ZC Class to achieve their aggregate end of month targeted principal balance, denoted by g2a-p23. |
| f+s opb for g2a-p23 fs-opb2(c) | F Class and S Class aggregate outstanding principal balance for the purpose of allocating g2a-p23 amount, denoted by fs-opb2(c). |
| g2a-p23 to fs-opb g2a-p24 | part of g2a-p23 amount allocated to F Class and S Class, denoted by g2a-p24. |

FIG. 9-24
NOTATION TABLE

EFC SERIES SYSTEM
RISK ANALYSIS AND PLANNING MODULE
REMIC POOL PLANNING AND STRESS PROCESS
APPLICATIONS PROGRAM OUTPUT

| | |
|---|---|
| fs-opb after g2a-p24 fs-opb3 | F Class and S Class aggregate outstanding principal balance after allocating g2a-p24 amount, denoted by fs-opb3. |
| g2a-p24 remaining g2a-p25 | part of g2a-p23 amount not allocated to F Class and S Class, denoted by g2a-p24. |
| g2a-p25 to cabz-opb g2a-p26 | part of g2a-p25 amount allocated to CA Class, CB Class and ZC Class without regard to their aggregate end of month targeted principal balance, denoted by g2a-p26. |
| cabz-opb after g2a-p26 cabz-opb5 | CA Class, CB Class and ZC Class aggregate outstanding principal balance after allocation of g2a-p26 amount, denoted by cabz-opb5. |
| g2a-p26 remaining g2a-p27 | part of g2a-p25 amount not allocated to CA Class, CB Class and ZC Class, denoted by g2a-p27. |
| group 1 step 2(a)(ix) | calculations related to the step 2(a)(ix) allocation, as described in the REMIC Offering Circular Supplement. |
| a opb for g2a-p27 a-opb5(c) | A Class outstanding principal balance for the purpose of allocating the g2a-p27 amount, denoted by a-opb5(c). |
| g2a-p27 to a-opb g2a-p28 | part of the g2a-p27 amount allocated to A Class to reduce its outstanding principal balance to 0, denoted by g2a-p28. |
| a-opb after g2a-p28 a-opb6 | A Class outstanding principal balance after allocation of g2a-p28 amount, denoted by a-opb6. |
| g2a-p28 remaining g2a-p29 | part of the g2a-p27 amount not allocated to A Class to reduce its outstanding principal balance to 0, denoted by g2a-p29. |
| group 1 step 2(b)(i) q+qz aggregate target | calculations related to the step 2(b)(i) calculations, as described in the REMIC Offering Circular Supplement, allocating group 1 principal funds to Q Class and QZ Class to achieve their aggregate end of month targeted principal balance. |
| step2(b) g1 prin g2b-p1 | amount of group 1 principal funds available for step2(b) allocation, denoted by g2b-p1. |
| q opb for g2b-p1 q-opb6(c) | Q Class outstanding principal balance for the purpose of allocating the g2b-p1 amount, denoted by q-opb6(c). |
| zq opb for zp accrual zq-opb3(c) | ZQ Class outstanding principal balance for the purpose of allocating ZP Class accrued interest, denoted by zq-opb3(c). |
| q+zq opb for zp accrual q+zq-opb2 | aggregate Q Class and ZQ Class outstanding principal balance for the purpose of allocating ZP Class accrued interest, denoted by q+zq-opb2. |
| g2b-p1 to q+zq-target g2b-p2 | part of the g2b-p1 amount allocated to Q Class and ZQ Class to achieve their aggregate end of month targeted principal balance, denoted by g2b-p2. |
| g2b-p1 not to q+zq-target g2b-p3 | part of the g2b-p1 amount not allocated to Q Class and ZQ Class to achieve their aggregate end of month targeted principal balance, denoted by g2b-p3. |

FIG. 9-25
NOTATION TABLE

EFC SERIES SYSTEM
RISK ANALYSIS AND PLANNING MODULE
REMIC POOL PLANNING AND STRESS PROCESS
APPLICATIONS PROGRAM OUTPUT

| | |
|---|---|
| g2b-p2 to q target g2b-p4 | part of the g2b-p2 amount allocated to Q Class to achieve its end of month targeted principal balance, denoted by g2b-p4. |
| q opb after g2b-p4 q-opb6 | Q Class outstanding principal balance after allocation of g2b-p4 amount, denoted by q-opb6. |
| g2b-p4 remaining g2b-p5 | part of the g2b-p4 amount not allocated to Q Class to achieve its end of month targeted principal balance, denoted by g2b-p5. |
| g2b-p5 to zq g2b-p6 | part of the g2b-p5 amount allocated to ZQ Class to reduce its outstanding principal balance to 0, denoted by g2b-p6. |
| zq opb after g2b-p6 zq-opb4 | ZQ Class outstanding principal balance after allocation of g2b-p6 amount, denoted by zq-opb4. |
| g2b-p6 remaining g2b-p7 | part of the g2b-p5 amount not allocated to ZQ Class to reduce its outstanding principal balance to 0, denoted by g2b-p7. |
| g2b-p7 to q no tar g2b-p8 | part of the g2b-p7 amount allocated to Q Class without regard to its end of month targeted principal balance, denoted by g2b-p8. |
| q opb after g2b-p8 q-opb7 | Q Class outstanding principal balance after allocation of g2b-p8 amount, denoted by q-opb7. |
| g2b-p8 remaining (should be 0) | part of g2b-p8 amount not allocated to Q Class or ZQ Class (the amount should be 0 if the allocation formulas are correct). |
| group 1 step 2(b)(ii) to fe+se | calculations related to the step 2(b)(ii) calculations, as described in the REMIC Offering Circular Supplement, allocating group 1 principal funds to FE Class and SE Class. |
| fe+se opb for step 2(b)(i) fese-opb2(c) | aggregate FE Class and SE Class outstanding principal balance for the purpose of the step 2(b)(i) allocations, denoted by fese-opb2(c). |
| g2b-p3 to fe+se g2b-p9 | part of the g2b-p3 amount allocated to FE Class and SE Class pro rata to reduce their outstanding principal balances to 0, denoted by g2b-p9. |
| fe+se opb after g2b-p9 fese-opb3 | aggregate FE Class and SE Class outstanding principal balance after allocation of the g2b-p9 amount, denoted by fese-opb3. |
| g2b-p9 remaining g2b-p10 | part of the g2b-p3 amount not allocated to FE Class and SE Class, denoted by g2b-p10. |
| g2b-p10 to q target g2b-p11 | part of the g2b-p10 amount allocated to Q Class to achieve its end of month targeted principal balance, denoted by g2b-p11. |
| q opb after g2b-p10 q-opb8 | Q Class outstanding principal balance after allocation of the g2b-p10 amount, denoted by q-opb8. |
| g2b-p10 remaining g2b-p11 | part of the g2b-p10 amount allocated to Q Class to achieve its end of month targeted principal balance, denoted by g2b-p11. |
| g2b-p11 to zq g2b-p12 | part of the g2b-p11 amount allocated to ZQ Class to reduce its outstanding principal balance to 0, denoted by g2b-p12. |
| zq opb after g2b-p12 zq-opb5 | ZQ Class outstanding principal balance after allocation of the g2b-p12 amount, denoted by zq-opb5. |

FIG. 9-26
NOTATION TABLE

EFC SERIES SYSTEM
RISK ANALYSIS AND PLANNING MODULE
REMIC POOL PLANNING AND STRESS PROCESS
APPLICATIONS PROGRAM OUTPUT

| | |
|---|---|
| g2b-p12 remaining g2b-p13 | part of the g2b-p11 amount not allocated to ZQ Class to reduce its outstanding principal balance to 0, denoted by g2b-p13. |
| g2b-p13 to q no tar g2b-p14 | part of the g2b-p13 amount allocated to Q Class without regard to its end of month targeted principal balance, denoted by g2b-p14. |
| q opb after g2b-p14 q-opb9 | Q Class outstanding principal balance after allocation of the g2b-p14 amount, denoted by q-opb9. |
| g2b-p14 remaining g2b-p15 | part of the g2b-p13 amount not allocated to Q Class without regard to its end of month targeted principal balance, denoted by g2b-p15. |
| group 1 step 2(b)(iv) to zp | calculations related to the step 2(b)(iv) calculations, as described in the REMIC Offering Circular Supplement, allocating group 1 principal funds to ZP Class. |
| zp opb for step 2(b)(iv) zp-opb8(c) | ZP Class outstanding principal balance for the purpose of the step 2(b)(iv) allocations, denoted by zp-opb8(c). |
| g2b-p15 to zp g2b-p16 | part of the g2b-p15 amount allocated to ZP Class to reduce its outstanding principal balances to 0, denoted by g2b-p16. |
| zp opb after g2b-p16 zp-opb9 | ZP Class outstanding principal balance after allocation of the g2b-p16 amount, denoted by zp-opb9. |
| g2b-p16 remaining g2b-p17 | part of the g2b-p15 amount not allocated to ZP Class to reduce its outstanding principal balances to 0, denoted by g2b-p17. |
| group 1 step 3 to PACs, no aggregate target balance | calculations related to the step 3 calculations, as described in the REMIC Offering Circular Supplement, allocating group 1 principal funds to the PAC Classes without regard to end of month aggregate targeted principal balances. |
| g1 principal remaining g1-p3 | group 1 principal funds available for step 3 allocations, denoted by g1-p3. |
| pac opb for step 3 pac-opb2(c) | aggregate of the outstanding principal balances of the PAC Classes for the purpose of the step 3 allocations, denoted by pac-opb2(c). |
| g1-p3 to pac-opb2 g1-p4 | part of the g1-p3 amount allocated to the PAC Classes to reduce their outstanding principal balances to 0, denoted by g1-p4. |
| pac-opb2 after g1-p4 pac-opb3 | PAC Classes outstanding principal balance after allocation of the g1-p4 amount, denoted by pac-opb3. |
| g1-p4 remaining (should be 0) | part of g1-p4 amount not allocated to the PAC Classes (the amount should be 0 if the allocation formulas are correct). |

EFC SERIES SYSTEM
RISK ANALYSIS AND PLANNING MODULE
FLT/INV CLASS STRUCTURING PROCESS
APPLICATIONS PROGRAM OUTPUT

| EF Class and ES Class:<br>wal=<br>PSA=<br>initial balance= | | 29.4<br>0%<br>36,360,355 | 29.3<br>10%<br>36,360,355 | 29.2<br>20%<br>36,360,355 | 29.0<br>30%<br>36,360,355 | 28.9<br>40%<br>36,360,355 | 28.7<br>50%<br>36,360,355 | 28.4<br>60%<br>36,360,355 |
|---|---|---|---|---|---|---|---|---|
| mo | | | | | | | | |
| | 1 | 36,360,355 | 36,360,355 | 36,360,355 | 36,360,355 | 36,360,355 | 36,360,355 | 36,360,355 |
| | 2 | 36,360,355 | 36,360,355 | 36,360,355 | 36,360,355 | 36,360,355 | 36,360,355 | 36,360,355 |
| | 3 | 36,360,355 | 36,360,355 | 36,360,355 | 36,360,355 | 36,360,355 | 36,360,355 | 36,360,355 |
| | 4 | 36,360,355 | 36,360,355 | 36,360,355 | 36,360,355 | 36,360,355 | 36,360,355 | 36,360,355 |
| | 5 | 36,360,355 | 36,360,355 | 36,360,355 | 36,360,355 | 36,360,355 | 36,360,355 | 36,360,355 |
| | 6 | 36,360,355 | 36,360,355 | 36,360,355 | 36,360,355 | 36,360,355 | 36,360,355 | 36,360,355 |
| | 7 | 36,360,355 | 36,360,355 | 36,360,355 | 36,360,355 | 36,360,355 | 36,360,355 | 36,360,355 |
| | 8 | 36,360,355 | 36,360,355 | 36,360,355 | 36,360,355 | 36,360,355 | 36,360,355 | 36,360,355 |
| | 9 | 36,360,355 | 36,360,355 | 36,360,355 | 36,360,355 | 36,360,355 | 36,360,355 | 36,360,355 |
| | 10 | 36,360,355 | 36,360,355 | 36,360,355 | 36,360,355 | 36,360,355 | 36,360,355 | 36,360,355 |
| | 11 | 36,360,355 | 36,360,355 | 36,360,355 | 36,360,355 | 36,360,355 | 36,360,355 | 36,360,355 |
| | 12 | 36,360,355 | 36,360,355 | 36,360,355 | 36,360,355 | 36,360,355 | 36,360,355 | 36,360,355 |
| | 13 | 36,360,355 | 36,360,355 | 36,360,355 | 36,360,355 | 36,360,355 | 36,360,355 | 36,360,355 |
| | 14 | 36,360,355 | 36,360,355 | 36,360,355 | 36,360,355 | 36,360,355 | 36,360,355 | 36,360,355 |
| | 15 | 36,360,355 | 36,360,355 | 36,360,355 | 36,360,355 | 36,360,355 | 36,360,355 | 36,360,355 |
| | 16 | 36,360,355 | 36,360,355 | 36,360,355 | 36,360,355 | 36,360,355 | 36,360,355 | 36,360,355 |
| | 17 | 36,360,355 | 36,360,355 | 36,360,355 | 36,360,355 | 36,360,355 | 36,360,355 | 36,360,355 |
| | 18 | 36,360,355 | 36,360,355 | 36,360,355 | 36,360,355 | 36,360,355 | 36,360,355 | 36,360,355 |
| | 19 | 36,360,355 | 36,360,355 | 36,360,355 | 36,360,355 | 36,360,355 | 36,360,355 | 36,360,355 |
| | 20 | 36,360,355 | 36,360,355 | 36,360,355 | 36,360,355 | 36,360,355 | 36,360,355 | 36,360,355 |
| | 21 | 36,360,355 | 36,360,355 | 36,360,355 | 36,360,355 | 36,360,355 | 36,360,355 | 36,360,355 |
| | 22 | 36,360,355 | 36,360,355 | 36,360,355 | 36,360,355 | 36,360,355 | 36,360,355 | 36,360,355 |
| | 23 | 36,360,355 | 36,360,355 | 36,360,355 | 36,360,355 | 36,360,355 | 36,360,355 | 36,360,355 |
| | 24 | 36,360,355 | 36,360,355 | 36,360,355 | 36,360,355 | 36,360,355 | 36,360,355 | 36,360,355 |
| | 25 | 36,360,355 | 36,360,355 | 36,360,355 | 36,360,355 | 36,360,355 | 36,360,355 | 36,360,355 |
| | 26 | 36,360,355 | 36,360,355 | 36,360,355 | 36,360,355 | 36,360,355 | 36,360,355 | 36,360,355 |
| | 27 | 36,360,355 | 36,360,355 | 36,360,355 | 36,360,355 | 36,360,355 | 36,360,355 | 36,360,355 |

FIG. 10-1A

| | | | | | | |
|---|---|---|---|---|---|---|
| 28 | 36,360,355 | 36,360,355 | 36,360,355 | 36,360,355 | 36,360,355 | 36,360,355 |
| 29 | 36,360,355 | 36,360,355 | 36,360,355 | 36,360,355 | 36,360,355 | 36,360,355 |
| 30 | 36,360,355 | 36,360,355 | 36,360,355 | 36,360,355 | 36,360,355 | 36,360,355 |
| 31 | 36,360,355 | 36,360,355 | 36,360,355 | 36,360,355 | 36,360,355 | 36,360,355 |
| 32 | 36,360,355 | 36,360,355 | 36,360,355 | 36,360,355 | 36,360,355 | 36,360,355 |
| 33 | 36,360,355 | 36,360,355 | 36,360,355 | 36,360,355 | 36,360,355 | 36,360,355 |
| 34 | 36,360,355 | 36,360,355 | 36,360,355 | 36,360,355 | 36,360,355 | 36,360,355 |
| 35 | 36,360,355 | 36,360,355 | 36,360,355 | 36,360,355 | 36,360,355 | 36,360,355 |
| 36 | 36,360,355 | 36,360,355 | 36,360,355 | 36,360,355 | 36,360,355 | 36,360,355 |
| 37 | 36,360,355 | 36,360,355 | 36,360,355 | 36,360,355 | 36,360,355 | 36,360,355 |
| 38 | 36,360,355 | 36,360,355 | 36,360,355 | 36,360,355 | 36,360,355 | 36,360,355 |
| 39 | 36,360,355 | 36,360,355 | 36,360,355 | 36,360,355 | 36,360,355 | 36,360,355 |
| 40 | 36,360,355 | 36,360,355 | 36,360,355 | 36,360,355 | 36,360,355 | 36,360,355 |
| 41 | 36,360,355 | 36,360,355 | 36,360,355 | 36,360,355 | 36,360,355 | 36,360,355 |
| 42 | 36,360,355 | 36,360,355 | 36,360,355 | 36,360,355 | 36,360,355 | 36,360,355 |
| 43 | 36,360,355 | 36,360,355 | 36,360,355 | 36,360,355 | 36,360,355 | 36,360,355 |
| 44 | 36,360,355 | 36,360,355 | 36,360,355 | 36,360,355 | 36,360,355 | 36,360,355 |
| 45 | 36,360,355 | 36,360,355 | 36,360,355 | 36,360,355 | 36,360,355 | 36,360,355 |
| 46 | 36,360,355 | 36,360,355 | 36,360,355 | 36,360,355 | 36,360,355 | 36,360,355 |
| 47 | 36,360,355 | 36,360,355 | 36,360,355 | 36,360,355 | 36,360,355 | 36,360,355 |
| 48 | 36,360,355 | 36,360,355 | 36,360,355 | 36,360,355 | 36,360,355 | 36,360,355 |

FIG. 10-1B

EFC SERIES SYSTEM
RISK ANALYSIS AND PLANNING MODULE
FLT/INV CLASS STRUCTURING PROCESS
APPLICATIONS PROGRAM OUTPUT

| 28.2<br>70%<br>36,360,355 | 27.8<br>80%<br>36,360,355 | 27.5<br>90%<br>36,360,355 | 27.1<br>100%<br>36,360,355 | 26.6<br>110%<br>36,360,355 | 26.0<br>120%<br>36,360,355 | 25.4<br>130%<br>36,360,355 | 24.7<br>140%<br>36,360,355 |
|---|---|---|---|---|---|---|---|
| 36,360,355 | 36,360,355 | 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,360,355 | 36,360,355 | 36,352,716 |
| 36,360,355 | 36,360,355 | 36,360,355 | 36,360,355 | | | | |
| 36,360,355 | 36,360,355 | 36,360,355 | | | | | |
| 36,360,355 | 36,360,355 | | | | | | |
| 36,360,355 | | | | | | | |

FIG. 10-2A

| 36,360,355 | 36,360,355 | 36,360,355 | 36,360,355 | 36,360,355 | 36,352,716 |
|---|---|---|---|---|---|
| 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,352,716 |
| 36,360,355 | 36,360,355 | 36,360,355 | 36,360,355 | 36,360,355 | 36,352,716 |

FIG. 10-2B

EFC SERIES SYSTEM
RISK ANALYSIS AND PLANNING MODULE
FLT/INV CLASS STRUCTURING PROCESS
APPLICATIONS PROGRAM OUTPUT

| 23.8<br>150% | 22.0<br>160% | 21.1<br>162% | 17.4<br>170% | 12.7<br>180% | 7.9<br>190% | 3.1<br>200% | 2.5<br>210% |
|---|---|---|---|---|---|---|---|
| 36,360,355 | 36,360,355 | 36,360,355 | 36,360,355 | 36,360,355 | 36,360,355 | 36,360,355 | 36,360,355 |
| 36,352,716 | 36,352,716 | 36,352,716 | 36,352,716 | 36,352,716 | 36,352,716 | 36,352,716 | 36,352,716 |
| 36,341,917 | 36,341,917 | 36,341,917 | 36,341,917 | 36,341,917 | 36,341,917 | 36,341,917 | 36,341,917 |
| 36,327,965 | 36,327,965 | 36,327,965 | 36,327,965 | 36,327,965 | 36,327,965 | 36,327,965 | 36,327,965 |
| 36,310,869 | 36,310,869 | 36,310,869 | 36,310,869 | 36,310,869 | 36,310,869 | 36,310,869 | 36,310,869 |
| 36,290,646 | 36,290,646 | 36,290,646 | 36,290,646 | 36,290,646 | 36,290,646 | 36,290,646 | 36,290,646 |
| 36,267,316 | 36,267,316 | 36,267,316 | 36,267,316 | 36,267,316 | 36,267,316 | 36,267,316 | 36,267,316 |
| 36,267,158 | 36,240,905 | 36,240,905 | 36,240,905 | 36,240,905 | 36,240,905 | 36,240,905 | 36,240,905 |
| 36,267,158 | 36,211,446 | 36,211,446 | 36,211,446 | 36,211,446 | 36,211,446 | 36,211,446 | 36,211,446 |
| 36,267,158 | 36,178,973 | 36,178,973 | 36,178,973 | 36,178,973 | 36,178,973 | 36,178,973 | 36,178,973 |
| 36,267,158 | 36,143,529 | 36,143,529 | 36,143,529 | 36,143,529 | 36,143,529 | 36,143,529 | 36,143,529 |
| 36,267,158 | 36,105,160 | 36,105,160 | 36,105,160 | 36,105,160 | 36,105,160 | 36,105,160 | 36,105,160 |
| 36,267,158 | 36,063,917 | 36,063,917 | 36,063,917 | 36,063,917 | 36,063,917 | 36,063,917 | 36,063,917 |
| 36,267,158 | 36,019,857 | 36,019,857 | 36,019,857 | 36,019,857 | 36,019,857 | 36,019,857 | 36,019,857 |
| 36,267,158 | 35,973,041 | 35,973,041 | 35,973,041 | 35,973,041 | 35,973,041 | 35,973,041 | 35,604,348 |
| 36,267,158 | 35,923,535 | 35,923,535 | 35,923,535 | 35,923,535 | 35,923,535 | 35,614,115 | 34,455,078 |
| 36,267,158 | 35,871,409 | 35,871,409 | 35,871,409 | 35,871,409 | 35,832,827 | 34,540,088 | 33,247,711 |
| 36,267,158 | 35,816,739 | 35,816,739 | 35,816,739 | 35,816,739 | 34,848,053 | 33,415,722 | 31,984,067 |
| 36,267,158 | 35,759,604 | 35,759,604 | 35,759,604 | 35,399,149 | 33,820,378 | 32,242,684 | 30,666,069 |
| 36,267,158 | 35,700,088 | 35,700,088 | 35,700,088 | 34,481,441 | 32,751,295 | 31,022,727 | 29,295,734 |
| 36,267,158 | 35,638,279 | 35,638,279 | 35,418,308 | 33,529,247 | 31,642,371 | 29,757,682 | 27,875,177 |
| 36,267,158 | 35,574,269 | 35,574,269 | 34,595,543 | 32,543,931 | 30,495,238 | 28,449,461 | 26,406,602 |
| 36,267,158 | 35,508,154 | 35,508,154 | 33,746,024 | 31,526,915 | 29,311,591 | 27,100,051 | 24,892,297 |
| 36,267,158 | 35,267,029 | 34,787,429 | 32,870,948 | 30,479,667 | 28,093,189 | 25,711,511 | 23,334,635 |
| 36,267,158 | 34,695,344 | 34,180,101 | 32,121,521 | 29,553,678 | 26,991,816 | 24,435,935 | 21,886,034 |
| 36,267,158 | 34,618,485 | 34,066,729 | 31,862,642 | 29,114,137 | 26,372,969 | 23,639,138 | 20,912,641 |
| 36,267,158 | 34,541,716 | 33,952,633 | 31,599,860 | 28,666,892 | 25,742,809 | 22,827,607 | 19,921,284 |
| 36,267,158 | 34,465,121 | 33,837,956 | 31,333,554 | 28,212,628 | 25,102,340 | 22,002,682 | 18,913,652 |

FIG. 10-3A

| | | | | |
|---|---|---|---|---|
| 36,267,158 | 34,375,157 | 33,709,211 | 31,050,475 | 27,738,411 | 24,438,954 | 21,152,097 | 17,877,832 |
| 36,267,158 | 34,359,409 | 33,655,473 | 30,845,652 | 27,346,691 | 23,862,515 | 20,393,110 | 16,938,463 |
| 36,267,158 | 35,353,959 | 33,612,814 | 30,655,108 | 26,973,433 | 23,308,916 | 19,661,537 | 16,031,278 |
| 36,267,158 | 34,348,861 | 33,571,276 | 30,468,843 | 26,608,574 | 22,768,026 | 18,947,172 | 15,145,987 |
| 36,267,158 | 34,344,109 | 33,530,844 | 30,286,798 | 26,251,993 | 22,239,657 | 18,249,753 | 14,282,244 |
| 36,267,158 | 34,339,696 | 33,491,501 | 30,108,912 | 25,903,571 | 21,723,622 | 17,569,018 | 13,439,709 |
| 36,267,158 | 34,335,617 | 33,453,232 | 29,935,127 | 25,563,189 | 21,219,739 | 16,904,713 | 12,618,045 |
| 36,267,158 | 34,331,867 | 33,416,020 | 29,765,385 | 25,230,732 | 20,727,826 | 16,256,583 | 11,816,921 |
| 36,267,158 | 34,328,439 | 33,379,850 | 29,599,627 | 24,906,084 | 20,247,703 | 15,624,381 | 11,036,011 |
| 36,267,158 | 34,325,327 | 33,344,706 | 29,437,799 | 24,589,132 | 19,779,195 | 15,007,858 | 10,274,990 |
| 36,267,158 | 34,322,526 | 33,310,574 | 29,279,843 | 24,279,763 | 19,322,126 | 14,406,773 | 9,533,543 |
| 36,267,158 | 34,320,031 | 33,277,437 | 29,125,704 | 23,977,866 | 18,876,324 | 13,820,884 | 8,811,353 |
| 36,267,158 | 34,317,836 | 33,245,282 | 28,975,328 | 23,683,333 | 18,441,620 | 13,249,957 | 8,108,113 |
| 36,267,158 | 34,315,936 | 33,214,094 | 28,828,660 | 23,396,054 | 18,017,845 | 12,693,756 | 7,423,516 |
| 36,267,158 | 34,314,325 | 33,183,857 | 28,685,647 | 23,115,924 | 17,604,833 | 12,152,052 | 6,757,262 |
| 36,267,158 | 34,312,998 | 33,154,559 | 28,546,237 | 22,842,836 | 17,202,421 | 11,624,618 | 6,109,053 |
| 36,267,158 | 34,311,950 | 33,126,184 | 28,410,376 | 22,576,686 | 16,810,447 | 11,111,228 | 5,478,597 |
| 36,267,158 | 34,311,175 | 33,098,718 | 28,278,015 | 22,317,372 | 16,428,752 | 10,611,661 | 4,865,605 |
| 36,267,158 | 34,310,670 | 33,072,148 | 28,149,101 | 22,064,792 | 16,057,179 | 10,125,699 | 4,269,792 |
| 36,267,158 | 34,310,428 | 33,046,460 | 28,023,585 | 21,818,845 | 15,695,571 | 9,653,126 | 3,690,876 |
| 36,267,158 | 34,310,428 | 33,021,641 | 27,901,417 | 21,579,433 | 15,343,776 | 9,193,730 | 3,128,581 |

FIG. 10-3B

EFC SERIES SYSTEM
RISK ANALYSIS AND PLANNING MODULE
FLT/INV CLASS STRUCTURING PROCESS
APPLICATIONS PROGRAM OUTPUT

| 2.2<br>220% | 2.0<br>230% | 1.9<br>240% | 1.8<br>250% | 1.7<br>260% | 1.6<br>270% | 1.6<br>280% | 1.5<br>290% |
|---|---|---|---|---|---|---|---|
| 36,360,355 | 36,360,355 | 36,360,355 | 36,360,355 | 36,360,355 | 36,360,355 | 36,360,355 | 36,360,355 |
| 36,352,716 | 36,352,716 | 36,352,716 | 36,352,716 | 36,352,716 | 36,352,716 | 36,352,716 | 36,352,716 |
| 36,341,917 | 36,341,917 | 36,341,917 | 36,341,917 | 36,341,917 | 36,341,917 | 36,341,917 | 36,341,917 |
| 36,327,965 | 36,327,965 | 36,327,965 | 36,327,965 | 36,327,965 | 36,327,965 | 36,327,965 | 36,327,965 |
| 36,310,869 | 36,310,869 | 36,310,869 | 36,310,869 | 36,310,869 | 36,310,869 | 36,310,869 | 36,310,869 |
| 36,290,646 | 36,290,646 | 36,290,646 | 36,290,646 | 36,290,646 | 36,290,646 | 36,290,646 | 36,290,646 |
| 36,267,316 | 36,267,316 | 36,267,316 | 36,267,316 | 36,267,316 | 36,267,316 | 36,267,316 | 36,267,316 |
| 36,240,905 | 36,240,905 | 36,240,905 | 36,240,905 | 36,240,905 | 36,240,905 | 36,240,905 | 36,240,905 |
| 36,211,446 | 36,211,446 | 36,211,446 | 36,211,446 | 36,211,446 | 36,211,446 | 36,211,446 | 36,211,446 |
| 36,178,973 | 36,178,973 | 36,178,973 | 36,178,973 | 36,178,973 | 36,178,973 | 36,178,973 | 36,178,973 |
| 36,143,529 | 36,143,529 | 36,143,529 | 36,143,529 | 36,143,529 | 36,045,360 | 35,453,916 | 34,862,170 |
| 36,105,160 | 36,105,160 | 36,105,160 | 35,925,379 | 35,234,266 | 34,542,860 | 33,851,161 | 33,159,168 |
| 36,063,917 | 36,063,917 | 35,329,374 | 34,531,386 | 33,733,144 | 32,934,648 | 32,135,895 | 31,336,885 |
| 35,782,507 | 34,871,036 | 33,959,389 | 33,047,564 | 32,135,561 | 31,223,376 | 30,311,010 | 29,398,461 |
| 34,572,418 | 33,540,433 | 32,508,392 | 31,476,294 | 30,444,136 | 29,411,917 | 28,379,637 | 27,347,292 |
| 33,296,162 | 32,137,367 | 30,978,690 | 29,820,129 | 28,661,685 | 27,503,355 | 26,345,137 | 25,187,030 |
| 31,955,695 | 30,664,038 | 29,372,740 | 28,081,798 | 26,791,211 | 25,500,979 | 24,211,100 | 22,921,571 |
| 30,553,088 | 29,122,783 | 27,693,151 | 26,264,191 | 24,835,902 | 23,408,282 | 21,981,331 | 20,555,047 |
| 29,090,529 | 27,516,066 | 25,942,677 | 24,370,361 | 22,799,119 | 21,228,949 | 19,659,849 | 18,091,819 |
| 27,570,318 | 25,846,476 | 24,124,209 | 22,403,516 | 20,684,396 | 18,966,848 | 17,250,872 | 15,536,467 |
| 25,994,858 | 24,116,724 | 22,240,774 | 20,367,009 | 18,495,427 | 16,626,028 | 14,758,812 | 12,893,778 |
| 24,366,660 | 22,329,635 | 20,295,527 | 18,264,336 | 16,236,062 | 14,210,704 | 12,188,263 | 10,168,738 |
| 22,688,327 | 20,488,143 | 18,291,743 | 16,099,129 | 13,910,299 | 11,725,254 | 9,543,993 | 7,366,517 |
| 20,962,560 | 18,595,286 | 16,232,814 | 13,875,142 | 11,522,271 | 9,174,201 | 6,830,932 | 4,492,462 |
| 19,342,112 | 16,804,170 | 14,272,206 | 11,746,221 | 9,226,212 | 6,712,181 | 4,204,126 | 1,702,047 |
| 18,193,477 | 15,481,646 | 12,777,145 | 10,079,974 | 7,390,130 | 4,707,613 | 2,032,420 | 0 |
| 17,023,838 | 14,135,265 | 11,255,562 | 8,384,727 | 5,522,756 | 2,669,647 | 0 | 0 |
| 15,835,243 | 12,767,450 | 9,710,268 | 6,663,692 | 3,627,716 | 602,335 | 0 | 0 |

FIG. 10-4A

| | | | | | |
|---|---|---|---|---|---|
| 14,616,148 | 11,367,039 | 8,130,496 | 4,906,509 | 0 | 0 |
| 13,498,561 | 10,073,392 | 6,662,941 | 3,267,196 | 0 | 0 |
| 12,418,120 | 8,822,043 | 5,243,028 | 1,681,057 | 0 | 0 |
| 11,364,442 | 7,602,512 | 3,860,169 | 137,386 | 0 | 0 |
| 10,337,094 | 6,414,265 | 2,513,721 | 0 | 0 | 0 |
| 9,335,644 | 5,256,776 | 1,203,054 | 0 | 0 | 0 |
| 8,359,671 | 4,129,527 | 0 | 0 | 0 | 0 |
| 7,408,756 | 3,032,005 | 0 | 0 | 0 | 0 |
| 6,482,488 | 1,963,709 | 0 | 0 | 0 | 0 |
| 5,580,462 | 924,142 | 0 | 0 | 0 | 0 |
| 4,702,276 | 0 | 0 | 0 | 0 | 0 |
| 3,847,538 | 0 | 0 | 0 | 0 | 0 |
| 3,015,857 | 0 | 0 | 0 | 0 | 0 |
| 2,206,851 | 0 | 0 | 0 | 0 | 0 |
| 1,420,141 | 0 | 0 | 0 | 0 | 0 |
| 655,356 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |

FIG. 10-4B

FIG. 10-5
NOTATION TABLE

EFC SERIES SYSTEM
RISK ANALYSIS AND PLANNING MODULE
FLT/INV CLASS STRUCTURING PROCESS
APPLICATIONS PROGRAM OUTPUT

| | |
|---|---|
| FLT/INV CLASS | REMIC floating rate Class, FLT Class, and its related inverse rate Class, INV Class. |
| EF Class and ES Class | REMIC floating rate EF Class and its related inverse rate ES Class. |
| wal | weighted average life of mortgage pool funding EF Class and ES Class, expressed in years. |
| PSA | Public Securities Association prepayment benchmark expressed as a monthly series of annual prepayment rates times the percentage given at the top of each cloumn. |
| initial balance | initial principal balance of the mortgage pool funding EF Class and ES Class. |

EFC SERIES SYSTEM
RISK ANALYSIS AND PLANNING MODULE
FLT/INV CLASS STRUCTURING PROCESS
APPLICATIONS PROGRAM OUTPUT

| | | | | Test Class ES interest rate over historical values of input interest rate formula | | |
|---|---|---|---|---|---|---|
| | | | | Class S    leverage x (max/leverage) - LIBOR | | |
| | | | | Class ES  leverage x (max/leverage) - LIBOR | | |
| | | | | corridor boundaries | | |
| | | | ind | date | 1 month LIBOR | LIBOR corridor 7.05% 6.20% | S rate |
| coupon | | 6.00% | 1 | 03/12/99 | 4.93750% | 0.000% | 6.338% |
| F max | | 8.00% | 2 | 03/05/99 | 4.96484% | 0.000% | 6.255% |
| F margin | | 0.95% | 3 | 02/26/99 | 4.96250% | 0.000% | 6.263% |
| S max/leverage | | 7.05% | 4 | 02/19/99 | 4.93688% | 0.000% | 6.339% |
| S leverage | | 3.0000 | 5 | 02/12/99 | 4.93563% | 0.000% | 6.343% |
| S max | | 21.15% | 6 | 02/05/99 | 4.93656% | 0.000% | 6.340% |
| ef max | | 8.00% | 7 | 01/29/99 | 4.93906% | 0.000% | 6.333% |
| ef mar | | 0.95% | 8 | 01/22/99 | 4.93969% | 0.000% | 6.331% |
| select lower range max, mm, (p) | | 7.50% | 9 | 01/15/99 | 4.95750% | 0.000% | 6.278% |
| corridor cost, from cc estimator, (p) | | 0.35% | 10 | 01/08/99 | 5.00000% | 0.000% | 6.150% |
| ES max/leverage | | 6.2000% | 11 | 01/01/99 | 5.06406% | 0.000% | 5.958% |
| ES leverage | | 4.000 | 12 | 12/25/98 | 5.62875% | 0.000% | 4.264% |
| ES max | | 24.8000% | 13 | 12/18/98 | 5.56906% | 0.000% | 4.443% |
| corridor width | | 0.8500% | 14 | 12/11/98 | 5.53547% | 0.000% | 4.544% |
| | | | 15 | 12/04/98 | 5.56031% | 0.000% | 4.469% |
| | | | 16 | 11/27/98 | 5.54656% | 0.000% | 4.510% |
| | #wk | diff | 17 | 11/20/98 | 5.04891% | 0.000% | 6.003% |
| average difference for most recent: | 52 | -1.79% | 18 | 11/13/98 | 5.27391% | 0.000% | 5.328% |
| | 104 | -1.91% | 19 | 11/06/98 | 5.28406% | 0.000% | 5.298% |
| | 156 | -1.88% | 20 | 10/30/98 | 5.23875% | 0.000% | 5.434% |
| | 208 | -1.96% | 21 | 10/23/98 | 5.21969% | 0.000% | 5.491% |
| | 260 | -1.84% | 22 | 10/16/98 | 5.22688% | 0.000% | 5.469% |

FIG. 11-1A

| | | | | | | |
|---|---|---|---|---|---|---|
| 312 | -1.46% | | 23 | 10/09/98 | 5.40625% | 0.000% | 4.931% |
| 364 | -1.24% | | 24 | 10/02/98 | 5.37500% | 0.000% | 5.025% |
| 416 | -1.29% | | 25 | 09/25/98 | 5.38672% | 0.000% | 4.990% |
| 468 | -1.17% | | 26 | 09/18/98 | 5.58594% | 0.000% | 4.392% |
| 520 | -1.05% | | 27 | 09/11/98 | 5.89840% | 0.000% | 3.455% |
| 572 | -0.96% | | 28 | 09/04/98 | 5.62500% | 0.000% | 4.275% |
| 624 | -0.91% | | 29 | 08/28/98 | 5.64453% | 0.000% | 4.216% |
| 676 | -0.95% | | 30 | 08/21/98 | 5.64844% | 0.000% | 4.205% |
| 728 | -0.89% | | 31 | 08/14/98 | 5.64453% | 0.000% | 4.216% |
| | | | 32 | 08/07/98 | 5.65234% | 0.000% | 4.193% |
| | | | 33 | 07/31/98 | 5.65234% | 0.000% | 4.181% |
| | | | 34 | 07/24/98 | 5.65625% | 0.000% | 4.181% |
| | | | 35 | 07/17/98 | 5.65625% | 0.000% | 4.181% |
| | | | 36 | 07/10/98 | 5.65625% | 0.000% | 4.181% |
| | | | 37 | 07/03/98 | 5.65625% | 0.000% | 4.181% |
| | | | 38 | 06/26/98 | 5.68750% | 0.000% | 4.088% |
| | | | 39 | 06/19/98 | 5.65625% | 0.000% | 4.181% |
| | | | 40 | 06/12/98 | 5.65625% | 0.000% | 4.181% |
| | | | 41 | 06/05/98 | 5.65625% | 0.000% | 4.181% |
| | | | 42 | 05/29/98 | 5.65625% | 0.000% | 4.181% |
| | | | 43 | 05/22/98 | 5.64844% | 0.000% | 4.205% |

FIG. 11-1B

EFC SERIES SYSTEM
RISK ANALYSIS AND PLANNING MODULE
FLT/INV CLASS STRUCTURING PROCESS
APPLICATIONS PROGRAM OUTPUT

| ind | date | 1 month LIBOR | LIBOR corridor 7.05% 6.20% | S rate |
|---|---|---|---|---|
| 44 | 05/15/98 | 5.65625% | 0.000% | 4.181% |
| 45 | 05/08/98 | 5.65234% | 0.000% | 4.193% |
| 46 | 05/01/98 | 5.65625% | 0.000% | 4.181% |
| 47 | 04/24/98 | 5.65625% | 0.000% | 4.181% |
| 48 | 04/17/98 | 5.65625% | 0.000% | 4.181% |
| 49 | 04/10/98 | 5.65625% | 0.000% | 4.181% |
| 50 | 04/03/98 | 5.65625% | 0.000% | 4.181% |
| 51 | 03/27/98 | 5.68750% | 0.000% | 4.088% |
| 52 | 03/20/98 | 5.68750% | 0.000% | 4.088% |
| 53 | 03/13/98 | 5.68750% | 0.000% | 4.088% |
| 54 | 03/06/98 | 5.68750% | 0.000% | 4.088% |
| 55 | 02/27/98 | 5.62500% | 0.000% | 4.275% |
| 56 | 02/20/98 | 5.62500% | 0.000% | 4.275% |
| 57 | 02/13/98 | 5.62500% | 0.000% | 4.275% |
| 58 | 02/06/98 | 5.59766% | 0.000% | 4.357% |
| 59 | 01/30/98 | 5.60547% | 0.000% | 4.334% |
| 60 | 01/23/98 | 5.61719% | 0.000% | 4.298% |
| 61 | 01/16/98 | 5.59766% | 0.000% | 4.357% |
| 62 | 01/09/98 | 5.71875% | 0.000% | 3.994% |
| 63 | 01/02/98 | 6.00000% | 0.000% | 3.150% |
| 64 | 12/26/97 | 5.96875% | 0.000% | 3.244% |
| 65 | 12/19/97 | 5.96484% | 0.000% | 3.255% |
| 66 | 12/12/97 | 5.96875% | 0.000% | 3.244% |
| 67 | 12/05/97 | 5.96875% | 0.000% | 3.244% |
| 68 | 11/28/97 | 5.68750% | 0.000% | 4.088% |
| 69 | 11/21/97 | 5.68750% | 0.000% | 4.088% |
| 70 | 11/14/97 | 5.65625% | 0.000% | 4.181% |
| 71 | 11/07/97 | 5.65625% | 0.000% | 4.181% |
| 72 | 10/31/97 | 5.64844% | 0.000% | 4.205% |

FIG. 11-2A

| | | | | | |
|---|---|---|---|---|---|
| | | | 73 | 10/24/97 | 5.65625% | 0.000% | 4.181% |
| | | | 74 | 10/17/97 | 5.62500% | 0.000% | 4.275% |
| | | | 75 | 10/10/97 | 5.62500% | 0.000% | 4.275% |
| | | | 76 | 10/03/97 | 5.64844% | 0.000% | 4.205% |
| | | | 77 | 09/26/97 | 5.65625% | 0.000% | 4.181% |
| | | | 78 | 09/19/97 | 5.65625% | 0.000% | 4.181% |
| | | | 79 | 09/12/97 | 5.65625% | 0.000% | 4.181% |
| | | | 80 | 09/05/97 | 5.65625% | 0.000% | 4.181% |
| | | | 81 | 08/29/97 | 5.65625% | 0.000% | 4.181% |
| | | | 82 | 08/22/97 | 5.64453% | 0.000% | 4.216% |
| | | | 83 | 08/15/97 | 5.63281% | 0.000% | 4.252% |
| | | | 84 | 08/08/97 | 5.62500% | 0.000% | 4.275% |
| | | | 85 | 08/01/97 | 5.64844% | 0.000% | 4.205% |
| | | | 86 | 07/25/97 | | | |
| | | | 87 | 07/18/97 | 5.67188% | 0.000% | 4.134% |

FIG. 11-2B

EFC SERIES SYSTEM
RISK ANALYSIS AND PLANNING MODULE
FLT/INV CLASS STRUCTURING PROCESS
APPLICATIONS PROGRAM OUTPUT

| LIBOR | | | | | |
|---|---|---|---|---|---|
| | leverage | | | max/leverage | max |
| | 3.000 | | | 7.05% | 21.15000% |
| | 4.000 | | | 6.20% | 24.80000% |
| | | | | 6.20% | 7.05% |
| ES rate | difference ES rate less S rate | average difference rate from 3/12/99 to: | | average S rate from 3/12/99 to: | average ES rate from 3/12/99 to: |
| 5.050% | -1.288% | -1.288% | | 6.338% | 5.050% |
| 4.941% | -1.315% | -1.301% | | 6.296% | 4.995% |
| 4.950% | -1.313% | -1.305% | | 6.285% | 4.980% |
| 5.052% | -1.287% | -1.300% | | 6.299% | 4.998% |
| 5.057% | -1.286% | -1.297% | | 6.308% | 5.010% |
| 5.054% | -1.287% | -1.296% | | 6.313% | 5.017% |
| 5.044% | -1.289% | -1.295% | | 6.316% | 5.021% |
| 5.041% | -1.290% | -1.294% | | 6.318% | 5.024% |
| 4.970% | -1.308% | -1.296% | | 6.313% | 5.018% |
| 4.800% | -1.350% | -1.301% | | 6.297% | 4.996% |
| 4.544% | -1.414% | -1.311% | | 6.266% | 4.955% |
| 2.285% | -1.976% | -1.367% | | 6.099% | 4.732% |
| 2.524% | -1.919% | -1.409% | | 5.972% | 4.562% |
| 2.658% | -1.885% | -1.443% | | 5.870% | 4.426% |
| 2.559% | -1.910% | -1.475% | | 5.776% | 4.302% |
| 2.614% | -1.897% | -1.501% | | 5.697% | 4.196% |
| 4.604% | -1.399% | -1.495% | | 5.715% | 4.220% |
| 3.704% | -1.624% | -1.502% | | 5.694% | 4.192% |
| 3.664% | -1.634% | -1.509% | | 5.673% | 4.164% |
| 3.845% | -1.589% | -1.513% | | 5.661% | 4.148% |
| 3.921% | -1.570% | -1.516% | | 5.653% | 4.137% |
| 3.892% | -1.577% | -1.518% | | 5.645% | 4.126% |
| 3.175% | -1.756% | -1.529% | | 5.614% | 4.085% |
| 3.300% | -1.725% | -1.537% | | 5.589% | 4.052% |
| 3.253% | -1.737% | -1.545% | | 5.565% | 4.020% |

FIG. 11-3A

| | | | |
|---|---|---|---|
| 2.456% | -1.936% | -1.560% | 3.960% |
| 1.206% | -2.248% | -1.586% | 3.858% |
| 2.300% | -1.975% | -1.599% | 3.802% |
| 2.222% | -1.995% | -1.613% | 3.748% |
| 2.206% | -1.998% | -1.626% | 3.696% |
| 2.222% | -1.995% | -1.638% | 3.649% |
| 2.191% | -2.002% | -1.649% | 3.603% |
| 2.175% | -2.006% | -1.660% | 3.560% |
| 2.175% | -2.006% | -1.670% | 3.519% |
| 2.175% | -2.006% | -1.680% | 3.481% |
| 2.175% | -2.006% | -1.689% | 3.445% |
| 2.175% | -2.006% | -1.697% | 3.410% |
| 2.050% | -2.038% | -1.706% | 3.374% |
| 2.175% | -2.006% | -1.714% | 3.344% |
| 2.175% | -2.006% | -1.721% | 3.315% |
| 2.175% | -2.006% | -1.728% | 3.287% |
| 2.175% | -2.006% | -1.735% | 3.260% |
| 2.206% | -1.998% | -1.741% | 3.236% |

FIG. 11-3B

EFC SERIES SYSTEM
RISK ANALYSIS AND PLANNING MODULE
FLT/INV CLASS STRUCTURING PROCESS
APPLICATIONS PROGRAM OUTPUT

| ES rate | difference ES rate less S rate | average difference rate from 3/12/99 to: | average S rate from 3/12/99 to: | average ES rate from 3/12/99 to: |
|---|---|---|---|---|
| 2.175% | -2.006% | -1.747% | 4.959% | 3.212% |
| 2.191% | -2.002% | -1.753% | 4.942% | 3.189% |
| 2.175% | -2.006% | -1.758% | 4.925% | 3.167% |
| 2.175% | -2.006% | -1.764% | 4.909% | 3.146% |
| 2.175% | -2.006% | -1.769% | 4.894% | 3.126% |
| 2.175% | -2.006% | -1.773% | 4.880% | 3.106% |
| 2.175% | -2.006% | -1.778% | 4.866% | 3.088% |
| 2.050% | -2.038% | -1.783% | 4.850% | 3.067% |
| 2.050% | -2.038% | -1.788% | 4.836% | 3.048% |
| 2.050% | -2.038% | -1.793% | 4.822% | 3.029% |
| 2.050% | -2.038% | -1.797% | 4.808% | 3.011% |
| 2.050% | -2.038% | -1.802% | 4.795% | 2.993% |
| 2.300% | -1.975% | -1.805% | 4.786% | 2.981% |
| 2.300% | -1.975% | -1.808% | 4.777% | 2.969% |
| 2.300% | -1.975% | -1.811% | 4.768% | 2.957% |
| 2.409% | -1.948% | -1.813% | 4.761% | 2.948% |
| 2.378% | -1.955% | -1.815% | 4.754% | 2.939% |
| 2.331% | -1.967% | -1.818% | 4.746% | 2.929% |
| 2.409% | -1.948% | -1.820% | 4.740% | 2.920% |
| 1.925% | -2.069% | -1.824% | 4.728% | 2.904% |
| 0.800% | -2.350% | -1.832% | 4.704% | 2.872% |
| 0.925% | -2.319% | -1.840% | 4.681% | 2.842% |
| 0.941% | -2.315% | -1.847% | 4.660% | 2.813% |
| 0.925% | -2.319% | -1.854% | 4.638% | 2.785% |
| 0.925% | -2.319% | -1.861% | 4.618% | 2.757% |
| 2.050% | -2.038% | -1.863% | 4.610% | 2.747% |
| 2.050% | -2.038% | -1.866% | 4.603% | 2.737% |
| 2.175% | -2.006% | -1.868% | 4.597% | 2.729% |
| 2.206% | -1.998% | -1.870% | 4.591% | 2.722% |
| 2.175% | -2.006% | -1.871% | 4.586% | 2.714% |
| 2.300% | -1.975% | -1.873% | 4.582% | 2.709% |

FIG. 11-4A

| | | | | |
|---|---|---|---|---|
| 2.300% | -1.975% | -1.874% | 4.578% | 2.703% |
| 2.206% | -1.998% | -1.876% | 4.573% | 2.697% |
| 2.175% | -2.006% | -1.877% | 4.568% | 2.690% |
| 2.175% | -2.006% | -1.879% | 4.563% | 2.683% |
| 2.175% | -2.006% | -1.881% | 4.558% | 2.677% |
| 2.175% | -2.006% | -1.882% | 4.553% | 2.671% |
| 2.175% | -2.006% | -1.884% | 4.548% | 2.665% |
| 2.175% | -2.006% | -1.885% | 4.544% | 2.659% |
| 2.222% | -1.995% | -1.887% | 4.540% | 2.653% |
| 2.269% | -1.983% | -1.888% | 4.537% | 2.649% |
| 2.300% | -1.975% | -1.889% | 4.534% | 2.645% |
| 2.206% | -1.998% | -1.890% | 4.530% | 2.640% |
| 2.112% | -2.022% | -1.892% | 4.525% | 2.634% |

FIG. 11-4B

FIG. 11-5
NOTATION TABLE

EFC SERIES SYSTEM
RISK ANALYSIS AND PLANNING MODULE
FLT/INV CLASS STRUCTURING PROCESS
APPLICATIONS PROGRAM OUTPUT

| | |
|---|---|
| leverage | the quotient of the principal balance of a FLT Class divided by the principal balance of the related INV Class. |
| max | the maximum interest rate payable on a FLT Class. |
| ind | index counting available 1-month LIBOR data. |
| date | determination date for value of 1-month LIBOR. |
| 1 month LIBOR | historical values of 1-month LIBOR. |
| LIBOR corridor 7.05% 6.20% | historical values of LIBOR corridor between 7.05% and 6.20%. |
| S rate | S Class interest rate based on historical values of LIBOR. |
| ES rate | ES Class interest rate based on historical values of LIBOR. |
| difference ES rate less S rate | difference between ES Class interest rate and S Class interest rate, based on historical values of LIBOR. |
| average difference from 3/12/99 to: | average difference between ES Class interest rate and S Class interest rate, from 3/12/99 to the determination date for the applicable row. |
| average S rate from 3/12/99 to: | average S Class interest rate, from 3/12/99 to the determination date for the applicable row. |
| average ES rate from 3/12/99 to: | average ES Class interest rate, from 3/12/99 to the determination date for the applicable row. |
| coupon | interest rate on the cash flow funding REMIC FLT F Class and its related INV S Class. |
| F max | the maximum interest rate payable on F Class. |
| F margin | the margin interest rate payable on F Class. |
| S max/leverage | the quotient of the maximum interest rate payable on S Class divided by the S Class leverage. |
| S leverage | S Class leverage; the quotient of the principal balance of F Class divided by the principal balance of S Class. |
| S max | the maximum interest rate payable on S Class. |
| ef max | the maximum interest rate payable on EF Class. |
| ef mar | the margin interest rate payable on EF Class. |
| select lower range max, mm, [p] | the part of EF Class interest to be funded directly from the mortgage pool, denoted by mm and manually input as a parameter. |
| corridor cost, from cc estimator, [p] | the cost in basis points of a corridor funding the remaining part of EF Class interest, denoted by cc, calculated by corridor estimator module and manually input as a parameter. |
| ES max/leverage | the quotient of the maximum interest rate payable on ES Class divided by the ES Class leverage. |
| ES leverage | ES Class leverage; the quotient of the principal balance of EF Class divided by the principal balance of ES Class. |
| ES max | the maximum interest rate payable on ES Class. |
| corridor width | the maximum interest rate payable on the corridor. |

DATA PROCESSING SYSTEMS AND METHOD FOR CREATING EFFICIENT FLOATER CLASSES

This is a divisional of application Ser. No. 09/664,403, filed Sep. 18, 2000, which, pursuant 35 U.S.C. § 119(e)(1), claims priority based on provisional patent application Ser. No. 60/154,040 filed Sep. 16, 1999, the contents of both of which are relied on and fully incorporated herein by reference.

BACKGROUND OF THE INVENTION

A. Field of the Invention

The present invention relates to a process for creating investment securities from pools of residential mortgages. More particularly, the present invention relates to a data processing system and method that (i) analyzes the risk elements of interest-rate derivatives and mortgage pools, (ii) structures floating-rate securities from interest rate derivative and mortgage pool components and (iii) administers the resulting securities.

B. Description of the Related Art

A pool of fixed-rate mortgages, by itself, can be undesirable as an investment because of the possibility of prepayments. A borrower on a residential mortgage generally can pay the balance of the loan at any time ("prepay") without substantial penalty or with no penalty. If this happens, an investor in the flow pool must find an alternative investment for the amount prepaid. Moreover, mortgage borrowers are more likely to exercise their prepayment options at times when interest rates are low. Thus, the investor likely will have to reinvest the mortgage prepayments at rates of return less than the rate of return on the original investment.

The prepayment characteristic of a mortgage pool destabilizes its market value. A decline in interest rates causes an increase in the mortgage pool's prepayments, magnifying the reinvestment problem and negatively affecting the value of the mortgage pool. A rise in interest rates causes a decrease in prepayments, locking investors into a below market-rate investment. Moreover, this negative effect of prepayments on value is difficult to predict. As a result, some investment accounts have policies prohibiting or limiting the acquisition of mortgage pools.

The destabilizing effect of a mortgage pool's prepayments can be reduced by a variety of methods, including transforming part of the pool's cash flow into a floating-rate bond. A floating-rate bond is one with an interest rate that is reset periodically based on an index and that varies directly with changes in the index. When a floating-rate bond is carved out of a fixed-rate mortgage pool, the remaining cash flow has an interest rate that varies inversely with changes in the index. This remaining cash flow sometimes is called the companion inverse-rate bond. A commonly used index for floating-rate bonds and companion inverse-rate bonds is the arithmetic mean of the London interbank offered quotations for Eurodollar deposits with a maturity of one month ("LIBOR"). Typically, the rate is reset on a monthly basis.

The interest rate on a floating-rate bond usually has a minimum value or "margin" and a maximum value or "cap". The margin and cap are set so that the floating-rate bond sells at or close to a price equal to the bond's principal amount (a price of "par"). Since the interest rate on a floating-rate bond is reset monthly to current interest rates, the floating-rate bond maintains its par value in the secondary mortgage market, unless the rate is constrained by its cap. This market value stability makes a mortgage-backed floating-rate bond suitable as a money market investment. Institutions have substantial sums that may be invested for short periods of time, provided the sums can be invested in instruments that will retain their value and are easily liquidated. These sums ordinarily are not invested in mortgage pools for the reasons discussed earlier. However, they may be invested in mortgage-backed floating-rate bonds. By and large, investors in money market instruments are indifferent to prepayments on the underlying mortgage pool because the prepayments easily may be reinvested on terms comparable to those of the original investment.

Traditionally, mortgage-backed floating-rate bonds were issued entirely by Real Estate Mortgage Investment Conduits ("REMICs") formed under §§ 860A-860G of Title 26 of the United States Code (the "REMIC Rules"). Under the REMIC rules, fixed-rate mortgages were contributed to a REMIC pool as trustee and payments on these mortgages were allocated disproportionately to bonds issued by the REMIC, including floating-rate and companion inverse-rate bonds. As a practical matter, the kinds of disproportionate allocations required to transform fixed-rate mortgages into floating-rate bonds must be made under the REMIC Rules.

Although the traditional method of issuing floating-rate mortgage-backed securities adds value, the method is inefficient. The REMIC Rules focus on defining a tax methodology for the disproportionate allocation of mortgage payments. In accomplishing this, the REMIC Rules incidentally impose significant economic limitations on the creation of floating-rate bonds. In particular, the REMIC rules materially limit the use of interest-rate derivative instruments.

SUMMARY OF THE INVENTION

The present invention takes as its starting point the traditional REMIC floating-rate/inverse-rate structure. In this structure, the principal and interest cash flows from a pool of fixed-rate mortgages or mortgage securities ("mortgage assets") are allocated dollar-for-dollar to the floating-rate ("FLT") and inverse-rate ("INV") bonds.

As principal payments are received on the mortgage assets (typically each month), every dollar received is used to pay down the principal balances of the FLT and INV bonds, in each case in proportion to their balances. Therefore, the respective FLT and INV balances remain constant in relation to each other, and their aggregate balance equals that of the mortgage assets at all times.

Interest payments received on the mortgage assets are allocated to the FLT and INV bonds based on their interest rate formulas. These formulas are derived so that every dollar of interest received will be passed through as interest on one or both of the bonds. Interest payments are calculated by applying the applicable per annum interest rate to the principal balance of the bond, as reduced from time to time. The FLT bond's interest rate increases as the reference index rises, while the INV bond's interest rate decreases. On a dollar basis, the two offset each other precisely—an increase in interest payments to either is matched by an equal decrease to the other. Chart 1 shows an example of the traditional REMIC FLT/INV structure.

CHART 1

|  | Principal balance | Interest rate | Minimum rate | Maximum rate |
|---|---|---|---|---|
| Mortgage assets | $100,000,000 | 6.5% | 6.5% | 6.5% |
| FLT | $76,470,588 | LIBOR + 0.35% | 0.35% | 8.5% |

CHART 1-continued

| | Principal balance | Interest rate | Minimum rate | Maximum rate |
|---|---|---|---|---|
| INV | $23,529,412 | 3.25 × (8.15% − LIBOR) | 0.0% | 26.4875% |

In this example, the FLT and INV interest rates vary at all levels of LIBOR from 0% through 8.15%; at 8.15% LIBOR and higher, the FLT rate is at its maximum and the INV rate is at its minimum. Their weighted average interest rate is 6.5% (the interest rate of the mortgage assets) at all levels of LIBOR.

The FLT bond typically is structured to sell at par, whereas the INV bond typically sells at a discount. Therefore, if the principal balance of the FLT bond can be increased and that of the INV bond can be reduced, their aggregate value will be higher, other factors being held constant. According to the principles of the present invention, a more efficient structure can be created under appropriate market conditions by introducing a derivative contract. Extending the example in Chart 1, we begin by creating the following REMIC FLT/INV structure represented in Chart 2:

CHART 2

| | Principal balance | Interest rate | Minimum rate | Maximum rate |
|---|---|---|---|---|
| Mortgage assets | $100,000,000 | 6.5% | 6.5% | 6.5% |
| FLT | $92,857,143 | LIBOR + 0.7% | 0.7% | 7.0% |
| INV | $7,142,857 | 13 × (6.3% − LIBOR) | 0.0% | 81.9% |

Now the FLT/INV interest rates vary at all levels of LIBOR from 0% through 6.3%. As in Chart 1, their weighted average interest rate is 6.5% at all levels of LIBOR.

Next, the derivative contract (a so-called "corridor exchange") is added to this structure. Under this type of contract, Party A "swaps" interest payments at a fixed rate with Party B in exchange for interest payments at a variable rate within a relatively tight index corridor, or set of limits. For example, assume the FLT bond is Party A; it gives up interest (on its principal balance) at 0.35% to Party B, a financial institution. This effectively reduces the FLT bond's margin from 0.7% to 0.35%. Party B, in exchange, pays interest (on the same balance) to the FLT bond at a rate equal to:

LIBOR—6.3%, but with a cap of 1.85%

Party B pays no interest if LIBOR is 6.3% or lower, 1.85% interest if LIBOR is 8.15% or higher, and interest at a variable rate if LIBOR is between 6.3% and 8.15%. Party B's payment effectively permits the FLT bond to receive increasing interest payments above its otherwise maximum rate of 7.0%.

Therefore, by combining the corridor exchange and the structure shown in Chart 2 within an investment trust, the following structure represented in Chart 3 is created:

CHART 3

| | Principal balance | Interest rate | Minimum rate | Maximum rate |
|---|---|---|---|---|
| Mortgage assets | $100,000,000 | 6.5% | 6.5% | 6.5% |

CHART 3-continued

| | Principal balance | Interest rate | Minimum rate | Maximum rate |
|---|---|---|---|---|
| FLT | $92,857,143 | LIBOR + 0.35% (i.e., LIBOR + 0.7% − 0.35%) | 0.35% (i.e., 0.7% − 0.35%) | 8.5% (i.e., 7.0% − 0.35% + 1.85%) |
| INV | $7,142,857 | 13 × (6.3% − LIBOR) | 0.0% | 81.9% |

The FLT interest rate varies at all levels of LIBOR from 0% through 8.15% (as in Chart 1), and the INV interest rate varies at all levels of LIBOR from 0% through 6.3% (as in Chart 2). Their weighted average interest rate varies from 6.175% (if LIBOR is 6.3% or lower) to approximately 7.893% (if LIBOR is 8.15% or higher).

As Chart 3 shows, the invention results in a FLT bond with the same interest rate formula as the traditional FLT bond (Chart 1) but with a higher principal balance. Therefore, its value is significantly increased. Under all market scenarios where this increase exceeds the reduction in value of the INV, the addition of the fixed-for-corridor exchange enhances the combined value of the FLT/INV bonds, increasing the efficiency with which the bonds are issued. In the present disclosure, classes of floating-rate bonds that are structured in this way are referred to as "efficient floating-rate classes" or "EFCs", and series of securities that include EFCs are referred to as "EFC Series".

Chart 3 shows an exchange of fixed-rate payments for corridor payments and an integration of the corridor payments into the FLT bond payments. This exchange illustrates an advantage of the invention over traditional FLT bond structures. As discussed above, payments within the traditional structure flow only one way; from the mortgage assets to the FLT and INV bonds. With the structure shown in Chart 3, payments can flow both ways; both to and from the FLT bond. When LIBOR exceeds 6.65%, Party A receives net payments from Party B under the corridor exchange (LIBOR—6.3% received, minus 0.35% paid). However, when LIBOR is less than 6.65%, Party B receives net payments from Party A. By expanding one-way payment securities structures into two-way payment structures, the issuer obtains added flexibility and can be more responsive to market conditions. This allows the issuer to create its securities more efficiently.

Chart 3 also shows how investment trusts can be used to add corridor exchange payments to the FLT bond payments. An investment trust is a trust formed and administered under §§ 671-679 of Title 26 of the United States Code (the "Grantor Trust Rules"). In the illustration, the original FLT bond (Chart 2) is contributed to an investment trust and the trustee, as owner of the original FLT bond, enters into the corridor exchange as Party A. Since the Grantor Trust Rules allow securities to be created out of interest-rate derivative contracts, the trust may issue the FLT bond (Chart 3) that adds the corridor payments to the original FLT bond.

The charts in this section, like the examples in the attached drawings, are illustrative only. The variables in any given EFC Series, such as the interest rate formulas and terms of the corridor exchange, will depend on prevailing interest rates and other market conditions, which change continually. Moreover, the derivatives which may be used in accordance with the present invention include, but are not limited to, calls, puts, caps, floors, collars, mortgage reference indexes, synthetic debt, and other interest-rate derivative contracts, in addition to corridors. Similarly, the cash flows from mortgage pools may include, for example, cash flows from REMICs, Financial Asset Securitization Investment Trusts (FASITs), mortgage-backed securities, mortgage securities, or collateralized mortgage obligations. The remaining sections of this application describe both the EFC Series securities and the data processing system and method with more specificity.

The present invention provides data processing systems and methods for planning, structuring and administering EFC Series. EFC Series are created by integrating interest-rate derivative components with mortgage components through the use of structures that combine investment trust pools, REMIC pools and other legal entities. The disclosed embodiments focus on the use of investment trust pools to add corridor payments to the EFC Series asset base. However, the data processing systems for EFC Series are designed with broader capabilities. Systems and methods consistent with the principles of the invention can process securities structures that combine FASITs, formed under §§ 860H-860L of Title 26 of the United States Code, and other legal entities, as well as REMIC pools, and investment trust pools. Systems and methods consistent with the present invention may also process EFC Series backed by assets that include, but are not limited to, calls, puts, caps, floors, collars, mortgage reference indexes, synthetic debt, and other interest-rate derivative contracts, as well as corridors.

If part of the cash flow for a floating-rate security can be obtained most economically from a corridor exchange, a corridor exchange account is used to fund that component. If part of the cash flow for the security can be obtained most economically from another kind of interest-rate derivative contract, a derivative account appropriate for that kind of contract is used to fund that component. If part of the cash flow can be obtained most economically from mortgage assets, a pool of mortgage assets is used to fund that component. These various assets are combined through the use of the most efficient legal structure.

The cost efficient transformation of derivatives and mortgages into floating-rate securities increases the supply of capital available to support residential mortgages. This, in turn, reduces the cost of mortgages to homeowners. The present invention is a process that integrates interest-rate derivatives with mortgage assets using the most cost efficient structure available.

As disclosed herein, the EFC Series data processing systems consistent with the principles of the present invention can be divided into three modules generally corresponding to stages in the business process. The Risk Analysis and Planning Module includes the systems that are used interactively during the planning period for and EFC Series. After a plan is developed, the Deal Structure Module is activated to manage the process of preparing an EFC Series for issuance. The Deal Structure Module shifts operation to the Series Administration Module when the EFC Series is issued ("settlement") and the Series Administration Module controls the ongoing administration of the EFC Series.

BRIEF DESCRIPTION OF THE DRAWINGS

The accompanying drawings, which are incorporated in and constitute a part of this specification, illustrate embodiments of the invention and together with the description, serve to explain the principles of the invention.

In the figures:

FIGS. 6-1, 6-2, 6-3, 6-4, 6-5, 7-1, 7-2, 7-3, 7-4, 7-5, 7-6, 8, 9-1, 9-2, 9-3, 9-4, 9-5, 9-6, 9-7, 9-8, 9-9, 9-10, 9-11, 9-12, 9-13, 9-14, 9-15, 9-16, 9-17, 9-18, 9-19, 9-20, 9-21, 9-22, 9-23, 9-24, 9-25, 9-26, 10-1, 10-2, 10-3, 10-4, 10-5, 11-1, 11-2, 11-3, 11-4, and 11-5 illustrate exemplary application program output of the Risk Analysis and Planning Module;

FIG. 12 depicts the principal data processing systems components of the Deal Structure Module of the EFC Series System; and FIG. 13 depicts the principal data processing systems components of the Series Administration Module of the EFC Series System.

DETAILED DESCRIPTION

Figure 1:
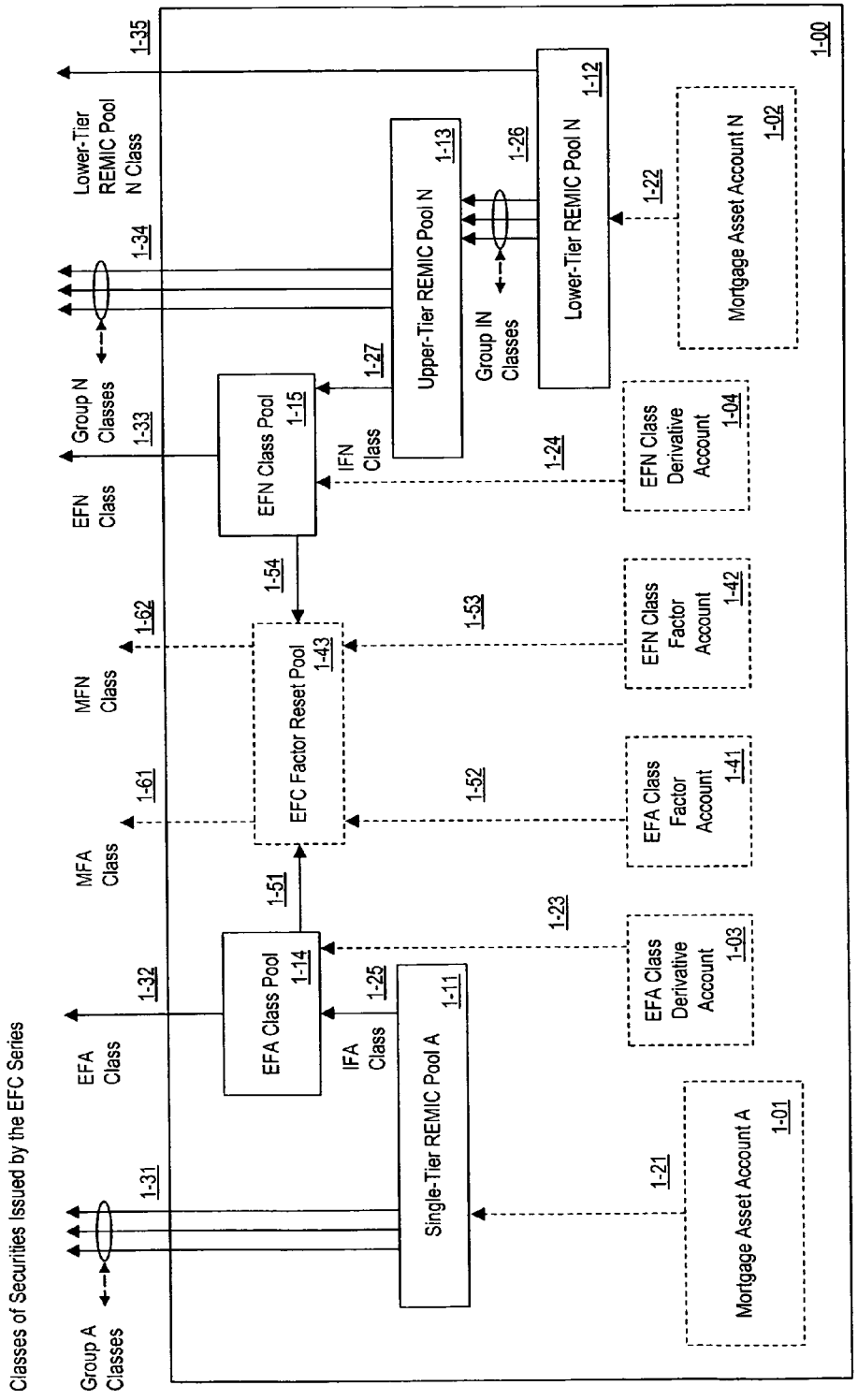
FIG. 1 is a block diagram representation showing an example of the securities created by the present invention. It shows the relationships of the securities to their interest-rate derivative and mortgage pool components.
Figure 2:
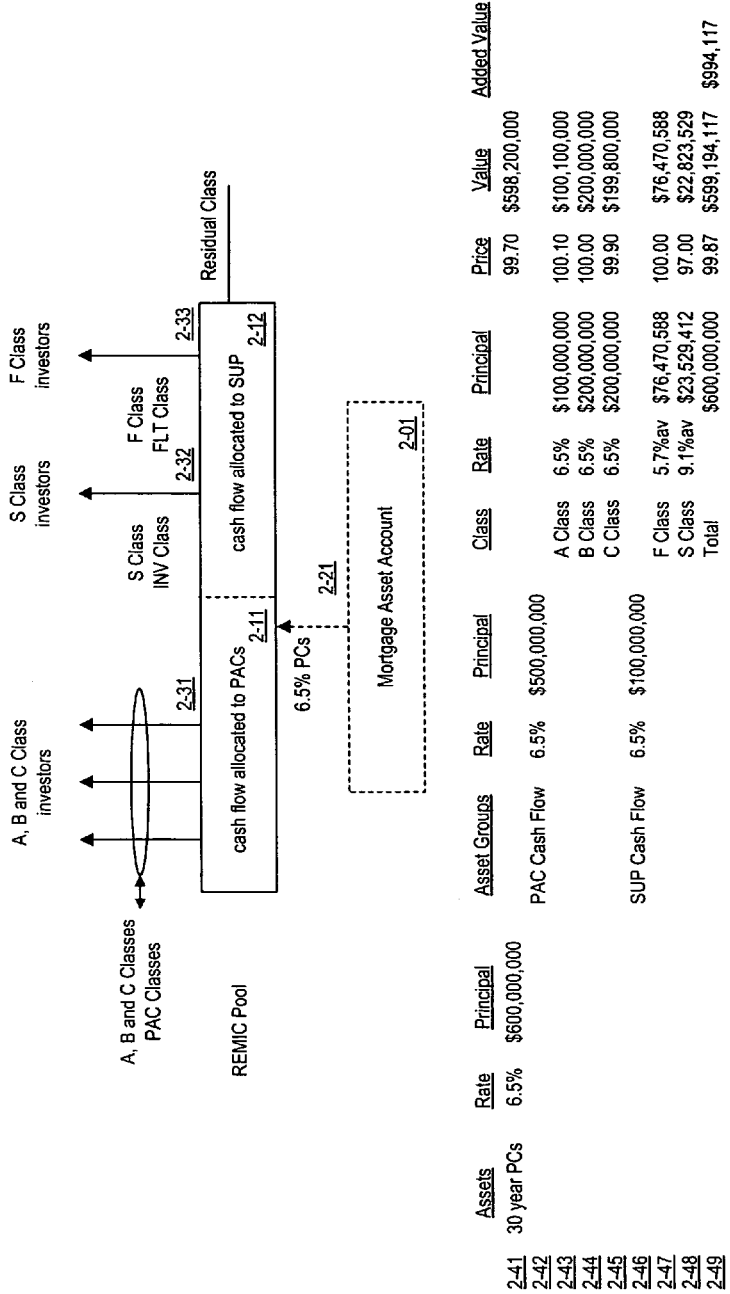
FIG. 2 illustrates an exemplary, traditional floating-rate bond funded only with a REMIC pool.
Figure 3:
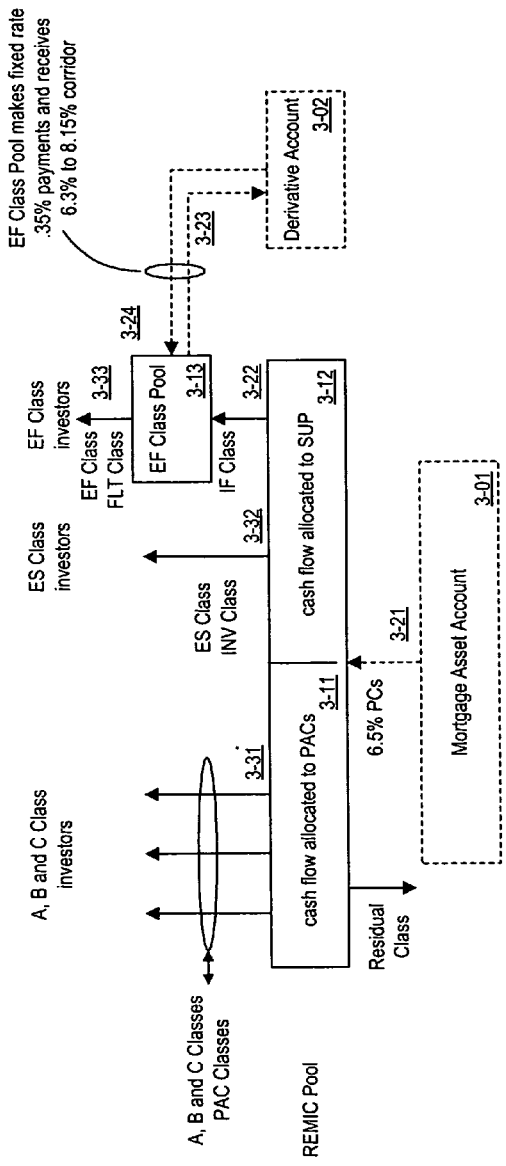
FIG. 3 illustrates an exemplary EFC floating-rate security, consistent with the principles of the invention, funded with an interest-rate derivative component and a mortgage pool component.

FIGS. 1, 2 and 3 describe the new method used to create EFC Series. FIG. 1 illustrates the integration of interest-rate derivative components and mortgage pool components into an EFC Series. FIGS. 2 and 3 show the value that is created by the EFC method. FIGS. 4 through 8 describe the data processing systems that implement this method.

A. EFC Series Method

FIG. 1 depicts the structure of an EFC Series. EFC Series are issued in Classes, each of which represents an interest in one or more of the Pools established by the Series. A Pool is a set of specifically identified assets held by the issuer of the securities as part of the Series. Typically, the interest represented by a Class is the right to receive certain payments from the assets identified to the underlying Pool or Pools.

A Class may be issued directly to the public or may be issued by one Pool established by the Series and contributed to another Pool established by the Series (an "internal" Class). In case of an internal Class, payments received by the Class from the first Pool become part of the second Pool and thereafter may be paid to other Classes funded from the second Pool. In this manner, payments on the assets underlying a Series may be divided and combined in a variety of ways before finally being paid through to investors. In some cases, a Class may be established that represents an interest in a Pool with no assets (an "unfunded" Class). A Series may establish an unfunded Class so that assets can be contributed to the Series, funding the Class, at a later date.

In FIG. 1, lines 1-31, 1-32, 1-33, 1-34 and 1-35 represent publicly issued Classes of the EFC Series. Lines 1-61 and 1-62 represent unfunded Classes. Block 1-00 and the components within it all represent functions of the EFC Series internal to the issuer. These internal components include IFA Class, IFN Class and the Group IN Classes, represented by lines 1-25, 1-27 and 1-26 respectively. As notational conventions, the letter F in a Class name denotes a FLT Class, the letter S denotes an INV Class, the letter E denotes an EFC Class, the letter M denotes an unfunded EFC Class and the letter I denotes an internal Class. The letters A and N denote Pools and Classes related to Mortgage Asset Accounts A and N, respectively.

The Pools established by an EFC Series may be EFC Pools (blocks 1-14 and 1-15), or REMIC Pools. A REMIC Pool may be a Single-Tier (block 1-11), Lower-Tier (block 1-12) or Upper-Tier (block 1-13) REMIC Pool. The assets identified to these Pools may be mortgage assets (blocks 1-01 and 1-02), or may be interest-rate derivatives (blocks 1-03 and 1-04). In FIG. 1, the mortgages of Mortgage Asset Account A are identified (line 1-21) to Single-Tier REMIC Pool A as its assets and the mortgages of Mortgage Asset Account N are identified (line 1-22) to Lower-Tier REMIC Pool N as its assets. The interest-rate derivative of EFA Class Derivative Account and the internal IFA Class are identified (lines 1-23 and 1-25) to EFA Class Pool as its assets. The interest-rate derivative of EFN Class Derivative Account and the internal IFN Class are identified (lines 1-24 and 1-27) to EFN Class Pool as its assets. Group IN Classes are identified (line 1-26) to Upper-Tier REMIC Pool N as its assets.

EFA Class (line 1-32) represents ownership of EFA Class Pool (block 1-14). Since the assets of EFA Class Pool are IFA Class (line 1-25) and a position (line 1-23) in EFA Class Derivative Account (block 1-03), EFA Class owns both of these assets. IFA Class, in turn, represents a claim to certain payments from Single-Tier REMIC Pool A (block 1-11). These payments must come from Mortgage Asset Account A (block 1-01). Thus, an investor in EFA Class receives payments that combine payments from the interest-rate derivative of EFA Class Derivative Account with payments on the mortgages of Mortgage Asset Account A. By this method, an interest-rate derivative component and a mortgage component are integrated to create a new investment security—EFA Class.

Similarly, EFC Class (line 1-33) combines payments from the interest-rate derivative of EFC Class Derivative Account (block 1-04) with payments on the mortgages of Mortgage Asset Account N (block 1-02). In this case, the payments from the mortgage component of EFN Class go through an additional step. First the payments are made (line 1-22) from Mortgage Asset Account N to Lower-Tier REMIC Pool N (block 1-12), then some or all of the payments are allocated (line 1-26) by Lower-Tier REMIC Pool N to Upper-Tier REMIC N (block 1-13). From Upper-Tier REMIC N, part of the payments are allocated (line 1-27) to EFN Class Pool (block 1-15) and then passed through (line 1-33) to investors in EFN Class. The use of the Upper-Tier, Lower-Tier REMIC structure extends the kinds of disproportionate allocations that may be made under the REMIC Rules.

An EFC Series may have an unfunded EFC Factor Reset Pool (block 1-43). This Pool is a facility to make secondary market adjustments to the margins and caps of floating-rate Classes. Part of the value of a floating-rate Class derives from its par price and the initial margin and cap of the Class are set to accomplish this. However, unexpected interest rate changes may leave the Class trading at a significant discount or premium. If this happens, it may be desirable to restore the Class to a par price by adjusting its margin or cap with the cash flow of another interest-rate derivative.

The EFC Factor Reset Pool (block 1-43) is established, together with an unfunded MFA Class (line 1-61) and an inoperative EFA Class Factor Account (block 1-41), when the EFC Series is issued. At a later time, the original EFA Class and EFA Class Factor Account, activated as an additional interest-rate derivative, may be contributed (lines 1-51, 1-52) to the EFC Factor Reset Pool and their cash flows integrated to form a modified floating-rate MFA Class (line 1-61) with the desired margin and/or cap. Similarly, at a later time, EFN Class may be delivered to the issuer (line 1-54) to hold as an asset of EFC Factor Reset Pool together with (line 1-53) EFN Class Factor Account (block 1-42). EFC Factor Reset Pool then funds MFN Class (line 1-62) integrating the cash flows from EFN Class and EFN Class Factor Account.

Generally, all the internal components of an EFC Series are established and all the EFC Classes issued on the same day. Thereafter, the Series receives and pays money according to its original terms without discretionary action by the issuer or the investors in the Series. Amounts received on the assets of the Series are reallocated, but in the aggregate are paid through to investors in the publicly issued Classes on a monthly basis.

The value added by the EFC Series method and structure may be seen by comparing a traditional floating-rate bond as shown in FIG. 2, with an equivalent EFC floating-rate security as shown in FIG. 3. In FIG. 2, the floating-rate bond, F Class, is funded entirely from a REMIC pool. In FIG. 3, the comparable EFC security, EF Class, is funded from the same REMIC pool and from a interest-rate derivative account. EF Class makes the same payments as does F Class. However, it is constructed by the economically more efficient EFC Series method.

In FIG. 2, the assets of the REMIC Pool (blocks 2-11 and 2-12) are, for example, Series600,000,000 Freddie Mac Participation Certificates ("PCs") with an interest coupon of 6.5% (row 2-41). A PC is a certificate representing ownership of a pool of underlying mortgage loans (block 2-01). Freddie Mac holds the underlying mortgages and performs such pool administrative tasks as collecting mortgage payments and enforcing remedies in the event of mortgage default. Administrative costs and expenses are deducted from interest payments received on the mortgages and the remaining interest is passed through on a monthly basis to the holders of the PCs at a "coupon" interest rate of 6.5%. Principal amounts received on the underlying mortgages also are passed through to PC holders on a monthly basis. Freddie Mac guarantees payment of principal and interest at the coupon rate on the PCs.

The REMIC Pool (blocks 2-11 and 2-12) creates bonds out of the PC cash flow by means of a three step disproportionate allocation process, sometimes called an engineering process. First, the REMIC allocates a portion of the PC cash flow (block 2-11) to a series of planned amortization classes ("PACs"). A PAC is a Class of bonds designated to receive principal payments according to a predetermined schedule. When principal payments on the PCs are received by the REMIC, it allocates principal to the PACs up to exactly the amount given by their predetermined schedules. The amount of principal received each month by the REMIC will vary because of prepayments on the underlying mortgages. However, the REMIC gives allocation priority to meeting the PAC schedules. Any variation in principal payments is reflected in the principal remaining to be paid by the REMIC to non-PAC Classes. The remaining PC cash flow sometimes is called the supporting ("SUP") cash flow (block 2-12). In order to make the priority principal payments according to the PAC schedules, the REMIC must create the SUP cash flow to absorb the prepayment variations.

The ratio of PAC cash flow to SUP cash flow reflects a market value trade-off. Increasing the size of the SUP cash flow, increases the likelihood that payments on the PAC Classes will be made on schedule. This increases the price of the PAC Classes. However, increasing the size of the SUP cash flow reduces the proportion of the cash flow that is allocated to the more valuable PAC Classes. In FIG. 2, the REMIC allocates Series500,000,000 in principal to PAC cash flow (row 2-42) and Series100,000,000 in principal to SUP cash flow (row 2-46). The PAC cash flow is used to fund PAC Classes A, B and C (lines 2-31) with interest rates of 6.5% and principal amounts of Series100,000,000 in the case of A Class, Series200,000,000 in the case of B Class and Series200,000,000 in the case of C Class (rows 2-43, 2-44 and 2-45).

This engineering increases the value of the cash flow directed to and paid on the PACs, in comparison with its value when paid on the PCs, by increasing the likelihood that the payments on these Classes will conform to investor expectations. On the other hand, this engineering generally reduces the value of the remaining SUP cash flow. Nevertheless, the increase in value of the PACs more than compensates for the decrease in value of the SUP cash flow.

At the second step of its engineering process, the REMIC (blocks 2-11 and 2-12) subdivides the PAC cash flow (block 2-11, row 2-42) into sequential A, B, and C Classes (lines 2-31, rows 2-43, 2-44 and 2-45). Sequential Classes are Classes that receive payments in a prescribed sequence. A predetermined amount of the principal received by the REMIC is allocated to the sequential Classes as a group. However, rather than making these principal payments pro rata among the Classes, the principal is paid first to one, then another of the Classes in the prescribed sequence. In the case of sequential PACs, this sequence is reflected in their PAC schedules. In FIG. 2, principal payments are made first to A Class, then to B Class and finally to C Class. This step in the engineering process results in Classes with different terms or weighted average lives ("wals"). A Class is sold to investors that desire short-term investments, B Class to investors that desire medium-term investments and C Class to investors that desire long-term investments.

At the time the REMIC (blocks 2-11 and 2-12) was formed, the price of 6.5% PCs was 99.70 (row 2-41). Industry practice is to quote prices in terms of the amount to be paid for Series100 of principal. Thus, at a price of 99.70, the value of Series600,000,000 principal amount 6.5% PCs is (Series600,000,000×99.70)/100=Series598,200,000 (row 2-41). In a normal interest rate environment, among Classes with the same interest rate, value increases as term decreases. The values of A, B and C Classes are 100.10, 100.00 and 99.90 respectively (rows 2-43, 2-44 and 2-45). The value of each of A, B and C Classes is greater than that of the PCs because the disproportionate allocation of principal has reduced prepayment uncertainty or risk on the PACs. Among the PACs, A Class shows the greatest increase in value because it has the shortest term or wal and has the greatest likelihood of paying according to schedule. B Class shows the next greatest increase and C Class the least increase in value.

At the third step in its engineering process, the REMIC (blocks 2-11 and 2-12) allocates the SUP cash flow (block 2-12, row 2-46) between a floating-rate ("FLT") Class, F Class (line 2-32), and its related inverse-rate ("INV") Class, S Class (line 2-33). The SUP cash flow is reduced in value (in comparison to the value of the PC) because it receives much of the prepayment risk on the underlying mortgages. However, in this third step the interest on the SUP cash flow is allocated so as to form a money-market instrument, F Class, the value of which is not impaired by the high prepayment risk under most interest rate scenarios. This engineering step increases the value of the part of the SUP cash flow directed to F Class by increasing the likelihood that the payments on F Class will conform to investor expectations. Generally, this allocation reduces the value of the remaining SUP cash flow directed to S Class, but this reduction is more than offset by the increase in value of F Class.

At the time the REMIC (blocks 2-11 and 2-12) was created, F Class required a margin of 0.35% and a cap of 8.5% (row 2-61) in order to create the necessary par price (row 2-47). Thus, the interest rate formula for F Class is LIBOR+0.35% with a cap of 8.5% and the interest rate formula for S Class (as explained below) is 3.25×(8.15%−LIBOR) with a minimum value ("min") of 0.0% and a maximum value ("max") of 26.4875% (row 2-62). The SUP principal cash flow is allocated Series76,470,588 to F Class (row 2-47) and Series23,529,412 to S Class (row 2-48). Since S Class absorbs additional prepayment risk allocated away from the PACs, and also absorbs additional interest-rate risk allocated away from F Class, the price of S Class is reduced to 97.00 (row 2-48). Nevertheless, the aggregate value of F Class and S Class is Series99,294,117 which exceeds that of the SUP Class.

Under traditional floating-rate bond structures, when a FLT/INV Class combination is issued from a SUP cash flow, each dollar of SUP principal received is used to pay down the principal balances of the FLT and INV bonds, in each case in proportion to their balances. Interest payments are received on the SUP cash flow at a constant rate ("coupon"), frequently the same as the underlying PC coupon rate, and are passed through as interest on one or both of the bonds. The interest is allocated to the FLT and INV Classes based on their interest rate formulas, but the weighted average of these rates always is equal to the coupon rate.

Under these traditional payment rules, the fraction of the SUP principal that is allocated to the FLT Class depends on the SUP coupon rate and the maximum interest rate on the FLT Class. The formula for the allocation of principal to the FLT Class and its related INV Class is:

| | |
|---|---|
| (coupon/max) | allocated to the FLT Class; |
| ((max − coupon)/max) | allocated to the INV Class. |

This formula allocates the greatest possible amount of SUP principal to the FLT Class and almost always is the one used with traditional REMIC execution.

In FIG. 2, the SUP principal amount is Series100,000,000, its interest rate is 6.5% (row 2-46), and the F Class max is 8.5% (row 2-61). Thus, the SUP principal allocated to F Class is (6.5%/8.5%)×Series100,000,000=Series76,470,588 (row 2-47) and the SUP principal allocated to S Class is ((8.5%−6.5%)/8.5%) or (2.0%/8.5%)×Series100,000,000=Series23,529,412 (row 2-48).

First priority for the allocation of SUP interest is to make the interest payments to the FLT Class that are needed to give it a par price. The INV Class receives whatever interest remains after meeting this requirement. If principal is allocated between FLT Class and INV Class in the proportions shown above, then under the rules of algebra, the INV Class interest rate formula must be:

(FLT Class principal/INV Class principal)×(FLT Class max−FLT Class margin−LIBOR); or (coupon/(max−coupon))×(FLT Class max−FLT Class margin−LIBOR);

where the fraction (FLT Class principal/INV Class principal), or (coupon/(max−coupon), sometimes is called the leverage of the FLT/INV combination. In FIG. 2, the leverage is Series76,470,588/Series23,529,412=3.25 and F Class max−F Class margin is 8.5%−0.35%=8.15%. Thus, the interest rate formula for S Class is 3.25×(8.15%−LIBOR) (row 2-62).

An appreciation for the source of value added by the FLT/INV bond structure can be gained from an examination of the average values of LIBOR. Since 1990, the average value of LIBOR has been approximately 5.35%. Thus, F Class will pay interest on average at a rate of approximately 5.35%+ 0.35%=5.7%. Since the SUP cash flow pays interest at a rate of 6.5%, each Series1 of principal allocated to F Class on average will free-up 6.5%−5.7%=0.8% surplus interest that will be paid to S Class. Although F Class is allocated less than a proportionate share of the SUP interest, the allocation increases the value of F Class.

If Series1 of principal is allocated to F Class for every Series1 of principal allocated to S Class, the average interest-rate of S Class is approximately 6.5%+0.8% (floater surplus)= 7.3%. If Series2 of principal is allocated to F Class for every Series1 allocated to S Class, the average interest-rate of S Class increases to approximately 6.5%+0.8%+0.8%=8.1%. Since, in FIG. 2, Series3.25 of principal is allocated to F Class for every Series1 allocated to S Class (rows 2-47 and 2-48), the average interest-rate of S Class increases to approximately 6.5%+(3.25×0.8%)=9.1%. Although S Class is allocated a greater share of the interest rate risk, S Class is compensated for assuming that risk. The greater the leverage, the greater the interest-rate S Class receives, on average.

In FIG. 2, the F/S Class leverage is increased only to 3.25 because the traditional method of creating Class-backed floating-rate bonds artificially limits the source of the interest payments of these Classes. The traditional structure requires that all interest payable on F Class come from the underlying SUP cash flow, no matter how high the F Class interest rate might be and no matter how unlikely it might be that interest rates ever would reach that level. Under this artificial limit, the SUP interest, at the rate of 6.5%, must be sufficient to pay F Class interest at its maximum rate of 8.5%. The only way to accomplish this is to limit the proportion of the SUP principal that is allocated to F Class so that:

(F Class principal)×8.5%=all available interest=(SUP principal)×6.5%.

This equation leads to the maximum F Class principal of (6.5%/8.5%)×Series100,000,000=Series76,470,588 and the leverage of 3.25.

This artificial limitation on the F/S Class leverage is economically inefficient. The value of Series100 in principal of F Class is Series100. The value of Series100 in principal of S Class is Series97. Every additional Series100 of SUP cash flow that can be allocated to F Class, potentially adds Series3 in value to the Series. In the long run, this reduces the cost of residential mortgages to homeowners.

The exemplary EFC Series structure displayed in FIG. 3 overcomes the artificial limitation on the F/S Class leverage shown in FIG. 2. The EFC Series shown in FIG. 3 issues EF Class with the same cash flow as F Class. However, EF Class is funded in part with SUP cash flow (block 3-12) and in part with a interest-rate derivative instrument paid through a Derivative Account (block 3-02). The integration of Derivative Account 3-02 into the Series allows the SUP leverage to be increased from 3.25 to 13. It allows Series92,857,143 in principal amount of the SUP cash flow to be allocated to the more valuable EF Class (row 3-47). In comparison, only Series76,470,588 in principal amount of the SUP cash flow was allocated to F Class (FIG. 2, row 2-47).

The improved series execution shown in FIG. 3 is accomplished by dividing the spread between the interest rate coupon on the SUP cash flow and the max required for the FLT Class, into lower and upper ranges. The lower range is from 6.5% to 7.0% and the upper range is from 7.0% to 8.5%. The lower range is funded directly from SUP interest. The upper range is funded by purchasing a LIBOR corridor from outside the REMIC cash flow–the EFC exchange (lines 3-23 and 3-24). Since the high values of the FLT Class interest rate no longer must be paid with SUP interest, a greater proportion of the SUP cash flow may be assigned to the more valuable FLT Class. The EFC corridor used to fund the upper range is purchased with fixed-rate periodic payments from SUP interest and has a notational principal amount ("NPA") equal to the declining principal balance of the new FLT Class, EF Class.

In order to create EF Class (line 3-33) with the same cash flow as F Class (FIG. 2, line 2-33), the EFC Series in FIG. 3 first creates IF Class (line 3-22), an internal FLT Class with a maximum value equal to 7.0%, the maximum of the lower range. IF Class is held by the issuer as an asset of EF Class Pool (block 3-13), and EF Class Pool enters into the EFC exchange with Derivative Account (block 3-02) to purchase a LIBOR corridor funding EF Class interest in the upper range. The terms of the EFC exchange are set so that the net cash flow to EF Class Pool is equal to the cash flow required by EF Class. Since IF Class Pool makes fixed monthly payments in exchange for the corridor payments, the cash flow required for these fixed monthly payments is added to IF Class margin. Thus, IF Class margin is equal to the sum of EF Class margin and the fixed payment rate under the EFC exchange. Once IF Class margin is set, the boundaries of the LIBOR corridor can be determined. The lower boundary of the corridor is IF Class max less IF Class margin and the upper boundary of the corridor is EF Class max less EF Class margin.

In FIG. 3, the cost of the LIBOR corridor is 0.35%. Thus, IF Class margin is set equal to 0.7% (0.35% ES Class margin plus 0.35% EFC exchange payments) and the LIBOR corridor boundaries are determined to be 6.3% (IF Class max, 7.0% less IF Class margin, 0.7%) and 8.15% (EF Class max, 8.5%, less EF Class margin, 0.35%). The following calculation shows that IF Class and the EFC exchange together provide EF Class Pool with the net cash flow required for EF Class.

| EF Class interest | from IF Class | from corridor | total |
|---|---|---|---|
| if LIBOR <= 6.3% | LIBOR + .7% − .35% | 0.0% | LIBOR + .35% |
| if 6.3% < LIBOR <= 8.15% | 7.0% − .35% | LIBOR − 6.3% | LIBOR + .35% |
| if 8.15% < LIBOR | 7.0% − .35% | 1.85% | 8.5% |

Since the interest rate formula for IF Class is LIBOR+0.7%; min=0.7%, max=7.0% (row 3-61), the interest on the SUP cash flow that remains for the new INV Class, ES Class (line 3-32), is calculated to be payable according to the formula: 13×(6.3%−LIBOR); min=0.0%, max=81.9% (row 3-63).

EF Class Pool (block 3-13) and Derivative Account (block 3-02) are the EFC Class structural elements that integrate the 6.3% to 8.15% LIBOR corridor into the funding base for EF Class (line 3-33). EF Class Pool is governed by the Grantor Trust Rules, not the REMIC Rules. In this case, the EFC Series structure makes it possible to assign a greater proportion of the SUP cash flow to the more valuable FLT Class. It also makes possible an assignment of a greater proportion of the SUP interest to the companion INV Class. The average interest rate on ES Class is expected to be 15.3% (row 3-48), compared to 9.1% for S Class (FIG. 2, row 2-48). Under these market conditions, ES Class will command the same market price (row 3-48) as S Class (FIG. 2, row 2-48). This means that the EFC structure adds value in an amount equal to the product of the increase in the amount of SUP principal assigned to the FLT Class and the price differential between the FLT Class and INV Class: (Series92,857,143−Series76,470,588)×(Series100.00−Series97.00)/Series100=Series491,597 (row 3-50).

The EFC Series structure shown in FIG. 3 displays interrelationships among a number of complex market conditions. First, the amount of SUP principal that can be reassigned to the FLT Class depends on the width of the LIBOR corridor that is integrated into the EFC Series. The width of the corridor depends on the amount of SUP interest that can be assigned to make the fixed-rate periodic payments for the corridor. The amount of SUP interest that can be so assigned depends on the yield required by the INV Class buyer and also on the amount of interest that can be reassigned from the PAC cash flow to the SUP cash flow. The yield required by the INV Class investor depends upon the degree to which prepayments on the Mortgage Asset Account are allocated to the SUP cash flow. The amount of interest that can be reassigned from the PAC cash flow depends on the wal requirements of PAC investors and on the convexity of the interest-rate yield curve. The degree to which prepayments on the Mortgage Asset Account are allocated to the SUP cash flow, depends upon the amount of call and extension protection required by PAC Class investors.

In addition, Derivative Account 3-02 may include calls, puts, caps, floors, collars, swaps, mortgage reference indexes, synthetic debt, and other interest-rate derivative contracts without departing from the spirit of the present invention.

B. EFC Series Data Processing System

Figure 4:
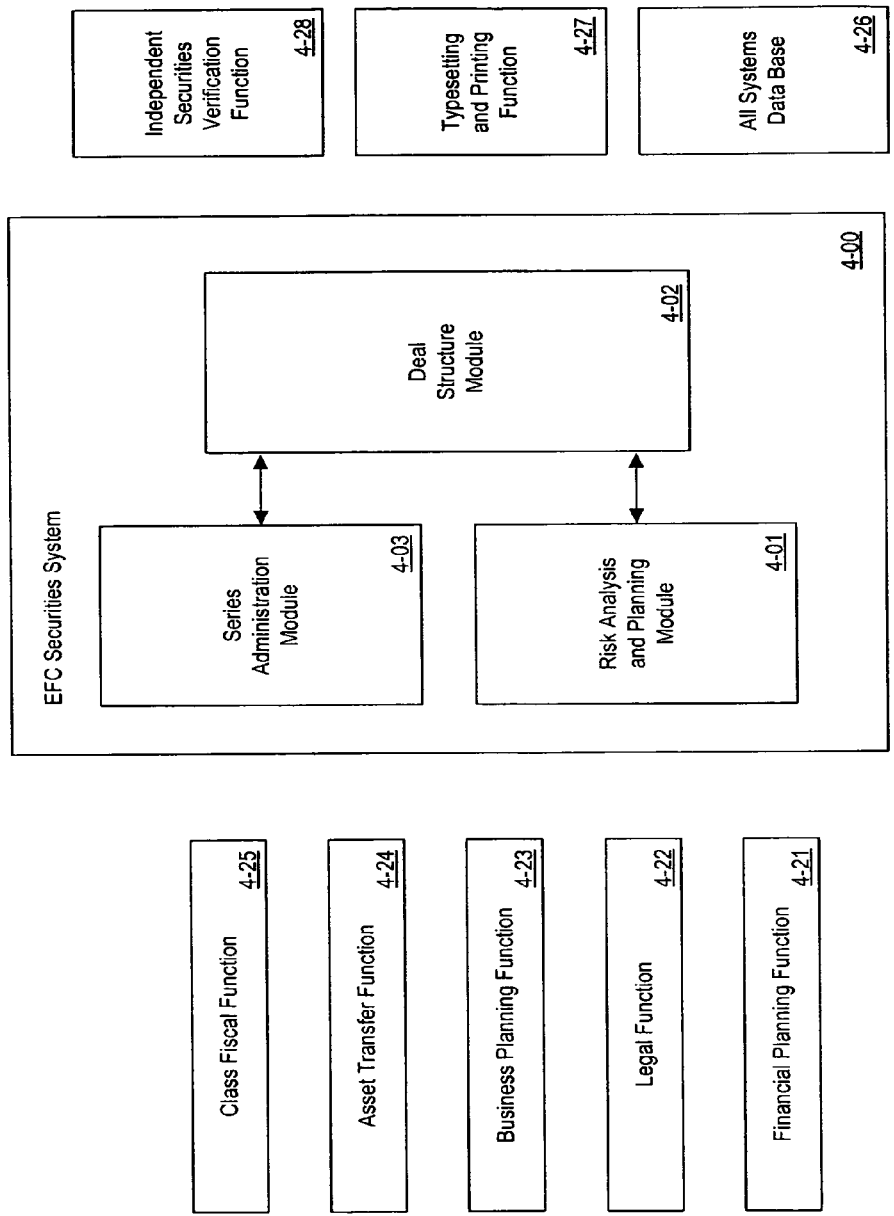
FIG. 4 depicts an overview of the EFC Series System showing its Risk Analysis and Planning Module, Deal Structure Module and Series Administration Module.

FIG. 4 demonstrates an exemplary data processing system to support the creation of EFC Series. At the planning level, systems are required to support the calculations needed to determine the market interrelationships just discussed. In particular, the data processing systems must be able to generate distributions of expected interest rates and estimate costs of interest rate corridors. The data processing systems must be able to calculate mortgage pool prepayment scenarios and integrate these calculations with interest rate distributions. The data processing systems must be able to interactively modify REMIC payment allocation rules and correlate the modifications with market derivatives costs. After a plan for an EFC Series is determined, the data processing systems must be able to create and verify a variety of data files reflecting the complex structural components required for an EFC Series. After EFC Series is issued, the data processing systems must be able to maintain the integrity and reliability of these data files.

The EFC data processing system may include three interrelated systems modules that run in a distributed applications environment on a network of central processors and remote terminals (FIG. 4, block 4-01). These modules may function on a Series by Series basis and can be organized according to phases in the business process of creating EFC Series. FIG. 4 depicts the system of three modules (blocks 4-01, 4-02 and 4-03) together with interacting but separate systems (blocks 4-21 to 4-28).

The Risk Analysis and Planning Module (block 4-01) functions during the planning period for an EFC Series. After a plan is formulated, the Deal Structure Module (block 4-02) is activated in order to validate the plan and initialize the asset files, class files, payment files and disclosure files for the EFC. The two modules interact to respond to changes in plans up until a few days before the securities are issued. The EFC Administration Module (block 4-03) is activated several days before the securities are issued and interfaces with the Deal Structure Module to complete and verify the class and payment files. The EFC Administration Module functions on a continuing basis during the life of the Series.

Figure 5:
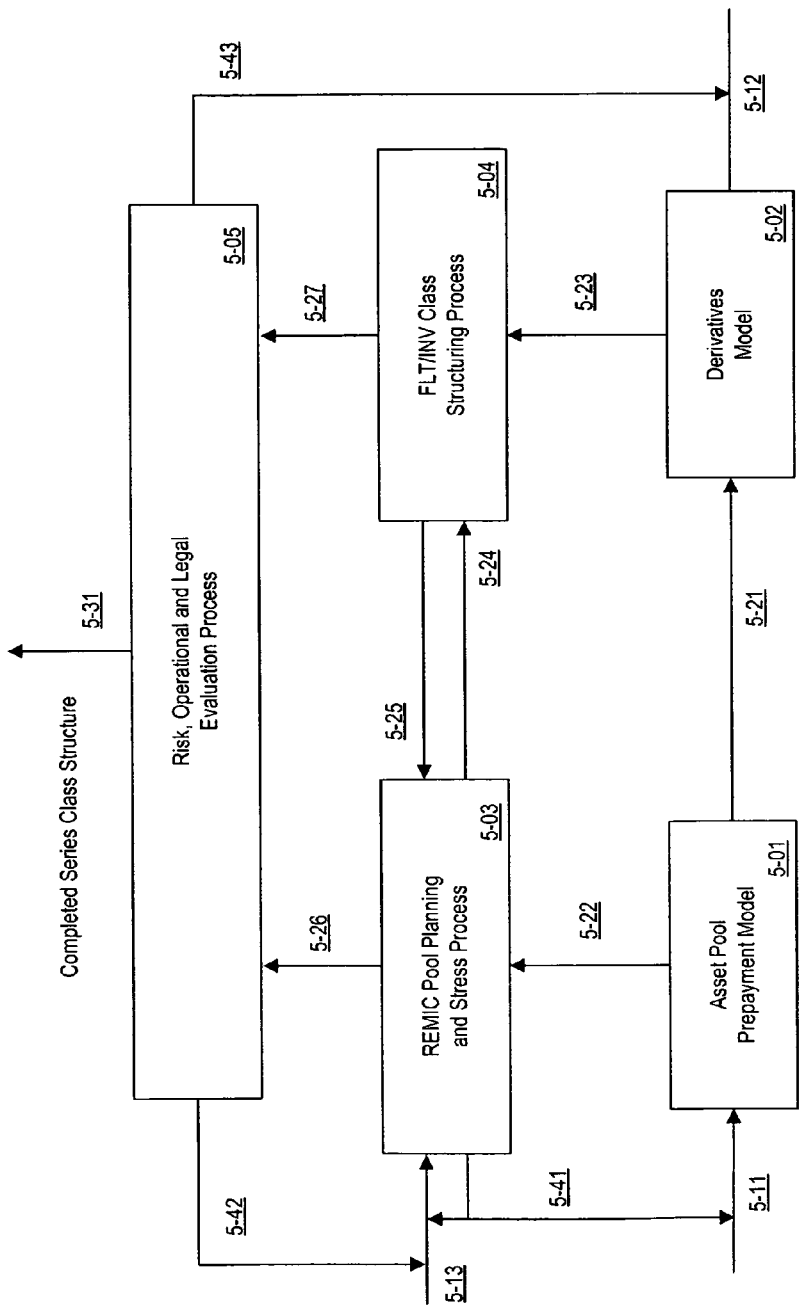
FIG. 5 depicts the principal data processing systems components of the Risk Analysis and Planning Module of the EFC Series System.

FIG. 5 depicts the principal process components of the Risk Analysis and Planning Module (FIG. 4, block 4-01). Three of the components function primarily on data sourced from outside the EFC Series System. These are the Asset Pool Prepayment Model (block 5-01), the Derivatives Model (block 5-02) and the REMIC Pool Planning and Stress Process (block 5-03). Analysis from the Asset Pool Prepayment Model combines (line 5-22) with user data (line 5-13) to form the primary data base for the REMIC Pool Planning and Stress Process. Analysis from the Asset Pool Prepayment Model also combines (line 5-21) with user data (line 5-12) to form the primary data base for the Derivatives Model.

The Asset Pool Prepayment Model (block 5-01) receives user data describing the kinds of assets expected to be used to fund the EFC Series (line 5-11). The assets may be described by general category, such as Series400,000,000 new origination 30-year 6.5% PCs and Series200,000,000 new origination 15-year 6.0% PCs, so that the planning process may begin before capital is committed to asset acquisition. If an asset is a mortgage asset, such as a PC, the data includes values describing the underlying mortgages such as their remaining term to maturity, loan age and per annum interest rate. The data also may include projected interest rates and the anticipated effect of the projected rates on prepayments.

The Asset Pool Prepayment Model has access to a data base of historical values of prepayments by kind of asset in the issuer's All Systems Data Base (FIG. 4, block 4-26). The All Systems Data Base is a central repository for corporate wide data. It is external to the EFC Series System, but is accessed by the EFC Series System for data entry and retrieval. Users of the EFC Series System can input asset type and prepayment rate parameters interactively, and receive output projecting expected cash flow and comparing projections to selected historical values. Industry standard rates referred to as "PSA" rates commonly are input as prepayment parameters. Users can input interest rate scenarios interactively and examine their impact on expected cash flows. FIGS. 6-1 through 6-4 illustrate part of an exemplary, projected cash flow of a Mortgage Asset Account calculated by the Asset Pool Prepayment Model. FIG. 6-1 to 6-4 constitute a single table which is properly viewed by placing FIGS. 6-1 and 6-3 side by side and FIGS. 6-2 and 6-4 side by side, with FIG. 6-2 beneath FIG. 6-1. FIG. 6-5 is a table explaining the notation and abbreviations used in the columnar headings of FIGS. 6-1 to 6-4.

The Derivatives Model (block 5-02) is a series of application programs that receive user data regarding expected interests rates and interest rate volatility (line 5-12). Interest rate data used by the Asset Pool Prepayment Model are coordinated (line 5-21) with this input to the Derivatives Model. The Derivatives Model also receives market data on benchmark spot interest rates, such as Treasury yield curve rates, LIBOR rates, reference PC coupon rates and mortgage rates. The Derivatives Model has access to a data base of historical values of benchmark spot interest rates in the issuer's All Systems Data Base (block 4-26).

The Derivatives Model (block 5-02) has functionality to calculate projected distributions of interest rates based on, for example, stochastic lognormal, truncated lognormal and dispersion skewed truncated lognormal formulae and user input parameters regarding term, volatility, mean drift and reference forward rates. It can convert user input and benchmark rates into forward rates for the interest rate indexes planned for the EFC Series and from these conversions, can prepare interest rate scenarios to be used by the FLT/INV Class Structuring Process (block 5-04) to calculate expected values for the floater and inverse interest rate formulae planned to be used in the EFC Series. From the distributions, it can determine likelihood estimates of the values of the floater and inverse interest rate formulae. From its access to the All Systems Data Base (block 4-26), it can prepare comparisons of user based projected distributions with historical distributions of benchmark rates. FIGS. 7-1 though 7-4 illustrate part of an exemplary inverse cumulative distribution for LIBOR calculated by the Derivatives Model. FIGS. 7-1 to 6-4 constitute a single table which is properly viewed by placing FIGS. 7-1 and 7-3 side by side and FIGS. 7-2 and 7-4 side by side, with FIG. 7-2 beneath FIG. 7-1. FIGS. 7-5 and 7-6 are tables explaining the notation and abbreviations used in the columnar headings of FIGS. 7-1 to 7-4.

If a user proposes a plan for an EFC Series that includes one of more interest-rate derivatives, the user enters parameters describing the derivatives (line 5-12) into the Derivatives Model (block 5-02). For example, a user might enter parameters describing a corridor for LIBOR ranging from 6.3% to 8.15% and for terms ranging from 3 years to 11 years. The user may enter cost information regarding some or all of the proposed derivatives. The Derivatives Model also receives data on current market costs of interest-rate derivatives such as quoted periodic costs for LIBOR based caps, floors and swaps. Based on user input costs, market costs, historical costs or a combination of any of these, the Derivatives Model calculates estimated costs for the derivatives included in the EFC Series plan. The Derivatives Model has access to a data base of historical values of benchmark interest-rate derivatives costs through the All Systems Data Base (block 4-26) and calculates cost comparisons of the EFC Series derivatives costs, with historical costs. FIG. 8 is an exemplary chart prepared by the Derivatives Model showing projected costs of 0.01% LIBOR corridors, based on the distribution of LIBOR values shown in FIGS. 7-1 though 7-6.

The third major user input to the Risk Analysis and Planning Module (4-01) is the user data describing the planned Series Classes and the degree to which they are supported by derivative assets and by mortgage-backed assets (line 5-31). Users can submit an initial plan for a Series funded entirely with mortgage-backed assets and then add derivatives as modifications to the initial plan. The data include the principal amount (or notional principal amount), principal type, interest rate or interest rate formula, interest type and conditions for each Class in the proposed structure. The conditions may include, for example, PAC ranges and wal boundaries. The user input data also includes the principal and interest allocation rules to be used to channel payments received on the assets of the Series to the input Classes. If desired, the user input can include pricing data.

The REMIC Pool Planning and Stress Process (block 5-03) creates preliminary files for the input Classes and for the Series payment rules. A major function of the REMIC Pool Planning and Stress Process is to test cash flow during the planning process. The REMIC Pool Planning and Stress Process receives data (line 5-22) from the Asset Pool Prepayment Model (block 5-01) showing the cash flows generated by the mortgage-backed assets and processes these cash flows through the Series payment allocation rules. These calculations determine whether the cash flows from the assets are sufficient to meet the payment obligations of the Classes. Also, they determine whether there is any build up of unused cash under the payment rules.

If the proposed payment allocation rules fail in any material respect, the failure is transferred (line 5-26) to the Risk, Operational and Legal Evaluation Process (block 5-05). Since the issuer guarantees payments of EFC Serieses, any cash flow deficiency creates business and legal risks that require immediate resolution. The Risk, Operational and Legal Evaluation Process performs the risk analysis needed for this resolution. Since the issuer usually does not manage the cash flows processed through an EFC Series, a cash flow surplus also creates business and legal risks that are resolved with the use of the Risk, Operational and Legal Evaluation Process analysis programs. If the planned structure is disapproved because of the cash flow failure, the results are returned to the user (line 5-42) for modification of the Series structure.

The REMIC Pool Planning and Stress Process (block 5-03) is an interactive process. In addition to validating the proposed cash flow allocation formulae, the REMIC Pool Planning and Stress Process performs stress analysis to determine if payments may be reallocated from less valuable Classes to more valuable Classes. For example, the analysis may determine that the size of the SUP cash flow intended to support the PAC Classes of the Series, is greater than that needed based on the cash flow projections received (line 5-22) from the Asset Pool Prepayment Model (block 5-01). In this case, the information is returned to the user via an interactive loop (line 5-41) for reevaluation. As a result of the reevaluation, the user may enter revised Class data (line 5-13) or revised asset data (line 5-11). FIGS. 9-1 through 9-16 illustrate part of exemplary, projected principal allocations to the Classes of a proposed Series structure. FIGS. 9-1 to 9-16 constitute a single table which is properly viewed by placing each drawing sheet side by side in sequence. FIGS. 9-17 to 9-26 are tables explaining the notation and abbreviations used in the columnar headings of FIGS. 9-1 to 9-16.

The principal function of the FLT/INV Class Structuring Process (block 5-04) is to determine the extent to which part of a proposed floating-rate Class can be funded most economically with a derivative. It integrates output describing the proposed REMIC Pool structure (line 5-24) from the REMIC Pool Planning and Stress Process (block 5-03), with output describing derivative costs (line 5-23) from the Derivatives Model (block 5-02). For example, if the user proposes (line 5-13) a LIBOR based FLT/INV Class combination funded with SUP cash flow and proposes LIBOR corridors to fund part of the FLT Class (line 5-12), the FLT/INV Class data first are processed by the REMIC Pool Planning and Stress Process which calculates the SUP cash flow. The derivatives data first are processed by the Derivatives Model to prepare appropriate corridor cost tables and relevant inverse-rate data tables. The output data of both of these processes are combined in the FLT/INV Class Structuring Process for integrated analysis.

A derivative integrated into an EFC Series structure may be indexed to a notational amount that declines with the balance outstanding from time to time of a SUP cash flow or a target scheduled for a FLT Class. These notational amounts are determined by the REMIC Pool Planning and Stress Process (block 5-03) and transferred (line 5-24) to the FLT/INV Class Structuring Process (block 5-04). On the other hand, the derivative may be indexed to a notational amount that declines with the balance of the underlying Mortgage Asset Account, or to the balance of a reference PC Pool or other independent financial information. Schedules of projected outstanding balances of Mortgage Asset Accounts are calculated by the Asset Pool Prepayment Model (block 5-01) and uploaded (line 5-21) to the Derivatives Model (block 5-02) and from there are transferred (line 5-23) to the FLT/INV Class Structuring Process (block 5-04). Independent reference information is input by the user (line 5-12). FIGS. 10-1 through 10-4 illustrate part an exemplary table of notional principal amount schedules determined by the REMIC Pool Planning and Stress Process and uploaded to the FLT/INV Class Structuring Process for analysis of a derivative indexed to the cash flow supporting EF and ES Classes. FIGS. 10-1 to 10-4 constitute a single table which is properly viewed by placing each drawing sheet side by side in sequence. FIG. 10-5 is a table explaining the notation and abbreviations used in the columnar headings of FIGS. 10-1 to 10-4.

The FLT/INV Class Structuring Process (block 5-04) also computes valuations for the INV Classes affected by the derivatives planned for the EFC Series. Usually, the market for EFC Series is driven by the cash flow requirements of PAC and FLT Class investors, and the EFC Series System generates FLT Classes to meet these requirements. Thus, the use of derivatives to fund FLT Classes usually leads to modifications in the interest rate formula of the related INV Class. The FLT/INV Class Structuring Process translates the proposed derivatives into appropriate inverse-rate formulae and calculates price adjustment tables for the INV Classes as a function of the adjusted inverse-rate formulae. FIGS. 11-1 through 11-4 illustrate part of an exemplary, determination by the FLT/INV Class Structuring Process of the value of a proposed inverse-rate formula when calculated against historical values of LIBOR. FIGS. 11-1 to 11-4 constitute a single table which is properly viewed by placing FIGS. 11-1 and 11-3 side by side and FIGS. 11-2 and 11-4 side by side, with FIG. 11-2 beneath FIG. 11-1. FIG. 11-5 is a table explaining the notation and abbreviations used in the columnar headings of FIGS. 11-1 to 11-4.

The results of the calculation by the FLT/INV Class Structuring Process (5-04) loop back iteratively (line 5-25) into the REMIC Pool Planning and Stress Process (block 5-03). For example, value increases calculated by the FLT/INV Class Structuring Process may lead to a reassessment of the size of the related PAC Class support. This information may feed back to the user (line 5-41) and lead to a revision in the Class data and prepayment data input at 5-13. This iterative process may continue over a period of weeks as additional assets (line 5-11) and Classes (line5-13) are added to the Series.

The output (line 5-26) of the REMIC Pool Planning and Stress Process (block 5-03) and the output (line 5-27) of the FLT/INV Class Structuring Process (block 5-04) combine to form a complete proposed structure for the EFC Series. At the next stage of the EFC Series System, these items are entered in the Risk, Operational and Legal Evaluation Process (block 5-05). This process calculates the interest-rate risk and credit risk of any issuer positions in the structure and evaluates them against Corporate guidelines. Any risks exceeding guidelines are documented and transferred to the Financial Planning Function (FIG. 4, block 4-21). The Risk, Operational and Legal Evaluation Process also estimates the issuer's resources required to settle and administer the Series and transfers this estimation to the Business Planning Function (FIG. 4, block 4-23).

The Risk, Operational and Legal Evaluation Process (block 5-05) forms the interface between the proposed EFC Series and the issuer's legal review functions (FIG. 4, block 4-22). These functions assure that the proposed EFC Series conform to applicable federal and state laws and to the issuer's policies regarding investment securities. If the review function determines noncompliance of any aspect of the proposed EFC Series, the reviewing party may propose structural changes intended to correct the noncompliance (lines 5-42, 5-43). For example, if the review discloses a Class impermissibly issued by an investment trust pool, the reviewing party may use the Risk, Operational and Legal Evaluation Process interface to evaluate the feasibility of restructuring the Series to issue the Class from a REMIC Pool, and then may recommend the restructuring.

After a proposed EFC Series structure completes the Risk, Operational and Legal Evaluation Process (block 5-05), it is a complete approved plan ready for operational implementation. Usually, it is transferred (line 5-31) to the Series Validation Process (FIG. 12, block 7-01) of the Deal Structure Module as the user input for a Series to be issued.

Figure 12:
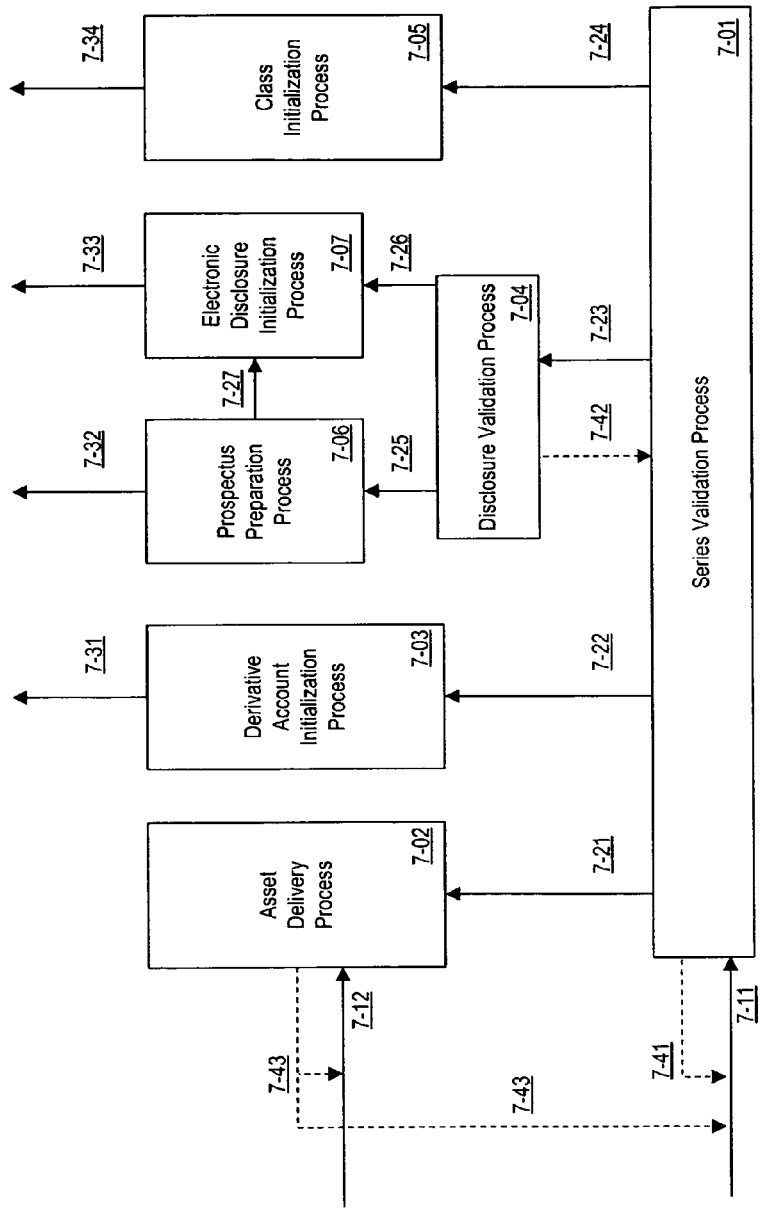

FIG. 12 depicts the principal data processing systems components of the Deal Structure Module of the EFC Series System (FIG. 4, block 4-02). This Module verifies user Series structure and initializes the data processing files for the Series. These files are used as the basis for monitoring the delivery of assets, preparing the disclosure information, issuing the EFC Classes and paying the EFC Series. The process begins with input by a user line (line 7-11) to the Series Validation Process (block 7-01). Frequently, this input is the data detailing the Series plan approved by the Risk, Operational and Legal Evaluation Process of the Risk Analysis and Planning Module (FIG. 5, block 5-05).

The Series Validation Process (block 7-01) generates a list of data requirements for the type of Series proposed and cross-checks the list against the input data describing the Series structure (line 7-11). Often, the list data is incomplete or incorrect and the Series Validation Process generates a Deliverables Checklist detailing the items required to completely and correctly initialize the Deal Structure Module. The Deliverables Checklist is transmitted to the user (line 7-41) for completion and resubmission (line 7-11). This is an interactive function that continues until the Series data requirements are complete and correct. Further, the Deal Structure Module allows the user to make changes to the Series structure for a period of time after initialization. These changes are entered into the Module by means of this loop.

The Series Validation Process (block 7-01) prepares and manages the data files for each new Series. As the user description of the Series structure is completed and corrected, the Series Validation Process creates the initial asset files, class files, disclosure files and payment files for the Series. The data are entered into a management data base called the Tracking System which is updated and changed interactively for a period of weeks as the user adjusts the Series structure in response to changing market conditions.

A key function of the Series Validation Process (block 7-01) is the verification of the cash flows of the Series structure. The data entered into the Tracking System includes a description of the kind of assets expected to be delivered to fund the Series, the characteristics of the Classes to be issued by the Series and the rules for allocating payments from the assets to the Classes. The Tracking System verifies that for all possible payment scenarios, monthly payments received on the mortgage-backed and derivative assets equals monthly payments made on the Classes and the derivative positions.

The Series Validation Process (block 7-01) coordinates an independent verification by an outside party, Independent Securities Verification Function (FIG. 4, block 4-28). This Independent Securities Verification Function receives the data describing the EFC Series structure and independently verifies that payments received by the EFC Series correspond to its payment obligations. If the verification fails, the deficiency is reported to the user via the completion loop (line 7-41) of the Series Validation Process.

The Disclosure Validation Process (block 7-04) also performs important verification functions. A Series Prospectus may make representations regarding the performance characteristics of certain of the EFC Classes. For example, PAC Classes may be represented as paying according to schedule if prepayments remain within a specified PSA range. Derivative positions may be expected to support a maximum rate schedule if prepayments are uncorrelated with index values. Sequential Classes may be represented as having weighted average lives which information is a basis for determining compliance with regulatory guidelines. These conditions are important to investors, but are complex and difficult to determine. The EFC Series System assumes the responsibility for making these calculations by disclosing the results and representing them to investors.

The Disclosure Validation Process (block 7-04) verifies that the conditions to be represented by EFC Series are met. The Disclosure Validation Process uses the Tracking System to accesses the EFC Series data files (line 7-23) and create the appropriate scenarios to test the conditions. The scenarios are run against the data files and the results compared to the planned disclosure. The Disclosure Validation Process also coordinates an independent verification of the conditions by the Independent Securities Verification Function (FIG. 4, block 4-28). If the Series structure fails either of these verification tests or if there are material differences, then the failure feeds back to the EFC Series data base and the user (lines 7-42 and 7-41) for resolution. Resolution may take the form of a change in the Series structure (line 7-11) starting the process again, or resolution may change the disclosure information on which investors may rely.

As the specifications for a Series are completed, verified and entered into data files, the Series Validation Process (block 7-01) makes available (line 7-21) to the Asset Delivery Process (block 7-02), the Series specifications for mortgage-backed assets. The Asset Delivery Process is activated at a later time when it receives the initial mortgage-backed asset file from the user (line 7-12), This Process then edits the initial asset file item by item to assure that the initial assets conform to the asset requirements used during the planning phases of the Series and reflected in the conditions represented by the disclosure for the Series. Edit failures are communicated to the user for resolution (line 7-43). Resolution may be achieved, for example, by substituting conforming assets (line 7-12) or by revising Series representations (line 7-11). When the editing process is completed, the Asset Delivery Process prepares the expected assets file for the Series.

The Asset Delivery Process (block 7-02) transfers the expected asset file to the appropriate transfer agent, depending on the type of asset (FIG. 4, block 4-24). At settlement, this file is matched by the wire room of the transfer agent to the file of assets actually delivered. Any delivery failures are reported back to the Asset Delivery Process for resolution. After all delivery failures are resolved, the Asset Delivery Process prepares the final asset files for the Series and enters the data in the All Systems Data Base (FIG. 4, block 4-26).

The Derivative Account Initialization Process (block 7-03) functions to set up the account files for the derivative assets of the Series and to monitor the delivery of these assets. As the specifications for a Series are completed, verified and entered into data files by the Series Validation Process (block 7-01), the Derivative Account Initialization Process draws on the files (line 7-22) for the derivative assets specifications. The Derivative Account Initialization Process edits the specifications for the interest-rate derivatives against the terms and conditions of the applicable Master Agreement and generates the required trade tickets. After the editing step is completed, the Derivative Account Initialization Process prepares the expected derivatives file and enters the data regarding the derivatives into the All Systems Data Base (FIG. 4, block 4-26). At settlement, the Derivative Account Initialization Process (block 7-03) receives and records confirmations of the derivatives positions of the Series and matches the confirmations against the expected derivatives file. Any delivery failures are resolved and the Derivative Account Initialization Process prepares the final derivatives file.

Information developed by the Disclosure Validation Process (block 7-04) forms part of the basis (line 7-25) for the Prospectus Preparation Process (block 7-06). The Prospectus is a text description of the Series that described legally binding terms and conditions of the Classes, such as payment dates, holder of record dates, interest rates and methods of payment. The Prospectus also frequently includes charts and tables describing assumed prepayments and yields for the Classes under various scenarios. These charts and tables are a significant part of the Series because investors rely on them when purchasing Classes. The Prospectus Preparation Process prepares this text both for printed distribution and for electronic posting on, for example, the issuer's Internet Web-Site (line 7-27).

The Prospectus Preparation Process (block 7-06) begins when a user enters a description of the Series structure (line 7-11). The Process reviews prior Series and identifies one with characteristics similar to the current Series. The Process then notifies the Typesetting and Printing Function (FIG. 4, block 4-27) to activate the old document for modification. Depending on the complexity and features of the current Series, the old document will be revised, often extensively, to incorporate a different mix of features, integrate these features, and reflect the economics of the current structure. This process takes several drafts and incorporates charts, tables and other information serially as it becomes available through the Disclosure Validation Process (block 7-04). The last step in the iterative portion of the process is the receipt of the final payment dates and CUSIP numbers for the Classes. When this is received, notice is sent to the Typesetting and Printing Function to generate the physical documents.

The Electronic Disclosure Initialization Process (block 7-07) receives information (line 7-26) developed by the Disclosure Validation Process (block 7-04) as the basis for disclosure on the Internet. This process creates an initial disclosure file with Class level data. For each Class of the Series, the file shows the original principal (or notional principal) amount, class coupon, interest type, principal type, wal, final maturity and CUSIP. The process also records in the file data that will be the basis for Internet disclosure at the Series level.

Figure 13:
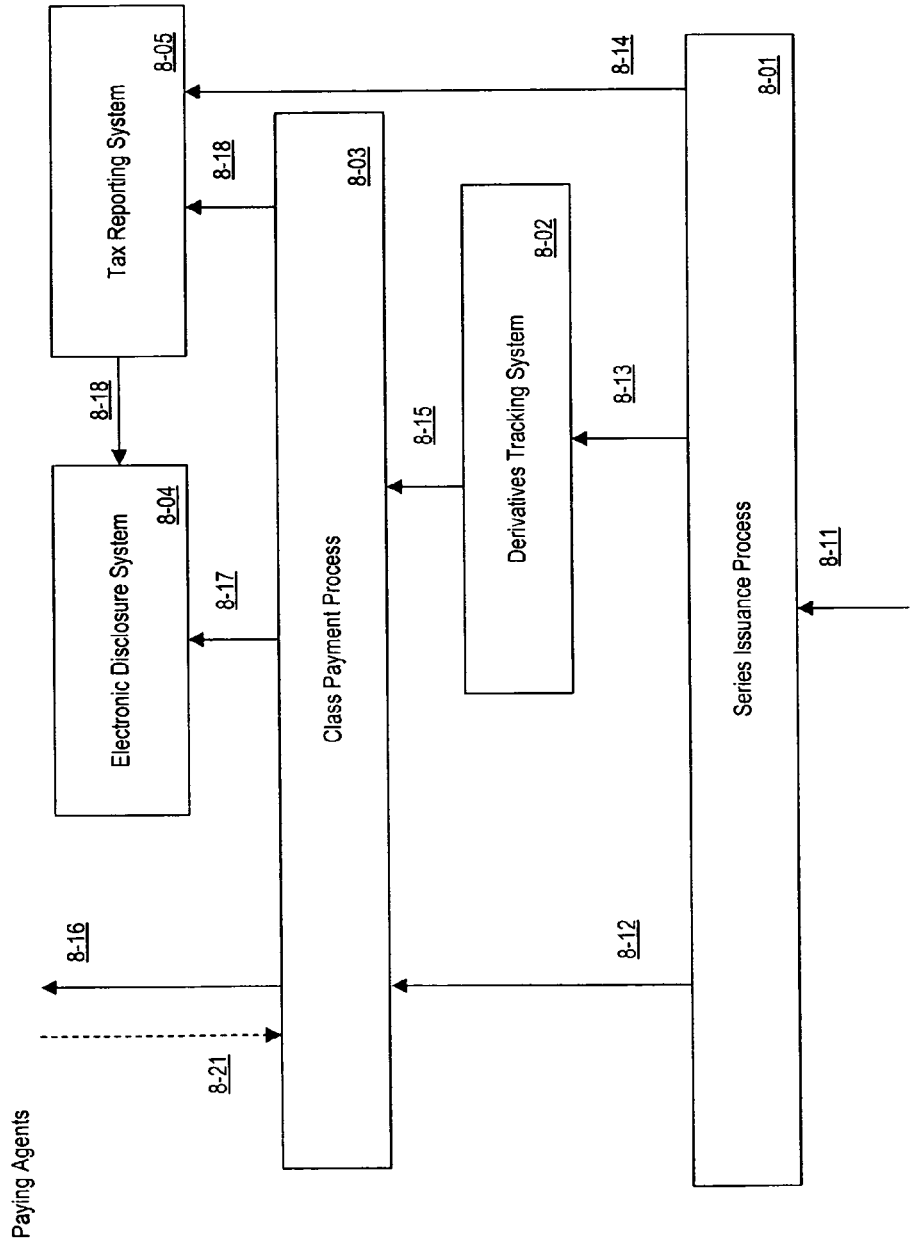

FIG. 13 depicts the principal data processing systems components of the Series Administration Module (FIG. 4, block 4-03). This Module is activated several days before settlement of the Series and performs functions related to the issuance of the Classes and to their continuing payment. These processes begin with data input (line 8-11) to the Series Issuance Process (block 8-01). Usually, the input items are the Class files, derivatives files and disclosure files prepared by the various Deal Structure Module processes (FIG. 12, blocks 7-03, 7-05, 7-06 and 7-07).

The Series Issuance Process (block 8-01) functions together with the applicable fiscal agent (FIG. 4, block 4-25) to create the Classes. Most Classes are issued as book-entry securities through the Federal Reserve Bank ("FRB") system or through The Depository Trust Company system. The process begins by assigning CUSIP numbers to the Classes to be issued by a Series. The Series Issuance Process generates an original issue file, CUSIP report and broadcast file for the Series. The original issue file contains the class level data required for Series issuance and is a base file for releasing the securities. The CUSIP report is forwarded to the CUSIP Bureau and the broadcast file is forwarded to the FRB or other fiscal agent.

When the Series Issuance Process (block 8-01) forwards the broadcast file to the FRB, it verifies the data against the Prospectus, derivative trade tickets and other information created by the Deal Structure Module. If necessary, the Series Issuance Process corrects the original issue file and forwards any revisions to the FRB or other fiscal agent. After verification, the Series Issuance Process sends the original issue file to the wire room or other transfer agent (FIG. 4, block 4-25).

On the day the Series is issued, the Legal Function (FIG. 4, block 4-22) notifies the Series Issuance Process (block 8-01) that the closing conditions have been met and authorizes the release of the Classes. The Series Issuance Process then notifies the wire room (or transfer agent) to transfer of the securities to the user accounts and to begin payment. The Series Issuance Process prints the original issue settlement confirmations and reconciles the cash and original issue wires.

The Derivatives Tracking System (block 8-02) creates and maintain accounts for the derivative instrument components of the Series. When the Series Issuance Process (block 8-01) verifies the original issue file, it forwards the derivatives account data (line 8-13) to the Derivatives Tracking System. The Derivatives Tracking System verifies the status of the derivative accounts and creates the final derivatives files for the Series. At this time, the accounts typically are operative except for the pre-condition of the settlement of the Series.

On the day the Series is issued, the Legal Function (FIG. 4, block 4-22) notifies the Derivatives Tracking System (block 8-02) that the closing conditions have been met and authorizes the activation of the derivative accounts. The Derivatives Tracking System then activates the derivative accounts to make and receive payments from counterparties. In some cases, amounts payable on a Class may be conditioned on the status of a related derivative account. When the Derivatives Tracking System activates such a conditioning account, the Derivatives Tracking System creates a continuing notice (line 8-15) of the condition status for the Class Payment Process.

The Class Payment Process (block 8-03) receives the verified class level data (line 8-12) needed to make payments on the Classes from the Series Issuance Process (block 8-01) and, in some cases, receives conditioning data (line 8-15) from the derivatives Tracking System (block 8-02). At this point the Class Payment Process queries the All Systems Data Base (FIG. 4, block 4-26) to determine if the asset data have been loaded. When the asset data are loaded, the Class Payment Process runs the first payment for the Series and prints reports that are used to reconcile the cash flows from the assets of the Series with the Series payment rules in the Prospectus and the payment factors on the Classes. The Class Payment Process tries out the payment rules and floater formulae and initiates data corrections if necessary. After any necessary data corrections are made, the Class Payment Process finalizes the class payment file.

The Class Payment Process (block 8-03) processes payment through the class payment file. The Class Payment Process selects the Series that need to be run and executes the payment runs through the class payment file. The determination of the amount of principally payable on a Class is a complex process. First, the amounts of principal paid on the applicable asset pools must be determined. Next, these amounts must be processed through the structural components for a Series, as shown in FIG. 1. At each step in the structure flowthrough, the amounts must be processed through the allocation rules and/or conditions applicable to that structural element. Finally, the amounts must be tested against any Series level conditions that may apply to the Class principal payments.

The determination of the interest payable on floating-rate and inverse-rate Classes also is a complex process. The Class Payment Process (block 8-03) gathers all of the index rates from their various locations. Some examples of locations include the Wall Street Journal and the H15. Once the rates are gathered and input into the payment system they are reviewed. The system then goes through all of the payment rules of all the Series to determine the updated coupons. Once the process is finished, the group creates the floater disclosure files and the coupons are verified manually. Floater tie out reports are generated and the group ties out the files with the reports. When the files are tied out, the files are sent (line 8-16) to the Electronic Disclosure System (block 8-04).

The determination of the amounts payable on derivative instruments involves both of these complexities. Typically, the derivative has a notional principal amount indexed to principal payments made on a Class of the Series. It also has an index rate that is a function of the index used for a floating-rate Class of the Series. The Class Payment Process (block 8-03) must identify the applicable parameters used by the derivative components and trace these parameters through both the principal determination system and the interest determination system.

When the payment processing is complete, the Class Payment Process (block 8-03) checks the job monitor for errors and/or terminations. The Class Payment Process then reconciles the asset cash flows to the Class payments. After the payment process has been run for all Series, the Class Payment Process runs the REMIC residual class payment executable which rolls up payment to the ultimate residual classes of Series with tiers of REMICs. For callable processing, the Class Payment Process runs the call redemption executable and integrates redemption payments with the normal payment process.

The Class Payment Process (block 8-03) generates payment files for the paying agents containing all securities that are paid through the respective paying agent. Once the file is created, it is reconciled to the payment information generated earlier in the process. When it is properly tied out, the file is transmitted to the respective paying agent (line 8-16). Upon receipt, the paying agents edits the file and clears any edits through the Class Payment Process (line 8-21). After the information is completely verified, the paying agents generate a P & I payment proof that is transmitted (line 8-21) to the Class Payment Process where it is tied out. After this check is completed, the Class Payment Process authorizes payment.

The Electronic Disclosure System (block 8-04) posts and maintains files on the Internet that contain investor information. In particular, the amount of principal payable on a Class is not known in advance and must be determined on a monthly basis by the Class Payment Process (block 8-03). As soon as these determinations are made, the Electronic Disclosure System posts the amounts to the Internal as a quick and reliable way of notifying investors. Similarly, floating-rates and inverse-rates on Classes are not known in advance and must be determined, usually on a monthly basis. The Electronic Disclosure System posts the amounts to the Internet as soon as these determinations are made.

The Electronic Disclosure System (block 8-04) also maintains disclosure files applicable to the Series as a whole. These files include asset assumptions, assets actually delivered, payment schedules, PAC tables and settlement schedules. The Electronic Disclosure System receives tax information (line 8-18) relate to the Series and its Classes from the Tax Reporting System (block 8-05) and posts this information to, for example, Internet files.

The Tax Reporting System (block 8-05) prepares tax files for the appropriate structural components of a Series. In FIG. 1, for example, each of the REMIC Pools (blocks 1-11, 1-12 and 1-130 and EFC Pools (blocks 1-14 and 1-15) is a separate person for federal income tax purposes. Further, different tax rules apply to the various structural components. The REMIC Rules apply to the REMIC Pools and the Grantor Trust Rules apply to the EFC Pools. The Tax Reporting System also prepares tax files regarding the information required to be disclosed of the Classes of the Series.

The information needed for the tax files comes from a variety of sources. Information that is available at settlement and is constant throughout the life of the Series generally is available to the Tax Reporting System through (line 8-14) the Series Issuance Process. Such information includes initial asset values, Class prices, derivatives premiums and settlement cash payments. It also includes formulas to be used for the section 212 expense allocation to the structural components of the Series. Other information, such as floating-rates, inverse-rates and derivative rates must be determined on a monthly bases. This information generally is available to the Tax Reporting System through (line 8-17) the Class Payment Process.

As the information is entered into the Tax Reporting System (block 8-05), queries are run to validate that the information is stored correctly in the database. The Tax Reporting System runs the tax closing programs through the tax system and checks the job monitor for errors and edits. The Tax Reporting System then runs more queries to insure that the data is reasonable. The Tax Reporting System compares the cash flows from the Series Validation Process (FIG. 7, block 7-01) to the cash flows from the tax files. If there are differences, the Tax Reporting System performs any necessary data corrections. The process continues until the all Series records tie.

The Tax Reporting System (block 8-05) obtains tax identification numbers for the pools established by the Series and verifies that all necessary and appropriate tax elections have been made. The Tax Reporting System also submits required Tax Forms 8811. On a monthly basis after the Class Payment Process (block 8-03) is complete, the Tax Reporting System generates the monthly tax information. Automated edits are generated through the system and the results are stored. The reinvestment program is run for deals with this cash flow feature. Lastly the alternative tax program is run for investment trust transactions after settlement (see FIG. 1, blocks 1-41, 1-42 and 1-43). When the job stream is finished, the Tax Reporting System prints a job monitor showing any edits and errors for review. The Tax Reporting System creates the class level Form 1099 tax information and transfers (line 8-18) the information to the Electronic Disclosure System (block 8-04).

On a quarterly basis the Tax Reporting System (block 8-05) rolls up pro rata portions of four months of data to create the quarterly information. The group selects deals to run through the quarterly process and runs them through the quarterly tier level programs. It then checks the job monitor and resolves any outstanding edits or errors. Once the deals have been cleared and rerun, the Tax Reporting System prepares the quarterly tax documentation for review. After review, the quarter Schedule Qs tax reports are printed and mailed to the holders.

The Tax Reporting System (block 8-05) prepares the annual tax reporting required for all Classes. The Series are selected and run through the tax system and the reports are printed. The output items of this process are the Forms 1066, K-1s and backup documentation for each of the structural components of each Series. The algorithms used for a component are a function of the tax status of that component. REMIC Rules apply to REMIC Pools and Grantor Trust Rules apply to EFC Pools. The information is reviewed and sorted by holder and then is mailed to the investors.

It will be apparent to those skilled in the art that various modifications and variations can be made to the invention without departing from the scope or spirit of the invention. For example, the present invention is not limited to creating investment securities by adjusting the principal and interest cash flows on floating-rate and inverse floating rate bonds, as disclosed in the above-described examples. Other possible applications of the invention for creating investment securities from interest-rate derivatives and mortgage pools include adjusting the principal and interest cash flows on Planned Amortization Classes, Targeted Amortization Classes, Scheduled Classes, Accrual Classes and/or Sequential Pay Classes. Other modifications and embodiments of the invention will be apparent to those skilled in the art from consideration of the specification and practice of the invention disclosed herein. Therefore, it is intended that the specification and examples be considered as exemplary only, with a true scope and spirit of the invention being indicated by the following claims.

What is claimed is:

1. A computer-implemented method for creating investment securities, the computer including a processor and memory and the method comprising steps performed by the computer of:

receiving, by the processor, structuring constraints;

defining, by the processor, one or more classes of securities;

creating, by the processor, a securities structure backed by mortgage pool components in accordance with the structuring constraints, the securities structure having one or more classes of securities, at least one class being subject to an artificial leverage limitation under the structuring constraints because it is designated for absorbing prepayment risk;

restructuring, by the processor, one of the at least one class designated for absorbing prepayment risk to overcome the artificial leverage limitation by combining it with at least one cash flow coming from interest-rate derivative components;

generating, by the processor, one or more structured securities based on the securities structure and the one or more classes of securities; and issuing, by the processor, the one or more structured securities.

2. The method according to claim 1, wherein the interest-rate derivative components comprise at least one exchange of cash flows backed by one or more mortgage pools for cash flows that are not mortgage-backed, the restructuring step combining the non-mortgage-backed cash flows with cash flows backed by one or more mortgage pools.

3. The method according to claim 1, wherein the restructuring step comprises adjusting cash flow characteristics of the at least one class designated for absorbing prepayment risk.

4. The method according to claim 1, wherein the restructuring step comprises allocating principal, interest, and other cash flows from the interest-rate derivative and the mortgage pool components to the at least one class designated for absorbing prepayment risk.

5. The method according to claim 4, wherein the restructuring step further comprises adjusting the principal and interest cash flow characteristics of the at least one class designated for absorbing prepayment risk based on the result of analyzing the risk elements of the interest-rate derivative and mortgage pool components.

6. The method according to claim 1, wherein at least one of the structured classes of securities has floating interest rate characteristics.

7. The method according to claim 1, wherein the overall value of the securities structure is increased.

8. The method according to claim 1, wherein the restructuring step further comprises:

not restructuring one or more other classes of the securities structure.

9. The method according to claim 1, wherein the restructuring step further comprises:

restructuring, by the processor, more than one class of the securities structure.

10. A computer program product, tangibly embodied in a non-transitory computer-readable storage medium, for creating investment securities, the computer program product comprising the following computer-readable program code for effecting actions in a computing platform:

program code for receiving structuring constraints;

program code for defining one or more classes of securities;

program code for creating a securities structure backed by mortgage pool components in accordance with the structuring constraints, the securities structure having one or more classes of securities, at least one class being subject to an artificial leverage limitation under the structuring constraints because it is designated for absorbing prepayment risk;

program code for restructuring one of the at least one class designated for absorbing prepayment risk to overcome the artificial leverage limitation by combining it with at least one cash flow coming from interest-rate derivative components; and program code for creating one or more structured securities based on the securities structure and the one or more classes of securities.

11. The computer program product according to claim 10, wherein the interest-rate derivatives comprise at least one exchange of cash flows backed by one or more mortgage pools cash flows that are not mortgage-backed, the program code for restructuring comprising program code for combining the non-mortgage-backed cash flows with other cash flows backed by one or more mortgage pools.

12. The computer program product according to claim 10, wherein the program code for restructuring comprising program code for adjusting cash flow characteristics of the at least one class designated for absorbing prepayment risk.

13. The computer program product according to claim 10, wherein the program code for restructuring comprising program code for allocating principal, interest and other cash flows from the interest-rate derivative and mortgage pool components to the at least one class designated for absorbing prepayment risk.

14. The computer program product according to claim 13, wherein the program code for restructuring further comprises program code for adjusting the principal and interest cash flow characteristics of the at least one class designated for absorbing prepayment risk based on the result of analyzing the risk elements.

* * * * *